(12) United States Patent
Kashiwa et al.

(10) Patent No.: US 9,798,408 B2
(45) Date of Patent: Oct. 24, 2017

(54) ELECTRONIC DEVICE

(75) Inventors: Yumiko Kashiwa, Yokohama (JP); Yasushi Sasaki, Yokohama (JP); Makoto Chishima, Yokohama (JP); Takashi Yamada, Hachiouji (JP)

(73) Assignee: KYOCERA Corporation, Kyoto (JP)

( * ) Notice: Subject to any disclaimer, the term of this patent is extended or adjusted under 35 U.S.C. 154(b) by 106 days.

(21) Appl. No.: 14/122,640

(22) PCT Filed: May 25, 2012

(86) PCT No.: PCT/JP2012/003434
§ 371 (c)(1),
(2), (4) Date: Nov. 26, 2013

(87) PCT Pub. No.: WO2012/164895
PCT Pub. Date: Dec. 6, 2012

(65) Prior Publication Data
US 2014/0111456 A1    Apr. 24, 2014

(30) Foreign Application Priority Data

May 27, 2011   (JP) .................................. 2011-119682
May 27, 2011   (JP) .................................. 2011-119713

(51) Int. Cl.
*G06F 3/041*   (2006.01)
*G06F 3/0488*  (2013.01)

(52) U.S. Cl.
CPC ........ *G06F 3/0414* (2013.01); *G06F 3/04883* (2013.01); *G06F 2203/04806* (2013.01)

(58) Field of Classification Search
None
See application file for complete search history.

(56) References Cited

U.S. PATENT DOCUMENTS

2002/0180763 A1*  12/2002  Kung .......................... 345/660
2006/0284858 A1   12/2006  Rekimoto
(Continued)

FOREIGN PATENT DOCUMENTS

EP   1462917 A1    9/2004
JP   2000-317142 A   11/2000
(Continued)

OTHER PUBLICATIONS

An Office Action; "Notice of Reasons for Rejection," issued by the Japanese Patent Office on May 27, 2014, which corresponds to Japanese Patent Application No. 2013-517863 and is related to U.S. Appl. No. 14/122,640; with English language concise explanation.
(Continued)

*Primary Examiner* — Vijay Shankar
*Assistant Examiner* — Kebede Teshome
(74) *Attorney, Agent, or Firm* — Studebaker & Brackett PC

(57) ABSTRACT

The electronic device 1 includes a press detection unit 40 configured to detect a press and a control unit 10 configured to control, when a standard for data based on press is set, such that a parameter value associated with a predetermined process is increased/decreased, according to a difference between the standard and the data based on press detected by the press detection unit 40, thus portions operated by an operator can be reduced and operation steps by the operator can be reduced as well.

2 Claims, 49 Drawing Sheets

(56) References Cited

U.S. PATENT DOCUMENTS

| | | |
|---|---|---|
| 2007/0176904 A1 | 8/2007 | Russo |
| 2007/0222767 A1* | 9/2007 | Wang ................ G01C 21/3664 345/173 |
| 2008/0094367 A1* | 4/2008 | Van De Ven ......... G06F 3/0414 345/173 |
| 2009/0046110 A1* | 2/2009 | Sadler .................. G06F 3/0488 345/660 |
| 2010/0053107 A1 | 3/2010 | Tsuzaki et al. |
| 2010/0060605 A1 | 3/2010 | Rimas-Ribikauskas et al. |
| 2010/0123734 A1 | 5/2010 | Ozawa et al. |
| 2010/0153879 A1 | 6/2010 | Rimas-Ribikauskas et al. |
| 2010/0225604 A1 | 9/2010 | Homma et al. |
| 2011/0050628 A1 | 3/2011 | Homma et al. |
| 2011/0054837 A1 | 3/2011 | Ikeda |
| 2011/0310058 A1* | 12/2011 | Yamada et al. ............... 345/174 |
| 2012/0147052 A1* | 6/2012 | Homma et al. ............... 345/660 |
| 2012/0274591 A1 | 11/2012 | Rimas-Ribikauskas et al. |

FOREIGN PATENT DOCUMENTS

| | | |
|---|---|---|
| JP | 2001-202192 A | 7/2001 |
| JP | 2003-157075 A | 5/2003 |
| JP | 2003-241898 A | 8/2003 |
| JP | 2006-185443 A | 7/2006 |
| JP | 2006-345209 A | 12/2006 |
| JP | 2009-142901 A | 7/2009 |
| JP | 2010-061299 A | 3/2010 |
| JP | 2010-122856 A | 6/2010 |
| JP | 2010-211399 A | 9/2010 |
| JP | 2011-048666 A | 3/2011 |
| JP | 2011-053973 A | 3/2011 |
| WO | WO2011027611 * 3/2011 ............. G06F 3/048 |

OTHER PUBLICATIONS

International Search Report; PCT/JP2012/003434; Aug. 28, 2012.

* cited by examiner

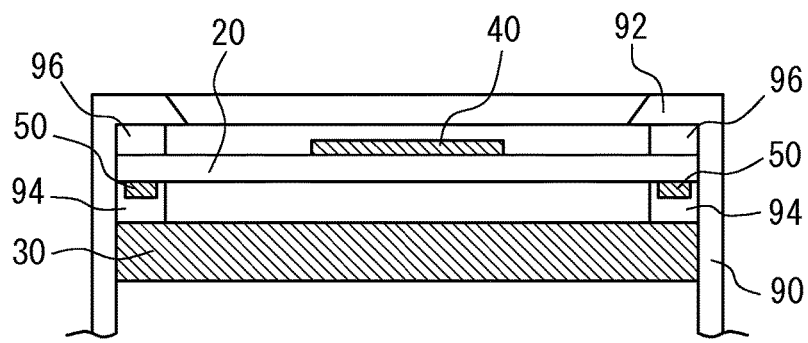
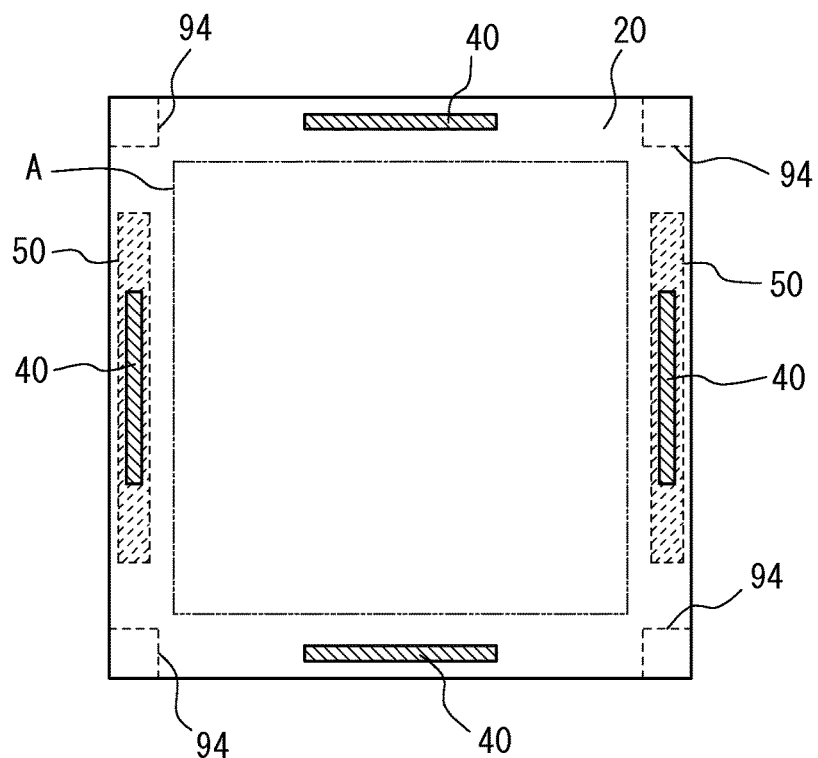

ELECTRONIC DEVICE

CROSS REFERENCE TO RELATED APPLICATION

This application claims priority to and the benefit of Japanese Patent Application Nos. 2011-119682 and 2011-119713 filed on May 27, 2011, the entire contents of which are incorporated herein by reference.

FIELD

The present invention relates to an electronic device, or to an electronic device configured to perform a process corresponding to data based on a press detected by a press detection unit.

BACKGROUND

In recent years, in mobile terminals such as mobile phones, as a member that detects a contact by an operator, electronic devices with a touch sensor such as a touch panel, a touch switch and the like are increasing. Further, besides mobile terminals, electronic devices with a touch panel like equipment such as calculators, ticket vending machines and the like, home appliances such as microwaves, TV sets, lighting equipment and the like, and industrial equipment (FA equipment) and the like are widely used.

A variety of touch sensors have been proposed so far (see, for example, Patent Document 1). The Patent Document 1 proposes an analog type resistive film touch panel that can be produced at a low cost and miniaturized. The touch panel described in Patent Document 1 is configured using two conductive films slightly spaced therebetween by a spacer. In this touch panel, when the conductive films are pushed and come in contact each other, the position of the contact is read as a voltage by one conductive film, based on the voltage gradient applied to the other conductive film.

As such a touch sensor, in addition to a resistive film type, a variety of types such as a capacitive type and an optical type are known. These types of touch sensors detect a contact by the operator's finger, a stylus pen and the like. An electronic device with a touch sensor generally displays images such as operation keys, buttons and the like (hereinafter referred to as "object") on a display unit such as a liquid crystal display disposed on the back face side of the touch sensor. When the operator executes operations of touching the object displayed on the display unit, the touch on the position corresponding to the object is detected by the touch sensor.

In the electronic device with such a touch sensor, according to the application software (hereinafter referred to merely as "application") to be used, a variety of user interfaces can be configured by displaying a variety of objects. Thus, in the electronic device with a touch sensor, a variety of user interfaces can be configured at a high degree of freedom. Such an electronic device is easy to operate and user friendly, and thus an electronic device with a touch sensor has spread rapidly.

Further, recently, the performance of the touch sensor mounted on an electronic device has been improved and, for example, like a touch sensor for multi-touch, some touch sensors can, even if a plurality of points are touched simultaneously, respectively detect the plurality of points. In addition, as an operation method executed by the operator to the touch sensor, some touch sensors detect not only the presence of contact but also the operation mode by the contact, thereby performing a variety of different processes according to the operation mode (see, for example, Patent Document 2).

For example, some electronic devices can detect a variety of operation modes such as, for example, tap on a touch sensor only once (single tap), quick twice tap (double tap), slide (or drag) for moving a position of the touch while touching a touch sensor, flick for quick sliding, and the like. Further, in the case of a touch sensor for multi-touch, some of such touch sensors can detect a pinching operation in which the operator simultaneously touches the touch sensor with his/her two fingers and pinches/spreads these two fingers. In this case, an operation of spreading the two fingers touching the touch sensor can be called "a pinch out operation" and an operation of pinching the two fingers can be called "a pinch in operation."

Recently, for example, as with smart phones, tablet computers and the like, high performance and multifunctional electronic devices with a touch sensor are in widespread use, and accordingly, a greater importance is put on the technique for detecting various operations to the touch sensor by the operator.

CITATION LIST

Patent Document 1: JP2003241898(A)
Patent Document 2: JP2010122856(A)

SUMMARY

The present invention provides an electronic device capable of reducing the portions on which the operator executes operations and of performing a process without displaying more than one objects dedicated to the process.

An electronic device according to a first aspect of the present invention to achieve the above-described purpose includes:

a press detection unit configured to detect a press; and a control unit configured to control, when a standard for data based on press is set, such that a parameter value associated with a predetermined process is increased/decreased, according to a difference between the standard and the data based on press detected by the press detection unit.

Further, an electronic device according to a second aspect of the present invention to achieve the above-described purpose includes:

a press detection unit configured to detect a press; and a control unit configured to control, when a standard for data based on press is set, such that a speed at which a parameter value associated with a predetermined process is changed is altered, according to a difference between the standard and the data based on press detected by the press detection unit.

According to a third aspect of the present invention, in the electronic device according to the first or the second aspect, the control unit controls, if change in the data based on press detected by the press detection unit is within a predetermined range for a predetermined period of time, such that the standard is set based on the data based on press detected in the predetermined period of time.

According to a fourth aspect of the present invention, in the electronic device according to the first aspect, the control unit controls such that amount of increasing/decreasing the parameter value according to the difference between the standard and the data based on press detected by the press detection unit is constant, when the data based on press detected by the press detection unit increases and when the data based on press detected by the press detection unit decreases.

According to a fifth aspect of the present invention, in the electronic device according to the first aspect, the control unit controls such that the amount of increasing/decreasing the parameter value according to the difference between the standard and the data based on press detected by the press detection unit differs, before and after the data based on press detected by the press detection unit turns from either increase or decrease to the other, such that an amount of increasing/decreasing the parameter value is different.

Further, an electronic device according to a sixth aspect of the present invention to achieve the above-described purpose includes:

a press detection unit configured to detect a press; and a control unit configured to set a standard for data based on press when the data based on press detected by the press detection unit satisfies a predetermined condition, and after setting the standard, to control such that a parameter value associated with a predetermined process is increased/decreased, according to a difference between the standard and the data based on press detected by the press detection unit.

Moreover, an electronic device according to a seventh aspect of the present invention to achieve the above-described purpose includes:

a press detection unit configured to detect a press; and a control unit configured to set a standard for data based on press when the data based on press detected by the press detection unit satisfies a predetermined condition, and after setting the standard, to control such that a speed at which a parameter value associated with a predetermined process is changed is altered, according to the difference between the standard and the data based on press detected by the press detection unit.

According to an eighth aspect of the present invention, in the electronic device according to the sixth or the seventh aspect, the control unit controls, when the data based on press detected by the press detection unit turns from increase to decrease, then turns from decrease to increase so that a standard is set based on the data based on press when the data based on press turns from increase to decrease and the data based on press when the data based on press turns from decrease to increase.

According to a ninth aspect of the present invention, in the electronic device according to the sixth aspect, the control unit controls such that amount of increasing/decreasing the parameter value according to the difference between the standard and the data based on press detected by the press detection unit is constant, when the data based on press detected by the press detection unit increases, and when the data based on press detected by the press detection unit decreases.

According to a tenth aspect of the present invention, in the electronic device according to the sixth aspect, the control unit controls such that the amount of increasing/decreasing the parameter value according to the difference between the standard and the data based on press detected by the press detection unit differs, before and after the data based on press detected by the press detection unit turns from either increase or decrease to the other.

According to the present invention, in an electronic device, the portions on which the operator executes operations can be reduced and processing can be performed without displaying more than one objects dedicated to performing the processing as well.

BRIEF DESCRIPTION OF DRAWINGS

FIGS. 2A and 2B are diagrams each illustrating an example of a mounting structure of the electronic device according to the first embodiment of the present invention;

DESCRIPTION OF EMBODIMENTS

The above-described pinch-out and pinch-in operations are usually used in the case where the image displayed on the display unit is zoomed in or zoomed out.

Figure 48A:
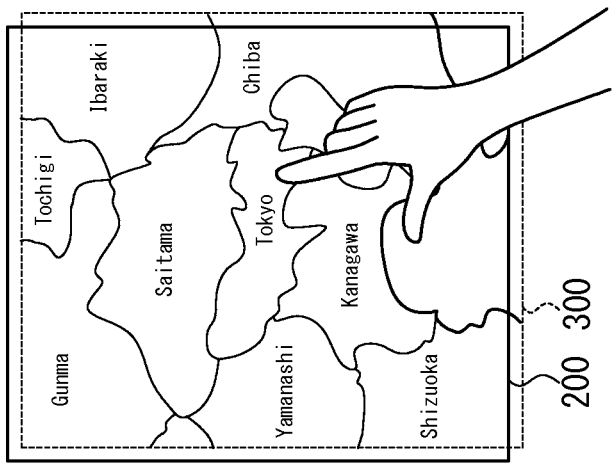
FIGS. 48A and 48B are schematic diagrams each illustrating an example of an electronic device with a conventional touch sensor.

For example, as illustrated in FIG. 48A, in an electronic device 100 in which a touch sensor 200 is overlaid on the front face side of the display unit 300, a wide-range map including Japan is displayed as an image on the display unit 300. For explanation, assume that this electronic device 100 is an electronic device for a pinching operation. In this electronic device 100, when a certain region of the map of Japan displayed as an image is zoomed in, the operator may, as illustrated in FIG. 48A, spread the two fingers that touch, in a pinching manner, the certain region that the operator wants to zoom in to execute a pinch-out operation. As a result thereof, as illustrated in FIG. 48B, as if following the motion of spreading two fingers, the certain region being touched, in a pinching manner, by the two fingers is zoomed in.

Figure 48B:
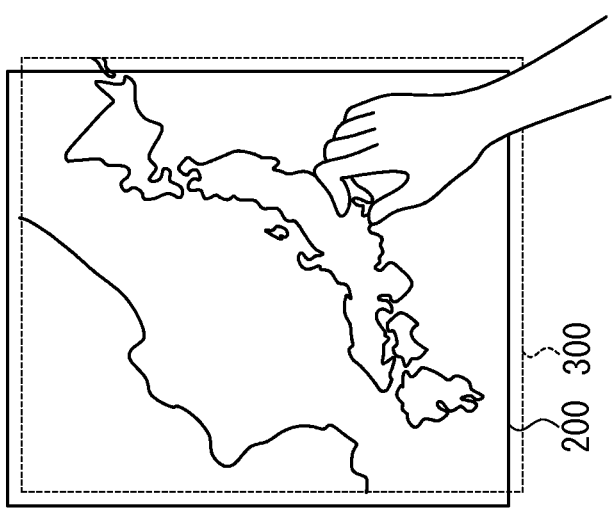

Further, in the electronic device 100, when the certain region displayed as an image is zoomed out, the operator may, as illustrated in FIG. 48B, pinch the two fingers that touch, in a pinching manner, the certain region that the operator wants to zoom out to execute a pinch-in operation. As a result thereof, as illustrated in FIG. 48A, as if following the motion of pinching two fingers, the certain region being touched, in a pinching manner, by the two fingers is zoomed out. Thus, by executing a pinching operation, the operator can zoom in or out an arbitrary region displayed on the display unit.

However, in this pinching operation, the operator needs to simultaneously touch two points on the touch sensor, thus it is impossible for the operator to execute this operation with one finger.

When the electronic device 100 is a relatively large device such as, for example, a tablet computer, while holding the housing of the electronic device 100 with one hand, the operator usually executes a pinching operation on the touch sensor with fingers of the other hand. On the other hand, when the electronic device 100 is a relatively small device such as a smart phone, while holding the housing of the electronic device 100 with one hand, the operator can execute operations such as a tap and the like on the touch sensor with a thumb and the like of the same hand. However, in this case, it is very difficult for the operator to, while holding the electronic device 100 with one hand, execute a pinching operation on the touch sensor with fingers of the same hand. This is because it is difficult for the operator to, while executing a pinching operation on the touch sensor with his/her thumb and index finger of one hand, hold the whole electronic device 100 stably with only middle, ring and little fingers of the same hand.

Thus, when executing a pinching operation on the electronic device, regardless of the size of the device, the operator usually needs to execute the operation using his/her left and right hands, and further, the operator may also need to execute operations using two or more fingers of the hand that executes the operation.

Figure 49B:
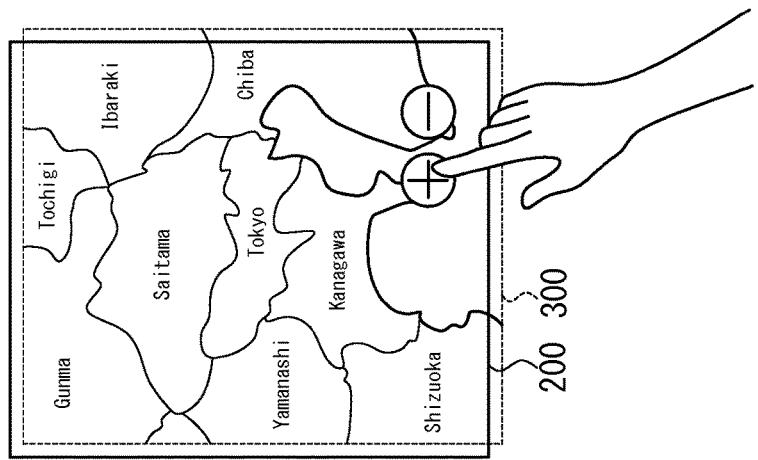
FIGS. 49A and 49B are schematic diagrams each illustrating another example of an electronic device with a conventional touch sensor.
Figure 49A:
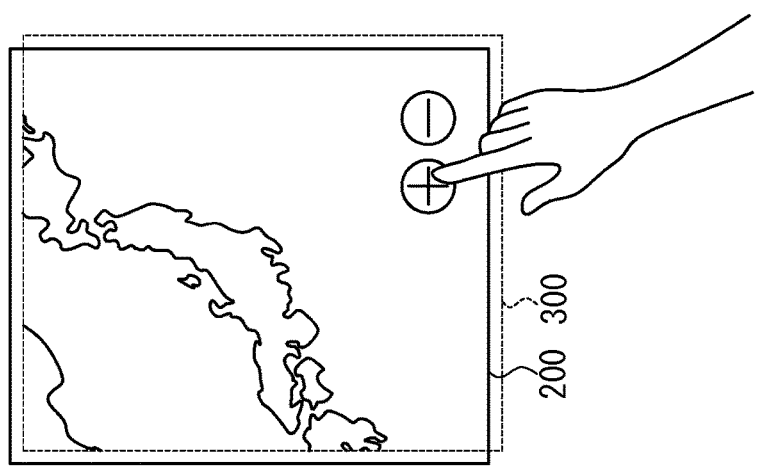

Thus, in order to reduce the portions on which the operator executes operations, that is, in order to allow an operation that does not require that many fingers of two, for example, as illustrated in FIG. 49, a dedicated object such as a button for zooming in and out the image displayed on the display unit may be provided. For example, as illustrated in FIG. 49A, in the electronic device 100 in which a touch sensor 200 is overlaid on the front face side of the display unit 300, a wide-range map including Japan is displayed as an image on the display unit 300. On the display unit 300 of the electronic device 100, objects of "+" button for zooming in the image and of "−" button for zooming out the image are displayed on the lower right region thereof.

As illustrated in FIG. 49A, the operator taps the position corresponding to "+" button on the touch sensor 200, thereby, as illustrated in FIG. 49B, zooming in the image displayed on the display unit 300. In addition, in a state illustrated in FIG. 49B, the operator taps the position corresponding to "−" button on the touch sensor 200, thereby, as illustrated in FIG. 49A, zooming out the image displayed on the display unit 300. Thus, if dedicated objects such as zoom-in and zoom-out buttons are provided, the portions on which the operator executes operations can be reduced. That is, in such an operation, if the electronic device 100 is compact, while holding the housing with one hand, the operator can execute operations with fingers of the same hand, and moreover, the operator can execute operations to the touch sensor with one finger.

However, if such dedicated objects such as zoom-in and zoom-out buttons are provided, these objects may occupy a part of the area of display region on the display unit 300. In the case of a relatively small device such as a smart phone, the area of display region is limited on the display unit, thus it is not preferable to display more than one dedicated objects on the display unit for performing such a specific process.

Each embodiment of the present invention will be described below with reference to the drawings. In each embodiment described below, as an example of the electronic device according to the present invention, a mobile phone, a smart phone or a tablet computer and the like are considered. However, the electronic device according to the present invention is not limited to mobile phones, smart phones, tablet computers and the like, and may be applied to any device with a touch sensor such as, for example, PDA. Further, the present invention is not limited to a portable type electronic device, and may be applied to any device with a touch sensor, such as, for example, bank ATM, ticket vending machines at stations and the like. Moreover, although the present invention is preferably applied to an electronic device with a touch sensor, as described later, the present invention is not limited to the device with a touch sensor, and may be applied to an electronic device with no touch sensor.

First Embodiment

Figure 1:
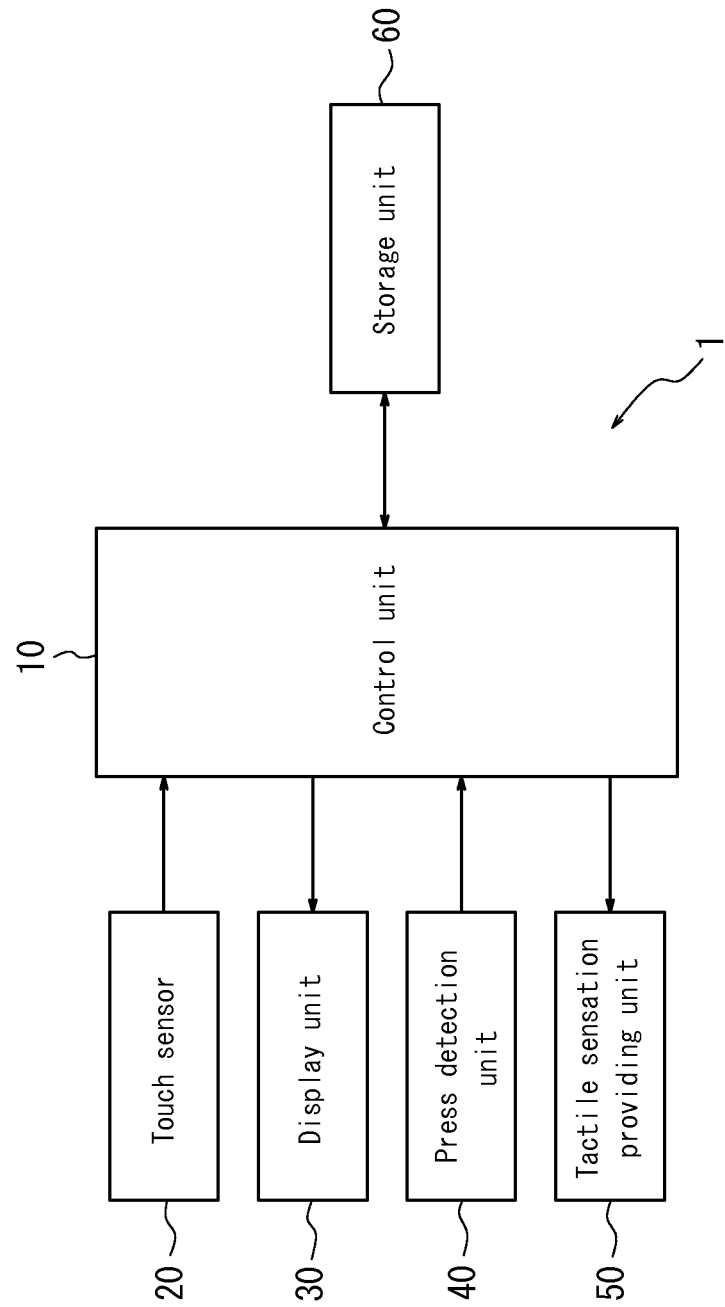
FIG. 1 is a function block diagram illustrating a schematic configuration of an electronic device according to a first embodiment of the present invention.

FIG. 1 is a block diagram illustrating a schematic configuration of an electronic device 1 according to a first embodiment of the present invention. As illustrated in FIG. 1, the electronic device 1 includes a control unit 10, a touch sensor 20, a display unit 30, a press detection unit 40, a tactile sensation providing unit 50 and a storage unit 60.

The control unit 10 controls and manages each function unit of the electronic device 1 as well as the whole electronic device 1. Among the processes performed by the control unit 10, processes related to the present embodiment will be described later.

The touch sensor 20 is usually superimposed on the front face of the display unit 30, and detects a contact by an operator's finger or a stylus pen (hereinafter referred to as "a contacting object"). The touch sensor 20 detects a contact by the contacting object, thereby outputting a signal corresponding to the position on which the contact is detected to the control unit 10. The touch sensor 20 is configured using, for example, a resistive film type or a capacitive type touch sensor. When the touch sensor 20 detects a contact by the contacting object, the contacting object does not need physically to touch the touch sensor 20. For example, when the touch sensor 20 is an optical type, the touch sensor 20 detects the position at which an infrared ray on the touch sensor 20 is blocked by the contacting object, and thus the contacting object does not need to touch the touch sensor 20.

The display unit 30 provides a display corresponding to each application and in addition to this, depicts and displays a user interface created by objects on a predetermined display region. Further, according to each application, the display unit 30 displays a variety of information such as input results. In the present embodiment, the display unit 30 displays an image such as a map, for example, by the application for performing zoom-in/zoom-out displays in the electronic device 1, as described later. The display unit 30 is configured using, for example, a liquid crystal display panel (LCD), an organic EL display panel and the like.

The press detection unit 40 detects a press when the operator executes operations on the touch sensor 20, and is configured using, for example, elements such as a strain gauge sensor or a piezoelectric element and the like that experiences a change in physical or electrical characteristics (strain, resistance, voltage, etc.) in response to a press. When the press detection unit 40 is configured using, for example, a piezoelectric element and the like, in the piezoelectric element of the press detection unit 40, the magnitude of voltage (voltage value (hereinafter referred to as data based on press)), that is, electrical characteristics, changes according to the magnitude of load (force) applied to a press on the touch sensor 20 (or the speed at which the magnitude of load (force) changes (acceleration)). Further, when the data based on press is equal to or greater than a predetermined threshold, the control unit 10 may control such that a predetermined process is executed based, for example, on an application.

When the press detection unit 40 notifies data based on press to the control unit 10, or the control unit 10 detects the data based on press from the press detection unit 40, the control unit 10 obtains the data based on press. That is, the control unit 10 obtains the data based on press on the touch sensor 20 from the press detection unit 40. The data based on press may, instead of a voltage value, be a magnitude of the load applied to the press, a power value, a resistance value and the like.

Further, the press detection unit 40 may be configured according to the contact detection type of the touch sensor 20. For example, when the touch sensor 20 is a resistive film type, the magnitude of resistance according to the size of the contact area or the region in which the magnitude of resistance changes and the like is associated with the load (force) of press on the touch face of the touch panel, and thus the press detection unit 40 may be configured without using a strain gauge sensor, a piezoelectric element and the like. Further, when the touch sensor 20 is a capacitive type, the magnitude of capacitance (electrical charge) according to the size of contact area or the region in which the magnitude of capacitance (electrical charge) changes and the like is associated with the load (force) of press applied to the touch panel, and thus the press detection unit 40 may be configured without using a strain gauge sensor, a piezoelectric element and the like.

The tactile sensation providing unit 50 vibrates the touch sensor 20, and is configured using, for example, a piezoelectric element, an ultrasonic transducer and the like. The tactile sensation providing unit 50 produces a vibration in a predetermined pattern, thereby providing a tactile sensation to the contacting object being in contact with the touch sensor 20. In the present embodiment, the tactile sensation providing unit 50 produces a vibration based on a drive signal supplied from the control unit 10.

The tactile sensation providing unit 50 vibrates the touch sensor 20 according to a press (a press on the touch sensor 20) detected by the press detection unit 40, thereby producing a vibration and providing a tactile sensation to the user's finger and the like so that the user applying a press to the touch sensor 20 may recognize in a sensory manner that an operation has been executed. The press detection unit 40 may be integrally configured with the tactile sensation providing unit 50. When the press detection unit 40 and the tactile sensation providing unit 50 are configured using a piezoelectric element, these units may share the piezoelectric element and be configured as a press detection unit and tactile sensation providing unit. This is because the piezoelectric element generates a voltage when a pressure is applied and deforms when a voltage is applied.

Further, the tactile sensation providing unit 50 may be configured, when the magnitude of voltage (voltage value (data)) of the piezoelectric element that also serves as the press detection unit 40 satisfies a predetermined threshold, to execute a predetermined process and to drive the piezoelectric element to produce a vibration as well. Here, "when the magnitude of voltage (voltage value (data)) of the piezoelectric element satisfies the predetermined threshold" may be "when the voltage value (data) reaches a predetermined standard," or "when the voltage value (data) exceeds the predetermined standard," or "when the voltage value (data) that is equal to the predetermined standard is detected."

The storage unit 60 may be configured using, for example, a NAND flash memory and the like, and can store not only a variety of applications to be executed by the electronic device 1 but also a variety of information. In the present embodiment, the storage unit 60 can store the position of contact detected by the touch sensor 20 at an arbitrary timing as well as the history of the contact position. In addition, in the present embodiment, the storage unit 60 can also store the data based on press detected by the press detection unit 40 at an arbitrary timing, and further, can store the history of the data based on press.

Next, the structural relationship between the above-described touch sensor 20 and the display unit 30 and between the press detection unit 40 and the tactile sensation providing unit 50 will be described.

FIG. 2 is a diagram illustrating an example of a configuration structure of the touch sensor 20, the display unit 30, the press detection unit 40 and the tactile sensation providing unit 50 of the electronic device 1 illustrated in FIG. 1. FIG. 2A is a cross-sectional view of certain parts, and FIG. 2B is a plan view of those parts.

As illustrated in FIG. 2A, the display unit 30 configured to execute a variety of displays is accommodated and held in the housing 90. On the display unit 30, the touch sensor 20 is held via the insulators 94 each formed by an elastic member. In the electronic device 1 according to the present embodiment, the display unit 30 and the touch sensor 20 are respectively rectangular in plan view. In FIG. 2, the touch sensor 20 is illustrated as a square, yet may be a rectangular and the like according to the specifications of the electronic device 1 on which the touch sensor 20 is mounted. Further, the electronic device 1 holds the touch sensor 20 to the display unit 30 via insulators 94 provided respectively at the four corners, away from a display region A of the display unit 30 illustrated in FIG. 2B by a phantom line.

Moreover, the housing 90 is provided with an upper cover 92, covering the surface region of the touch sensor 20, away from the display region of the display unit 30, and between the upper cover 92 and the touch sensor 20 is provided with insulators 96 formed by an elastic member.

In addition, in the touch sensor 20, for example, the surface, that is, the face on which the operator executes operations, is configured using a transparent film and the back face thereof is configured using glass, then when the operation face is pressed, the transparent film on the surface slightly flexes (bends) in response to the press.

Further, in the electronic device 1 according to the present embodiment, on top of the transparent film on the surface of the touch sensor 20, strain gauge sensors are respectively provided, via adhesive and the like, near each side covered by the upper cover 92, to detect a press applied to the touch sensor 20. In addition, on the glass face of the back face of the touch sensor 20, near the opposed two sides, piezoelectric elements or ultrasonic transducers and the like are respectively provided, via adhesive and the like, to vibrate the touch sensor 20. That is, in the electronic device 1 illustrated in FIG. 2, the press detection unit 40 illustrated in FIG. 1 is configured using four strain gauge sensors, and the tactile sensation providing unit 50 is configured using two transducers. The press detection unit 40 detects a press based on, for example, an average value of outputs from four strain gauge sensors. The tactile sensation providing unit 50 drives, for example, two transducers in phase. In FIG. 2B, the housing 90, the upper cover 92 and the insulator 96 illustrated in FIG. 2A are omitted.

Next, a process by the electronic device 1 according to the present embodiment will be described.

As a concrete example for describing a process according to the present embodiment, an example of executing an application that can zoom-in/zoom-out a map based on the operator's operation in the electronic device 1 is described. That is, a case the operator executes operations to the touch sensor 20 of the electronic device 1 to zoom in/out the map displayed on the display unit 30 is described below.

In the present embodiment, first, a standard for data based on press is set based on a predetermined operation by the operator, and when the standard is set, the electronic device 1 moves to the zoom mode.

Figure 3:
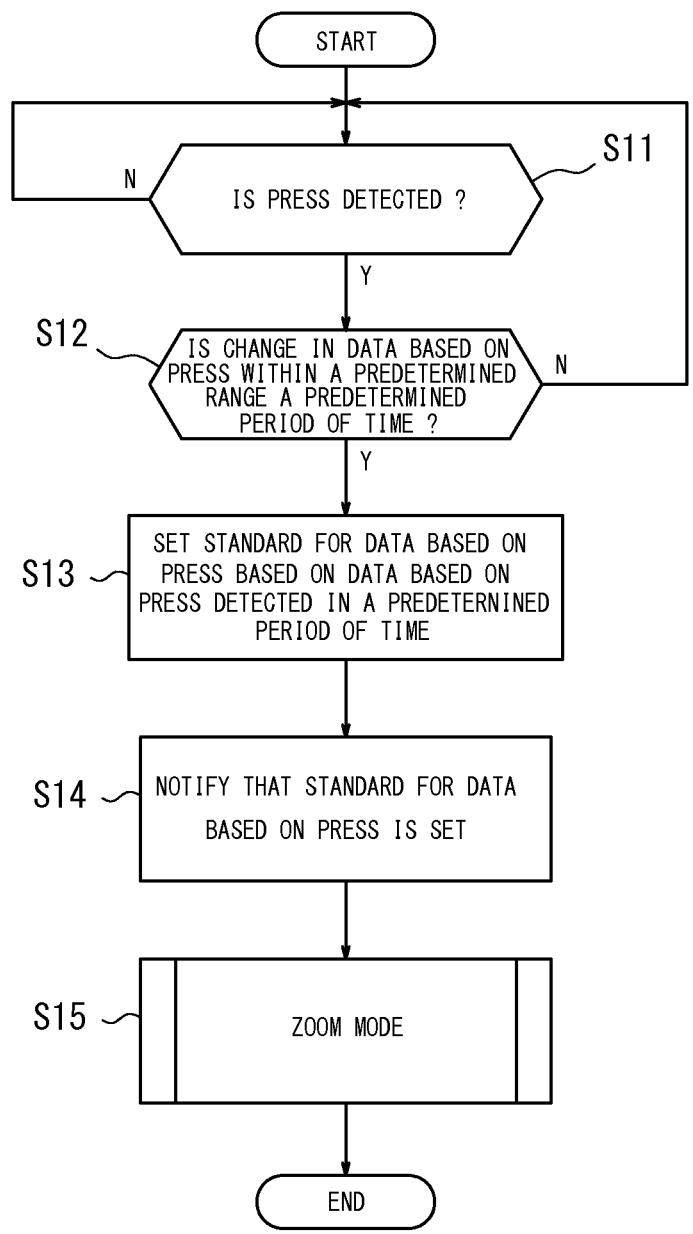
FIG. 3 is a flowchart illustrating a process for setting a standard for data based on press according to the first embodiment.

FIG. 3 is a flowchart describing a process including setting of a standard for data based on press according to the present embodiment. First, setting of a standard for data based on press according to the present embodiment will be described. The "standard for data based on press" is a standard that is set based on the data based on press by the operator's operation, and based on the data based on press, zoom-in/zoom-out of a map is performed in the subsequent processes. Therefore, when setting a standard for data based on press, it is preferable that the data based on press by the operator when he/she presses the touch sensor 20 with a medium-intensity force, which is neither too strong nor too weak, is set as the "standard for data based on press". Thus, in the present embodiment, when the state, in which the operator applies a press without moving the position of his/her finger executing operations on the touch sensor 20, is kept for a predetermined period of time, the "standard for data based on press" is set. Note that, when the "standard for data based on press" is set, even if the position of the finger and the like executing operations on the touch sensor 20 moves, the "standard for data based on press" may be set.

When the process according to the present embodiment is started, the control unit 10 monitors a contact detected by the touch sensor 20 as well as a press detected by the press detection unit 40 (step S11). In the present embodiment, the control unit 10 preferably monitors, while storing the history of change in the data based on press detected by the press detection unit 40 in the storage unit 60.

When the press detection unit 40 detects a press in step S11, the control unit 10 determines whether or not the change in the data based on press remains in a predetermined range for a predetermined period of time (step S12). In this case, if the "predetermined period of time" is too short, a standard for data based on press may be set before the operator executes operations of appropriately keeping a press. In addition, if the "predetermined period of time" is too long, it takes a time to set a standard for data based on press, and the operability of the electronic device 1 may deteriorate. Thus it is preferable that, an appropriate period of time such as, for example, about 1 second that corresponds to "a long press" of a normal button, is set, and after the setting, the period of time is changed appropriately according to the operator's preference.

Further, the change in the data based on press remains in a "predetermined range" means that, by keeping a press by the operator, there is a small change or there is almost no change in the data based on press detected by the press detection unit 40. When the control unit 10 determines whether or not the change in the data based on press remains in the predetermined range, for example, the control unit 10 may determine whether or not the amount of change per micro time is almost zero, based on the history of the data based on press stored in the storage unit 60. In this case, it is unlikely that the amount of change in data based on press per micro time is kept strictly to zero, thus the control unit 10 may determine whether or not the change in the data based on press per micro time remains in a predetermined width, by taking a margin of the predetermined width into consideration. That is, in order to determine that a differential coefficient in the change over time of the data based on press is close to zero, the control unit 10 may preferably determine that the differential coefficient becomes a small value, which is almost zero. Moreover, when the control unit 10 determines whether or not the change in the data based on press remains in the predetermined range, for example, it may determine whether or not the difference in values between the maximum value and the minimum value of the data based on press in the above-described "predetermined period of time" is equal to or less than the predetermined threshold. In this case, when the above-described difference in values is equal to or less than the predetermined threshold, the control unit 10 may determine that the change in the data based on press remains in the predetermined range.

Figure 4:
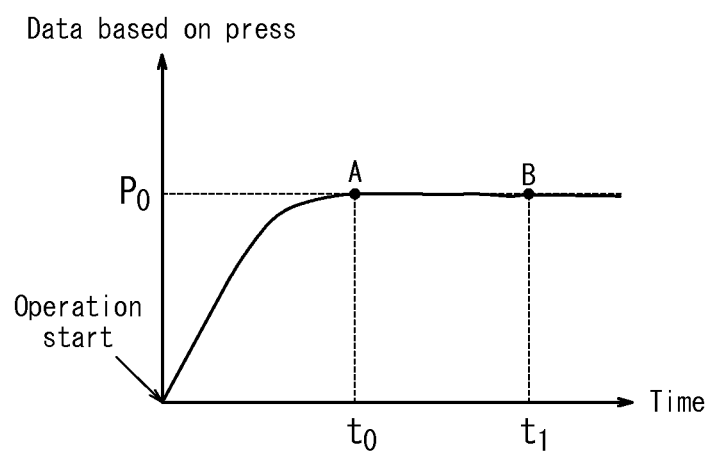
FIG. 4 is a graph illustrating an example of change over time in the data based on press by the operator's operation according to the first embodiment.

FIG. 4 is a graph illustrating an example of change over time in the data based on press by the operator's operation. In FIG. 4, the horizontal axis represents a passage of time and the vertical axis represents the data based on press detected by the press detection unit 40. FIG. 4 illustrates a state in which, the operator starts pressing the touch sensor 20 (operation start), executes operations to gradually increase the press and to keep the press substantially constant ($P_0$) for a predetermined period of time (from points A to B, that is, from $t_0$ to $t_1$).

In step S12, when it is determined that the change in the data based on press does not remain in the predetermined range for the predetermined period of time, the control unit 10 returns to step S11 to continue the process. On the other hand, when it is determined that the change in the data based on press remains in the predetermined range for the predetermined period of time in step S12, the control unit 10 sets a standard for data based on press, based on the data based on press detected during the predetermined period of time (step S13). That is, in the present embodiment, the control unit 10 controls, if the change in the data based on press detected by the press detection unit 40 remains in the predetermined range for the predetermined period of time, such that, based on the data based on press detected within the predetermined period of time, a standard for data based on press is set. In the example illustrated in FIG. 4, it is determined that the change in the data based on press remains in the predetermined range for the predetermined period of time, and thus a standard ($P_0$) for data based on press is set at $t_1$ When a standard for data based on press is set, the control unit 10 may calculate an average value of the data based on (almost constant) press detected, for example, in the predetermined period of time (i.e., $t_0$ to $t_1$). Further, when the standard for data based on press is calculated, calculation is not limited to the above-described average value, and a variety of calculations may be performed. For example, the data based on press at the moment when the change in the data based on press is determined to remain in the predetermined range for the first time, that is, the data based on press at $t_0$ (data based on press at point A) illustrated in FIG. 4, may be set as a standard for data based on press. In addition, for example, the data based on press at the moment when the change in the data based on press is determined to remain in the predetermined range for the predetermined period of time, that is, the data based on press at $t_1$ illustrated in FIG. 4 (data based on press at point B), may be set as a standard for data based on press.

When a standard for data based on press is set in step S13, the control unit 10 controls a corresponding function unit to notify the operator that the standard for data based on press has been set (step S14). In step S14, when the predetermined period of time passes after the change in the data based on press remains in the predetermined range, the operator is notified that the standard for data based on press has been set. Thus, the control unit 10 may control the tactile sensation providing unit 5, for example, to vibrate the touch sensor 20 to provide a tactile sensation to the operator. Further, instead of a tactile sensation, or with a tactile sensation, for example, display on the display unit 30 may be changed, or a predetermined sound may be outputted from a sound output unit not illustrated, thereby notifying the operator that a standard for data based on press has been set. In FIG. 4, at $t_1$ (point B), a standard for data based on press is set, and the operator is notified that the standard for data based on press has been set as well.

When the operator is notified that the standard for data based on press has been set in step S14, the control unit 10 moves to the zoom mode and controls such that an image displayed on the display unit 30 is zoomed in or out according to the adjustment of the operator's press (step S15). This zoom mode will be described later. The notification of setting the standard for data based on press performed in step S13 may, for the operator, be construed as a notification informing that the mode moves to the zoom mode.

In the step prior to move to the zoom mode in step S15, it is preferable that, along with the process illustrated in FIG. 3, a process is performed so that an operation similar to that when the operator operates an electronic device provided with a conventional touch sensor may be performed. For example, until the step moves to the zoom mode in step S15, it is preferable that, for example, when a sliding operation on the touch sensor 20 is detected, the control unit 10 controls such that, in order to follow the sliding operation, an image displayed on the display unit 30 slides as well. Such a process may be the similar process to that for an electronic device with a touch sensor according to a conventional art, and thus the detailed description thereof is omitted.

Figure 5:
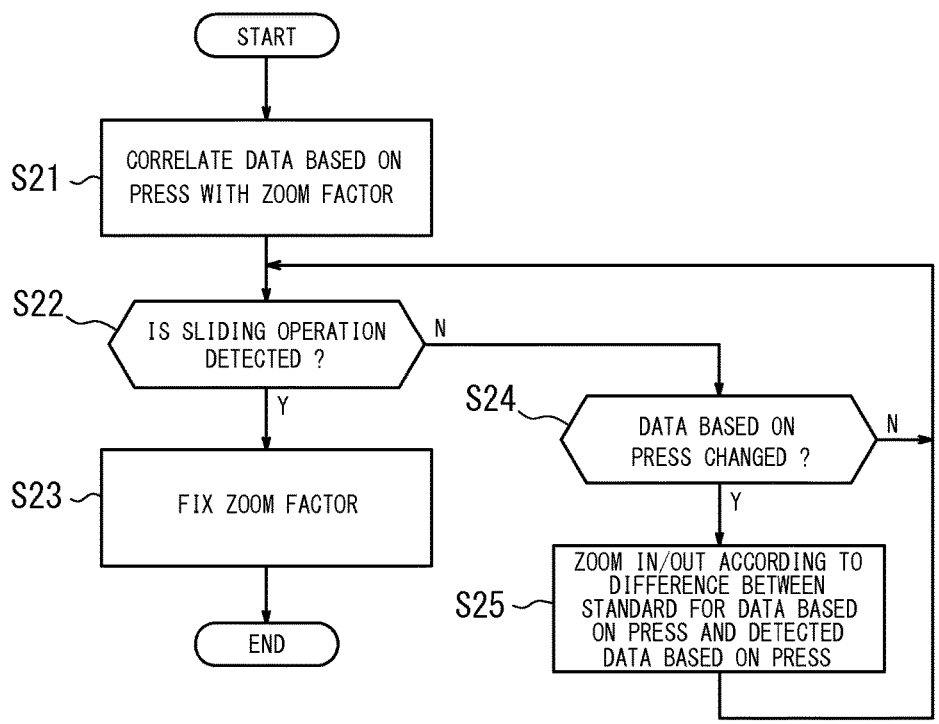
FIG. 5 is a flowchart illustrating a process in a zoom mode according to the first embodiment.

FIG. 5 is a flowchart illustrating a process performed in the zoom mode as step S15 in FIG. 3.

When the process in the zoom mode illustrated in FIG. 5 is started, first, the control unit 10 controls such that the data based on press is correlated with the zoom factor (step S21). In step S21, the control unit 10 sets previously, according to the data based on press detected by the press detection unit 40, the zoom factor of the image displayed on the display unit 30. In this case, for simplification of description, an example where the data based on press is previously correlated with a zoom factor is described. However, for example, when a press is detected by the press detection unit 40, the control unit 10 may calculate the correlation between the detected data based on press and the zoom factor in each case.

Figure 6:
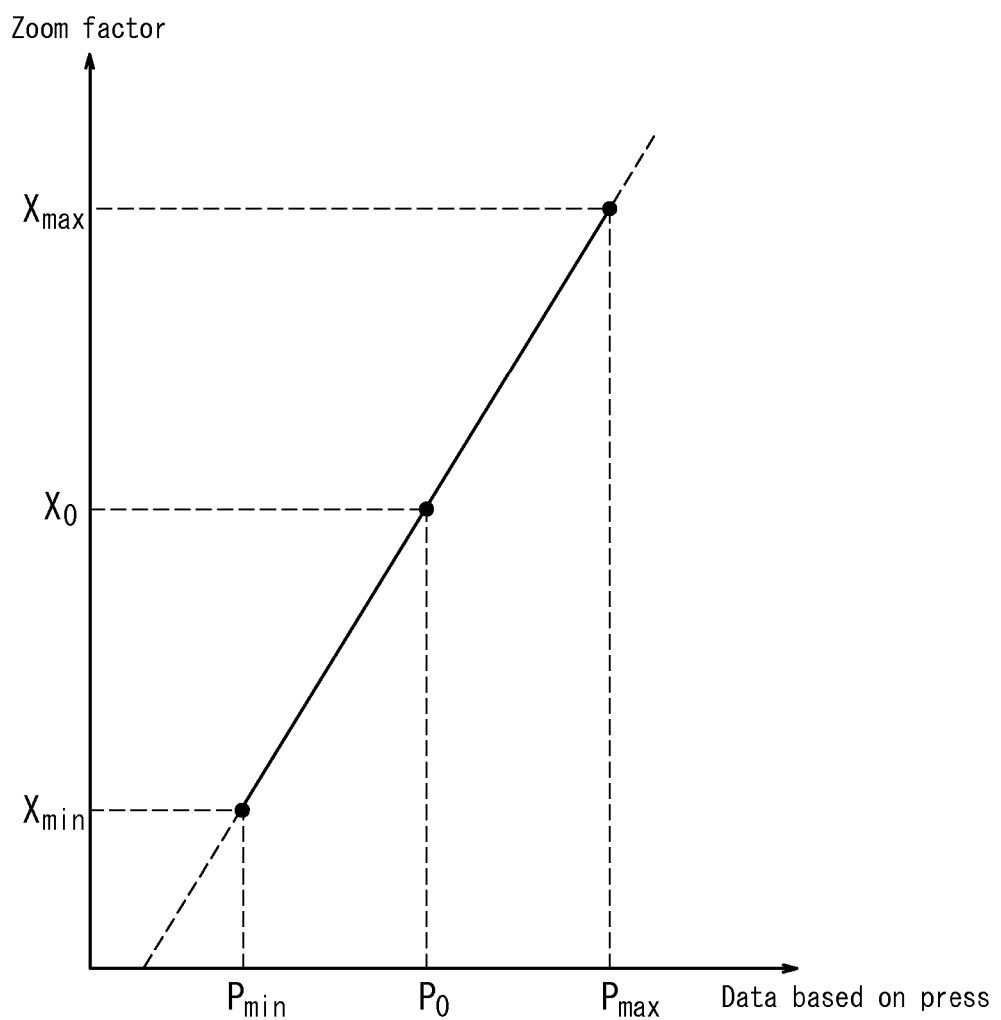
FIG. 6 is a graph illustrating an example of correlation between the data based on press and the zoom factor according to the first embodiment.

FIG. 6 is a graph illustrating an example of correlation between the data based on press and the zoom factor illustrated in step S21 in FIG. 5. As illustrated in FIG. 6, in step S21, the control unit 10 controls such that, based on the standard ($P_0$) for data based on press set in step S13 in FIG. 3, the data based on press (P) is correlated with the zoom factor (X). In FIG. 6, the horizontal axis represents the data based on press (P) and the vertical axis represents the zoom factor (X). $P_{max}$ on the horizontal axis represents data based on a maximum press that can be detected by the press detection unit 40, and $P_{min}$ represents a data based on a minimum press that can be detected by the press detection unit 40.

In general, the data based on the maximum or the minimum press that can be detected by the press detection unit 40 is determined by various conditions such as physical characteristics, arrangement and the like of the press detection unit 40. However, $P_{max}$ may be, for example, a value of data based on press that is slightly smaller than the maximum press that can practically be detected by the press detection unit 40, and in a similar manner, $P_{min}$ may be, for example, a value of data based on press that is slightly greater than the minimum press that can practically be detected by the press detection unit 40. That is, $P_{max}$ and $P_{min}$ may be values set in a range in which the press detection unit 40 can accurately and reliably detect data based on press.

Further, $X_{max}$ on the vertical axis represents a maximum zoom-in factor for zooming in an image displayed on the display unit 30, and $X_{min}$ represents a minimum zoom-out factor for zooming out an image displayed on the display unit 30. Moreover, $X_0$ is a standard for zoom factor, and represents a zoom factor of an image displayed on the display unit 30 when a standard $P_0$ for data based on press is set. These $X_{max}$ and $X_{min}$ may be determined by an image displayed on the display unit 30 or by an application and the like.

In the present embodiment, as a concrete example of correlation between the data based on press and the zoom factor, the change in the data based on press from $P_{min}$ to $P_0$ is correlated with the linear change in the zoom factor from $X_{min}$ to $X_0$. In a similar manner, in the present embodiment, the change in the data based on press from $P_0$ to $P_{max}$ is correlated with the linear change in the zoom factor from $X_0$ to $X_{max}$. In addition, for simplification of description, FIG. 6 illustrates an example where, in step S13 in FIG. 3, a standard $P_0$ for data based on press is set at just an intermediate point between $P_{max}$ and $P_{min}$. Therefore, in step S13 in FIG. 3, when the standard $P_0$ for data based on press is not set in the intermediate point between $P_{max}$ and $P_{min}$, the graph in FIG. 6 illustrating a correlation does not form a linear pattern, and the slope of the graph changes at around $P_0$. Such an example will be described later.

In step S21 in FIG. 5, after the data based on press is correlated with the zoom factor as illustrated in FIG. 6, the control unit 10 determines whether or not the position of contact detected by the touch sensor 20 has been changed, that is, whether or not a sliding operation by the operator has been detected (step S22). In this case, so as not to be determined that a sliding operation has not been detected when the change in the position of contact detected by the touch sensor 20 is extremely small, the control unit 10 may preferably determine that the sliding operation has been detected when the position of contact has changed over a predetermined distance.

When the sliding operation is detected in step S22, the control unit 10 sets the zoom factor of the image displayed on the display unit 30 at that point in time as a fixed value (step S23) and exits the zoom mode. That is, in the zoom mode illustrated in FIG. 5, when the sliding operation by the operator is detected on the touch sensor 20, the image displayed on the display unit 30 at that point in time is controlled such that it is neither zoomed in nor out until the mode is moved to the zoom mode again.

When the sliding operation is not detected in step S22, the control unit 10 determines whether or not the data based on press detected by the press detection unit 40 has changed (step S24). If it is not determined that the data based on press has changed in step S24, the control unit 10 returns to step S22 and continues the process. On the other hand, if it is determined that the data based on press has changed in step S24, the control unit 10 controls such that the image displayed on the display unit 30 is zoomed in or out (step S25), according to the difference between the standard $P_0$ for data based on press and the data based on press P detected by the press detection unit 40. For example, when the data based on press P detected by the press detection unit 40 is slightly smaller than the standard $P_0$ for data based on press, the difference between $P_0$ and P is small, and thus the control unit 10 controls such that the image displayed on the display unit 30 is slightly zoomed out. Also, for example, when the data based on press P detected by the press detection unit 40 is significantly greater than the standard $P_0$ for data based on press, the difference between $P_0$ and P is large, and thus the control unit 10 controls such that the image displayed on the display unit 30 is significantly zoomed in.

In this manner, in the present embodiment, when a standard for data based on press is set, the control unit 10 controls such that the parameter value associated with a predetermined process increases/decreases, according to the difference between the standard that has been set and the data based on press detected by the press detection unit 40. In this case, the "predetermined process" corresponds, in this example, to the process in which the image displayed on the display unit 30 is zoomed in or out, and in addition thereto, it may be a variety of processes according to the application executed by the electronic device 1. Further, in this example, the "parameter value" corresponds to the value of zoom factor for zooming in/out an image, and also in this case, it may be a variety of parameter values according to the application executed by the electronic device 1. After step S25, the control unit 10 returns to step S22 and continues the process.

Figure 7:
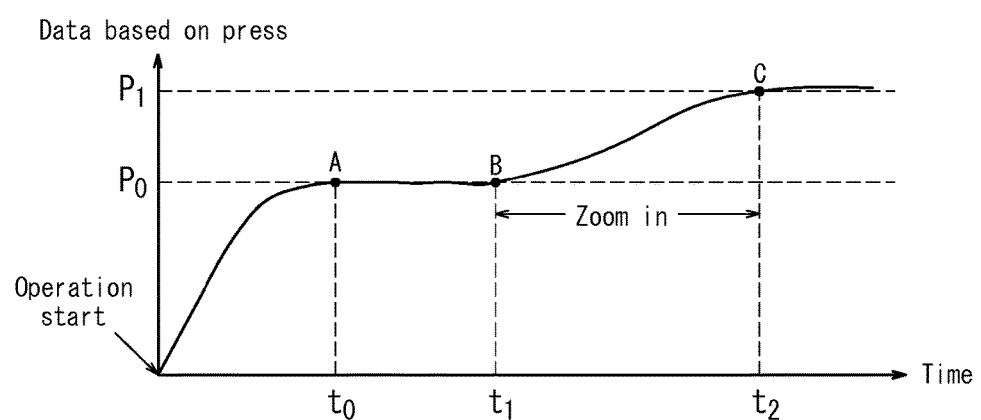
FIG. 7 is a graph illustrating another example of change over time in the data based on press by the operator's operation according to the first embodiment.

FIG. 7 is, as FIG. 4, a graph illustrating an example of change over time in the data based on press by the operator's operation. In FIG. 7, as described in FIG. 4, after point B, that is, after a standard for data based on press is set, increase in the data based on press by the operator's operation is detected up to point C. In this case, from time $t_1$ to $t_2$, as illustrated in FIG. 7, as the data based on press detected by the press detection unit 40 increases based on $P_0$ as a standard, an image displayed on the display unit 30 is zoomed in. After time $t_2$, that is, after point C, the data based on press detected by the press detection unit 40 is kept substantially constant at value $P_1$, however, if the sliding operation is detected at this point of time, a zoom factor is fixed to that at the point in time. That is, in this case, the image displayed on the display unit 30 is neither zoomed in nor out. Thereafter, if a press on the touch sensor 20 by the operator's operation is kept for a predetermined period of time again, a standard for data based on a new press is set, and the image displayed on the display unit 30 can be zoomed in or out again based on the image displayed on the display unit 30 at the point in time.

Figure 8:
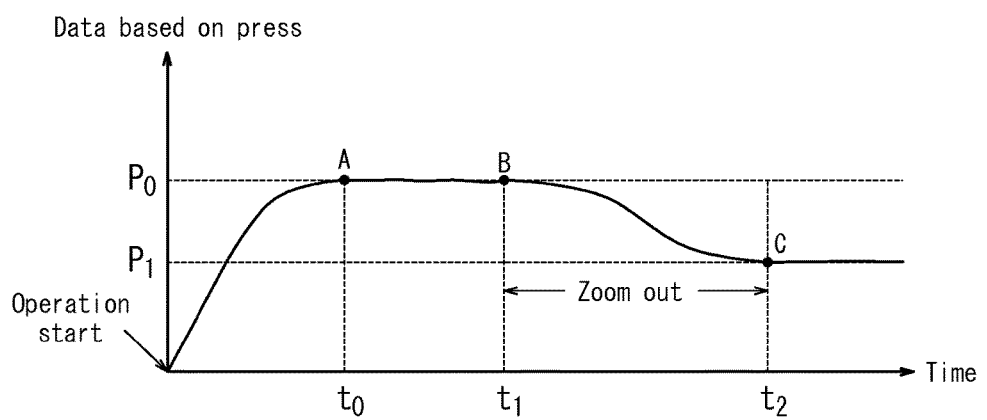
FIG. 8 is a graph illustrating still another example of change over time in the data based on press by the operator's operation according to the first embodiment.

As FIG. 4, FIG. 8 is also a graph illustrating another example of change over time in the data based on press by the operator's operation. In FIG. 8, after point B, that is, after a standard for data based on press is set, decrease in the data based on press by the operator's operation is detected up to point C. In this case, from $t_1$ to $t_2$, as illustrated in FIG. 8, as the data based on press detected by the press detection unit 40 decreases based on $P_0$ as a standard, the image displayed on the display unit 30 is zoomed out.

Figure 9:
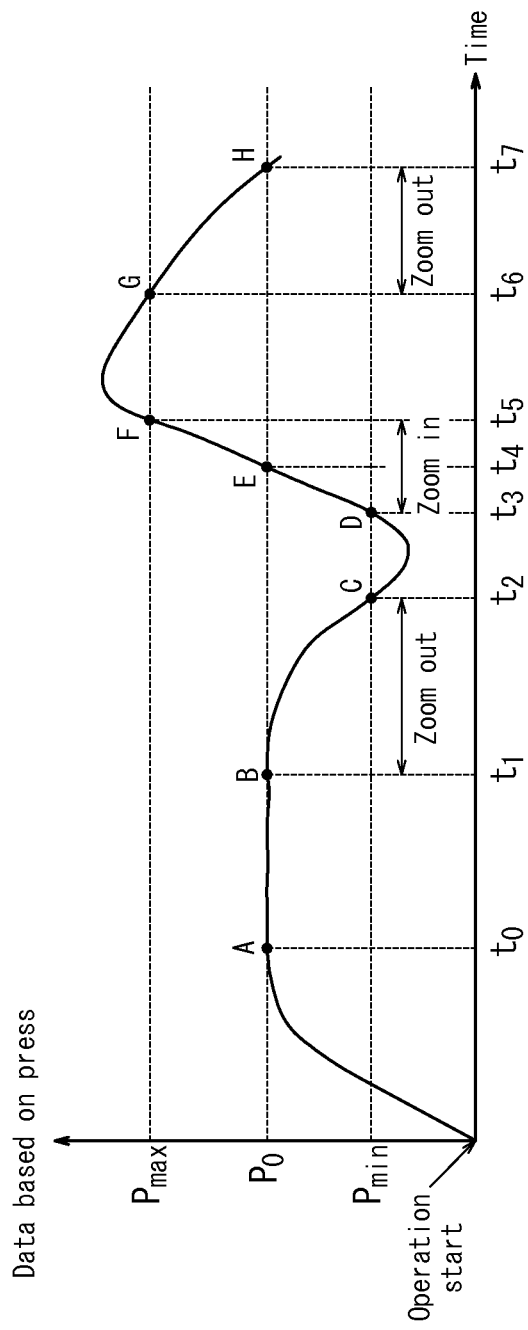
FIG. 9 is a graph illustrating yet another example of change over time in the data based on press by the operator's operation according to the first embodiment.

As FIG. 4, FIG. 9 is also a graph illustrating still another example of change over time in the data based on press by the operator's operation. In FIG. 9, after point B, that is, after a standard for data based on press is set, decrease in the data based on press by the operator's operation is detected up to point C. After that, the data based on press turns from decrease to increase, and increases up to point F via point E, then after that, turns from increase to decrease and decreases up to point H.

In this case, as illustrated in FIG. 9, the image displayed on the display unit 30 is zoomed out from $t_1$ to $t_2$, the image displayed on the display unit 30 is zoomed in from $t_3$ to $t_5$, and the image displayed on the display unit 30 is zoomed out again from $t_6$ to $t_7$. At $t_4$, the zoom factor returns to that at the time when the standard for data based on press is set. That is, at point E, the image is displayed at a zoom factor that is the same as that when the standard for data based on press is set. Further, from $t_2$ to $t_3$ and from $t_5$ to $t_6$, the data based on press changes, however, it exceeds the data based on the maximum press $P_{max}$ or falls below the data based on the minimum press $P_{min}$ that can be detected by the press detection unit 40, and thus neither zoom-in nor zoom-out is performed.

Figure 10:
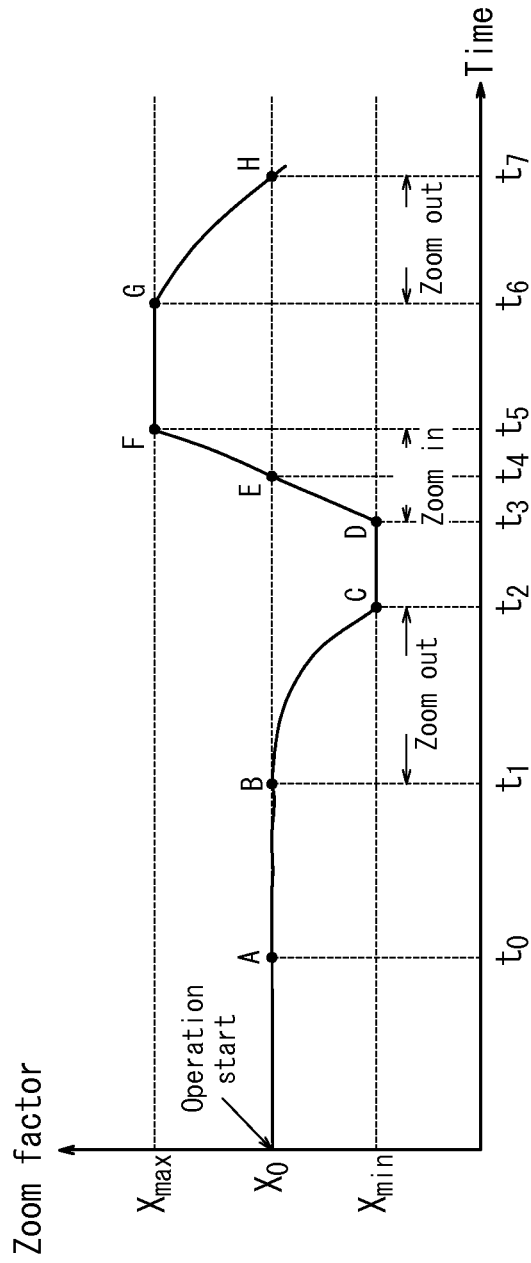
FIG. 10 is a graph illustrating an example of changes over time in the zoom factor in response to the operator's operation according to the first embodiment.

FIG. 10 is a graph illustrating the change over time in the zoom factor of the image displayed on the display unit 30 when the data based on press changes over time as illustrated in FIG. 9. Note that, in FIG. 10, the horizontal axis represents passage of time, however, the vertical axis represents a zoom factor of the image displayed on the display unit 30.

Comparing FIG. 9 with FIG. 10, the time from the operation starting point to $t_1$, that is, until the time when the standard for data based on press is set, the mode is not shifted to the zoom mode yet, which indicates that, although the data based on press changes, the zoom factor does not change from the standard. Also, as described above, although the data based on press changes from $t_2$ to $t_3$ and from $t_5$ to $t_6$, the zoom factor does not change.

FIG. 11 is a diagram illustrating a concrete example of a display on the display unit 30 when the operator executes operations to the electronic device 1 according to the present embodiment.

Figure 11A:
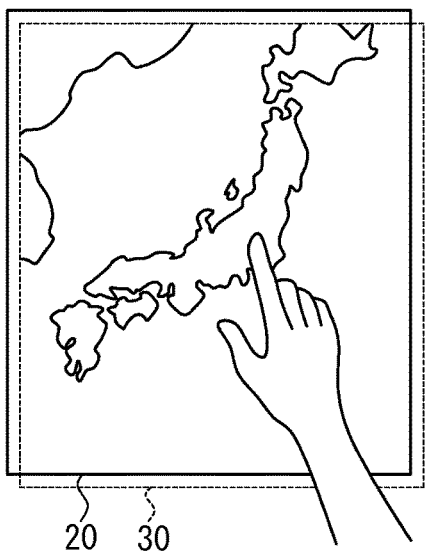
FIGS. 11A to 11D are diagrams each illustrating a concrete example of a result of the process according to the first embodiment.

As illustrated in FIG. 11A, before the standard for data based on press is set, that is, in the stage prior to moving to the zoom mode, the operator executes a sliding operation to the touch sensor 20, thereby arbitrarily sliding the map of Japan displayed on the display unit 30. Further, by keeping the position of the contact by the operator and the press on the arbitral position of the touch sensor 20 for a predetermined period of time, a standard for data based on press is set and the electronic device 1 moves to the zoom mode.

Figure 11B:
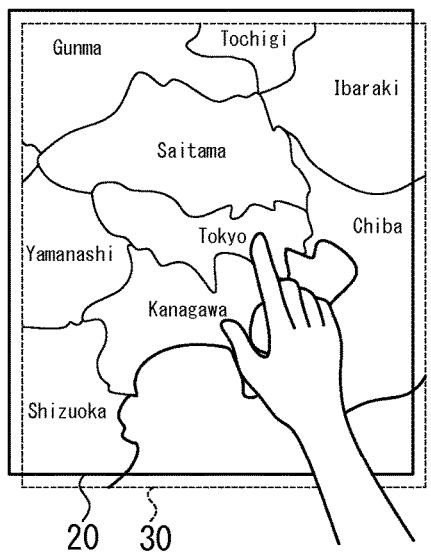
Figure 11C:
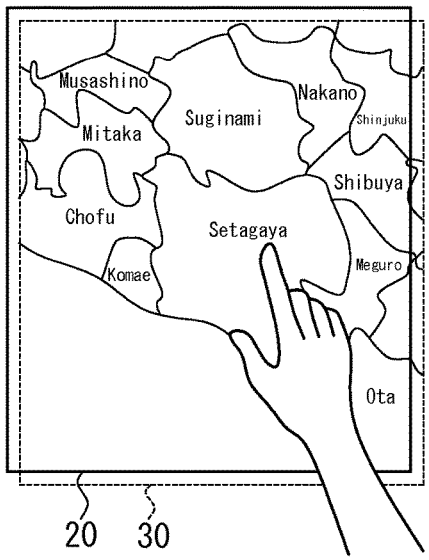

After that, if the operator increases the press by which the touch sensor 20 is operated, as illustrated in FIGS. 11A and 11B, the image of the map of Japan displayed on the display unit 30 is zoomed in centering on the position operated by the operator. Similarly, when the operator further increases the press by which the touch sensor 20 is operated, as illustrated in FIGS. 11B and 11C, the image of the map of Japan displayed on the display unit 30 is further zoomed in centering on the position operated by the operator. In this case, in the electronic device 1 according to the present embodiment, the operator executes operations on an arbitral position on the touch sensor 20, thereby moving to the zoom mode. Therefore, additional steps such as previous setting of desired zoom-in or zoom-out position or previous sliding thereof to the center of the display unit 30 is not necessary.

Figure 11D:
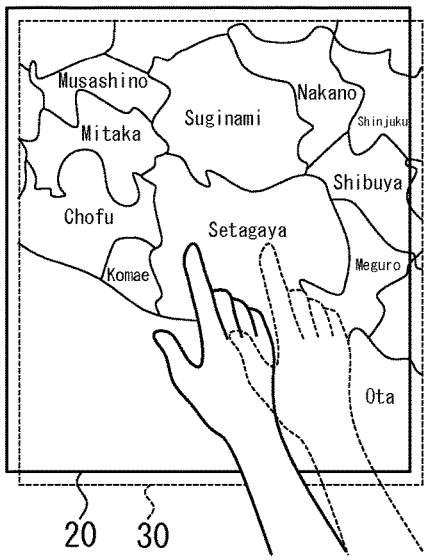

Further, during continuation of the zoom mode, when the operator decreases the press by which the touch sensor 20 is operated in the state as illustrated in FIG. 11C, the image of the map of Japan displayed on the display unit 30 is zoomed out centering on the position operated by the operator, as illustrated in FIG. 11B. When the operator further decreases the press by which the touch sensor 20 is operated in the state as illustrated in FIG. 11B, the image of the map of Japan displayed on the display unit 30 is further zoomed out centering on the position operated by the operator, as illustrated in FIG. 11A, On the other hand, during continuation of the zoom mode, when the sliding operation by the operator to the touch sensor 20 is detected in the state illustrated in FIG. 11C, the image displayed on the display unit 30 is not slid, and the zoom factor of the image is fixed, as illustrated in FIG. 11D. Thus, as illustrated in FIG. 11D, after the operator executes a sliding operation to the touch sensor 20, even if he/she releases his/her finger from the touch sensor 20 and the press is decreased, the image of the display unit 30 is not zoomed out.

In this manner, according to the present embodiment, if the housing of the electronic device is compact, the operator can, while holding the electronic device with one hand, execute a zoom operation and the like that is similar to the conventional pinching operation, using the tip of the same hand. Further, according to the present embodiment, regardless of the size of the electronic device, operations to the touch sensor 20 may be executed with only one finger, that is, with only a press on one portion. Further, according to the present embodiment, operation can be started at an arbitrary position on the touch sensor 20, and thus the operation can be executed smoothly with less operation steps. Moreover, according to the present embodiment, it is not necessary to display a dedicated object for performing a process such as zoom in or out on the display unit, and thus the display region on the display unit can effectively be utilized.

Second Embodiment

Next, an electronic device according to the second embodiment of the present invention will be described.

In the second embodiment, the process by the control unit 10 described in the first embodiment is modified. That is, in the second embodiment, the process of step S25 described in FIG. 5 differs from that of the electronic device 1 according to the first embodiment. In greater detail, in the electronic device 2 according to the second embodiment, in the zoom mode, a speed at which the image displayed on the display unit 30 is zoomed in or out is changed, according to the difference between the standard $P_0$ for data based on press and the data based on a press P detected by the press detection unit 40.

Excepting the above-described points, the electronic device 2 according to the second embodiment may be realized by the device configuration and the control that are basically similar to those of the electronic device 1 described in the above-described first embodiment. Thus, the descriptions that would overlap those described in the first embodiment are appropriately omitted.

Figure 12:
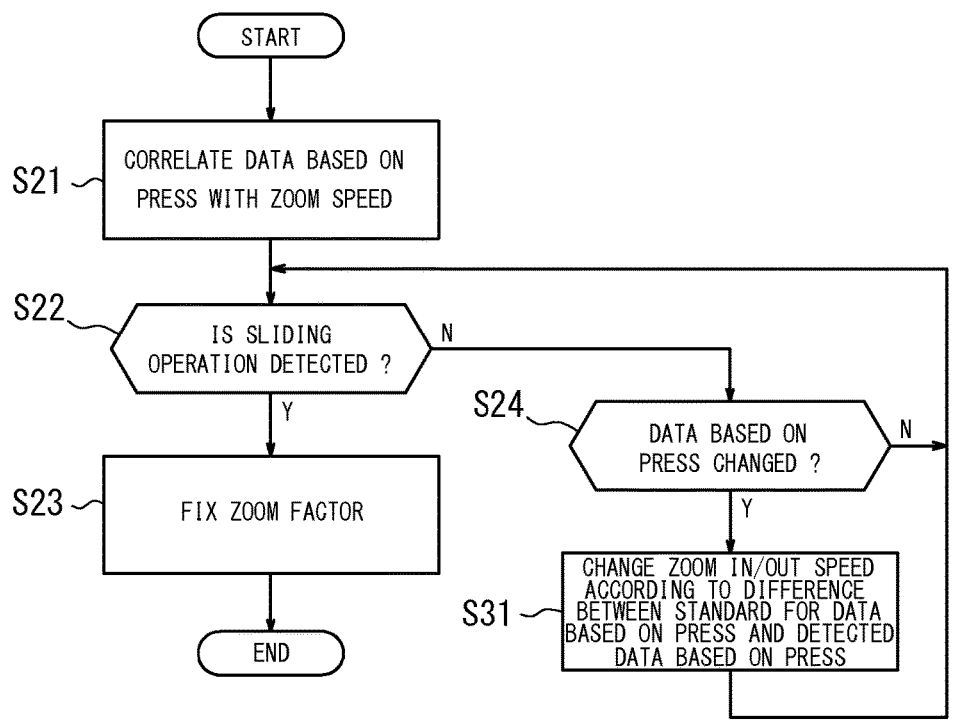
FIG. 12 is a flowchart illustrating a process in a zoom mode according to a second embodiment.

FIG. 12 is a flowchart describing a process by the electronic device 2 according to the second embodiment. As in the case of FIG. 5 described in the first embodiment, FIG. 12 is a flowchart describing a process performed in the zoom mode illustrated in step S15 in FIG. 3 after a standard for data based on press is set. In the above-described first embodiment, in step S21, "correlation between the data based on press and the zoom factor" is performed. In the second embodiment, unlike the first embodiment, "correlation between the data based on press and the zoom speed" is performed in step S21. In the second embodiment, after the data based on press (P) is correlated with the zoom speed in step S21, if the sliding operation is not detected in step S22 and the data based on press detected by the press detection unit 40 changes in step S24, the control unit 10 performs a process of step S31

In the above-described first embodiment, the control unit 10 controls such that the image displayed on the display unit 30 is zoomed in or out (step S25), according to the difference between the standard $P_0$ for data based on press and the data based on press P detected by the press detection unit 40. However, in the second embodiment, the control unit 10 controls such that the speed at which the image displayed on the display unit 30 is zoomed in or out is changed is altered (step S31), according to the difference between the standard $P_0$ for data based on press and the data based on press P detected by the press detection unit 40. For example, when the data based on press P detected by the press detection unit 40 is slightly smaller than the standard $P_0$ for data based on press, the difference between $P_0$ and P is small, and thus the control unit 10 controls such that the image displayed on the display unit 30 is zoomed out at a relatively low speed. Or, for example, when the data based on press P detected by the press detection unit 40 is significantly greater than the standard $P_0$ for data based on press, the difference between $P_0$ and P is large, and thus the control unit 10 controls such that the image displayed on the display unit 30 is zoomed in at a relatively high speed. In the first embodiment, when a press is kept in the zoom mode, neither zoom-in nor zoom-out is performed. On the other hand, in the second embodiment, even if the data based on press that is greater or smaller than the standard for data based on press is kept in the zoom mode, zoom in or out is performed according to the difference between the standard $P_0$ for data based on press and the data based on press P detected by the press detection unit 40.

Thus, in the present embodiment, the control unit 10 controls, when a standard for data based on press is set, so that the speed at which the parameter value associated with a predetermined process is changed is altered, according to the difference between the standard that has been set and the data based on press detected by the press detection unit 40. In order to control in this manner, in the present embodiment, as described above, in step S21, the data based on press detected by the press detection unit 40 is correlated with the speed at which the image displayed on the display unit 30 is zoomed in or out. For example, the data based on press P that is slightly greater than the standard $P_0$ for data based on press is correlated with the speed at which the image is zoomed in relatively slowly, and the data based on press P that is significantly smaller than the standard $P_0$ for data based on press is correlated with the speed at which the image is zoomed out relatively fast.

Figure 13:
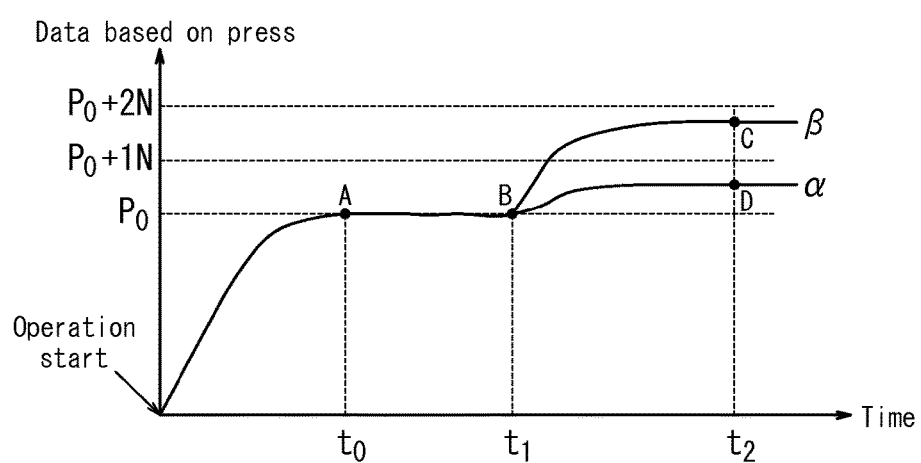
FIG. 13 is a graph illustrating an example of change over time in the data based on press by the operator's operation according to the second embodiment.

FIG. 13 is, as FIG. 7 and the like, a graph illustrating an example of change over time in the data based on press by the operator's operation. In FIG. 13, both the case where, after point B, that is, after a standard for data based on press is set, the data based on press by the operator's operation increases and thus reaches point C, and the case where, after point B, the data based on press by the operator's operation further increases and thus reaches point D are described. In the present embodiment, when the standard $P_0$ for data based on press is set, based on the standard $P_0$ for data based on press, some stages of data based on press are set above and below the standard.

FIG. 13 selectively illustrates stages of the data based on press that are set higher than the standard $P_0$ for data based on press. In FIG. 13, as an example, with respect to the data based on press that is greater than the standard $P_0$ for data based on press, two stages of data based on press set respectively at intervals of 1N are illustrated. However, in setting stages of data based on press, each stage of data based on press may be set at other intervals than intervals of 1N, and the stages may be set at more closely or sparsely. Also, instead of setting two such stages, more stages may be set, or a great number of stages may be set corresponding to the change in data based on press in an analog manner. Also, instead of previously setting such stages of data based on press, above-described stages may be calculated each time a press is detected.

As illustrated in FIG. 13, in this example, as a speed at which the image displayed on the display unit 30 is zoomed in, a speed α is employed for the stages of data based on press from the standard $P_0$ for data based on press to $P_0+1N$. In addition, as illustrated in FIG. 13, in this example, as a speed at which the image displayed on the display unit 30 is zoomed in, a speed β is employed for the stages of data based on press from $P_0+1N$ to $P_0+2N$. In this case, a speed β may be a faster than a speed α as a speed at which the image displayed on the display unit 30 is zoomed in. That is, in this case, when the operator operates the touch sensor 20, if he/she keeps a greater press, the image displayed on the display unit 30 is zoomed in faster.

Figure 14:
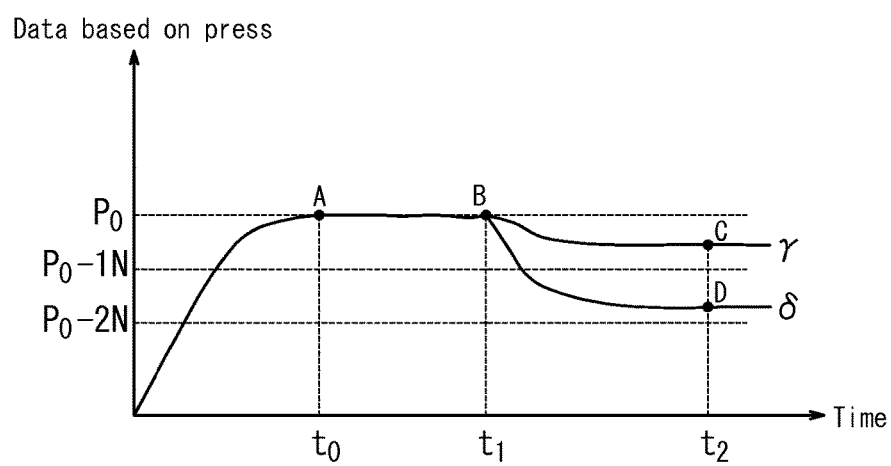
FIG. 14 is a graph illustrating another example of change over time in the data based on press by the operator's operation according to the second embodiment.

FIG. 14 is, as FIG. 7 and the like, a graph illustrating another example of change over time in the data based on press by the operator's operation. FIG. 14 illustrates both the case where, after point B, that is, after a standard for data based on press is set, the data based on press by the operator's operation decreases and thus reaches point C, and the case where, after point B, the data based on press by the operator's operation further decreases and thus reaches point D.

FIG. 14 selectively illustrates stages of data based on press that are set lower than the standard $P_0$ for data based on press. Further, in FIG. 14, as an example, with respect to the data based on press that is smaller than the standard $P_0$ for data based on press, two stages of data based on press set at intervals of 1N are illustrated. However, in setting a stage of data based on press, each stage of data based on press may be set at other intervals than intervals of 1N and to set two such stages. Also, such stages of data based on press may be set adaptively.

As illustrated in FIG. 14, in this example, as a speed at which the image displayed on the display unit 30 is zoomed out, a speed γ is employed for the stages of data based on press from the standard $P_0$ for data based on press to $P_0-1N$. In addition, as illustrated in FIG. 14, in this example, as a speed at which the image displayed on the display unit 30 is zoomed in, a speed δ is employed for the stages of data based on press from $P_0-1N$ to $P_0-2N$. In this case, a speed δ may be a faster speed than a speed γ as a speed at which the image displayed on the display unit 30 is zoomed out. That is, in this case, when the operator operates the touch sensor 20, if he/she keeps a smaller press, the image displayed on the display unit 30 is zoomed out faster.

Figure 15:
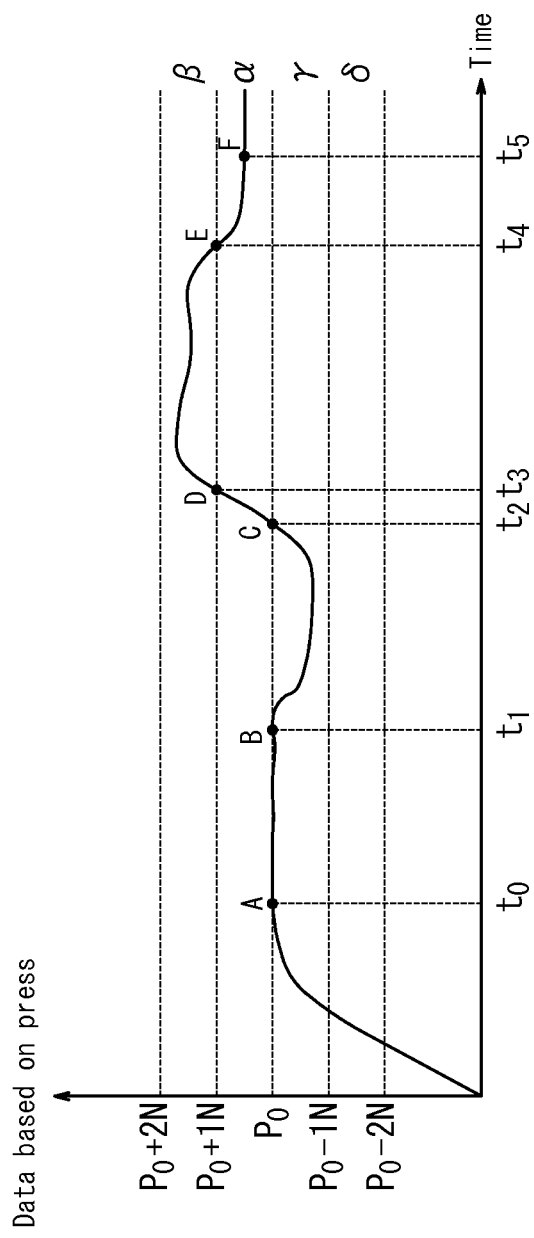
FIG. 15 is a graph illustrating still another example of change over time in the data based on press by the operator's operation according to the second embodiment.

FIG. 15 is a graph illustrating still another example of change over time in the data based on press by the operator's operation. In FIG. 15, after point B, that is, after a standard for data based on press is set, the data based on press decreases once and turns to increase, then turns from increase to decrease.

FIG. 15 illustrates both the stages of data based on press that are set lower than the standard $P_0$ for data based on press and the stages of data based on press that are set higher than the standard $P_0$ for data based on press. Further, in the example illustrated in FIG. 15, two stages each are illustrated for data based on press that is greater than the standard $P_0$ for data based on press and for the data based on press that is lower than the standard $P_0$ for data based on press, each stage is set at intervals of 1N. Also, in FIG. 15, as in the case of FIG. 13, a speed α is employed for the stages of the data based on press from $P_0$ to $P_0+1N$, and a speed β is employed for the stages of the data based on press from $P_0+1N$ to $P_0+2N$. In addition, in FIG. 15, as in the case of FIG. 14, a speed γ is employed for the stages of data based on press from $P_0$ to $P_0-1N$, and a speed δ is employed for the stages of data based on press from $P_0-1N$ to $P_0-2N$.

Figure 16:
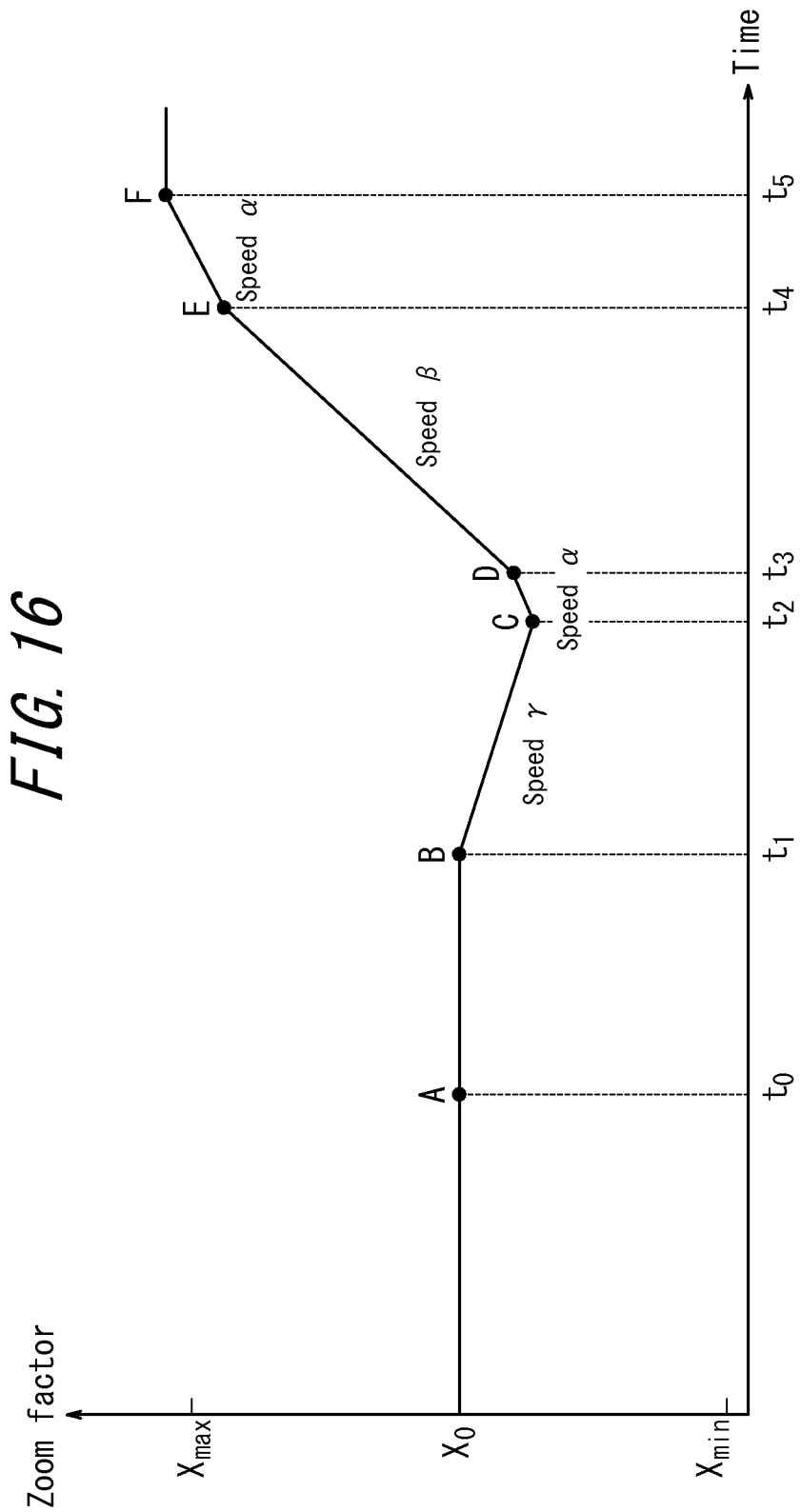
FIG. 16 is a graph illustrating an example of changes over time in the zoom factor in response to the operator's operation according to the second embodiment.

FIG. 16 is a graph illustrating change over time in a zoom factor of the image displayed on the display unit 30 when the data based on press changes over time as illustrated in FIG. 15. Note that, in FIG. 16, the horizontal axis represents a passage of time, while the vertical axis represents a zoom factor of the image displayed on the display unit 30.

Comparing FIG. 15 with FIG. 16, the time period from the operation starting point to $t_0$, that is, until the time when the standard for data based on press is set, the mode is not yet shifted to the zoom mode, which indicates that, although the data based on press changes, the zoom factor does not change from the standard. As illustrated in FIG. 15, the data based on press is kept from $P_0$ to $P_0-1N$ during the time period from $t_1$ to $t_2$, and thus as illustrated in FIG. 16, in this interval, the image displayed on the display unit 30 is zoomed out at a speed γ. Also, as illustrated in FIG. 15, the data based on press is kept from $P_0$ to $P_0+1N$ during the time period from $t_2$ to $t_3$, and thus as illustrated in FIG. 16, in this interval, the image displayed on the display unit 30 is zoomed in at speed α. Also, as illustrated in FIG. 15, the data based on press is kept from $P_0+1N$ to $P_0+2N$ during the time period from $t_3$ to $t_4$, and thus as illustrated in FIG. 16, in this interval, the image displayed on the display unit 30 is zoomed in at a speed β. Also, as illustrated in FIG. 15, the data based on press is kept from $P_0$ to $P_0+1N$ during the time period from $L_1$ to $t_5$, and thus as illustrated in FIG. 16, in this interval, the image displayed on the display unit 30 is zoomed in at a speed α.

As such, according to the present embodiment, as in the case of the electronic device 1 described in the first embodiment, the portions on which the operator executes operations may be reduced and the operation steps by the operator may be reduced as well. Further, according to the present embodiment, when the operator operates with a large press, the image displayed on the display unit 30 is zoomed in faster for that, and thus the operator requires a short period of time to operate with a large press, and the burden on the operator for applying a pressing force may be reduced.

Third Embodiment

Next, an electronic device according to the third embodiment of the present invention will be descried.

In the third embodiment, the process by the control unit 10 described in the first embodiment is modified. That is, in the third embodiment, the aspect of the process of step S21 described in FIG. 5 differs from that of the electronic device 1 according to the first embodiment. In greater detail, in the electronic device 3 according to the third embodiment, after a standard for data based on press is set, the aspect of the correlation between the data based on press and the zoom factor described in FIG. 6 is changed.

Excepting the above-described points, the electronic device 3 according to the third embodiment can be realized by the device configuration and the control that are basically similar to those of the electronic device 1 described in the above-described first embodiment. Thus, the descriptions that overlap those described in the first embodiment are appropriately omitted.

In the first embodiment, as illustrated using FIG. 6, as a correlation between the data based on press and the zoom factor, the change in the data based on press from $P_{min}$ to $P_0$ is correlated with the linear change in the zoom factor from $X_{min}$ to $X_0$. Similarly, in the first embodiment, the change in the data based on press from $P_0$ to $P_{max}$ is correlated with the linear change in the zoom factor from $X_0$ to $X_{max}$. In FIG. 6, for simplification of description, an example where a standard $P_0$ for data based on press is set at just the intermediate point between $P_{max}$ and $P_{min}$ is illustrated. However, when a standard $P_0$ for data based on press is actually set, it is highly likely that the $P_0$ is set at other points than the intermediate point between $P_{max}$ and $P_{min}$. In this case, that is, when the standard $P_0$ for data based on press is not set at the intermediate point between $P_{max}$ and $P_{min}$, the graph in FIG. 6 representing a correlation does not form a linear pattern, and the slope changes at around $P_0$.

Figure 17A:
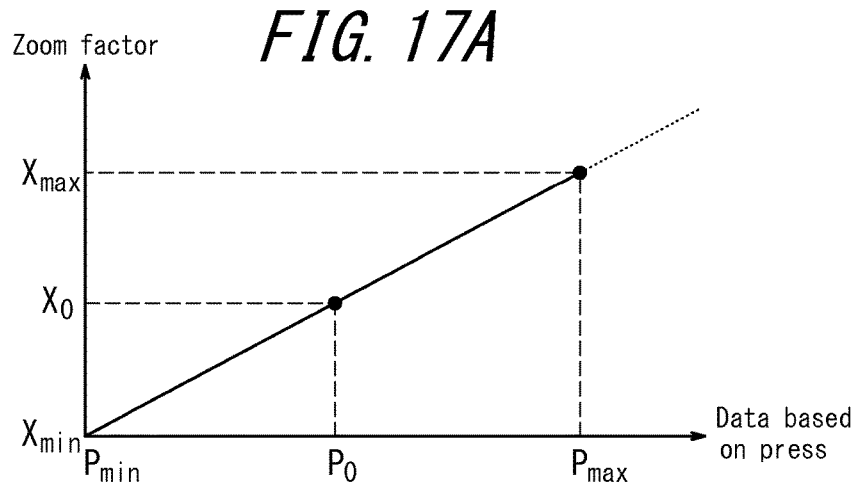
FIGS. 17A to 17C are graphs each illustrating a correlation between the data based on press and the zoom factor according to a third embodiment.

As described in the first embodiment, when the standard $P_0$ for data based on press is set at the intermediate point between $P_{max}$ and $P_{min}$, the correlation between the data based on press and the zoom factor is, as illustrated in FIG. 17A, formed in a straight line from $P_{min}$ to $P_{max}$. In FIG. 17, for convenience of description, the vertical axis and the horizontal axis are set in an aspect different from FIG. 6.

Figure 17B:
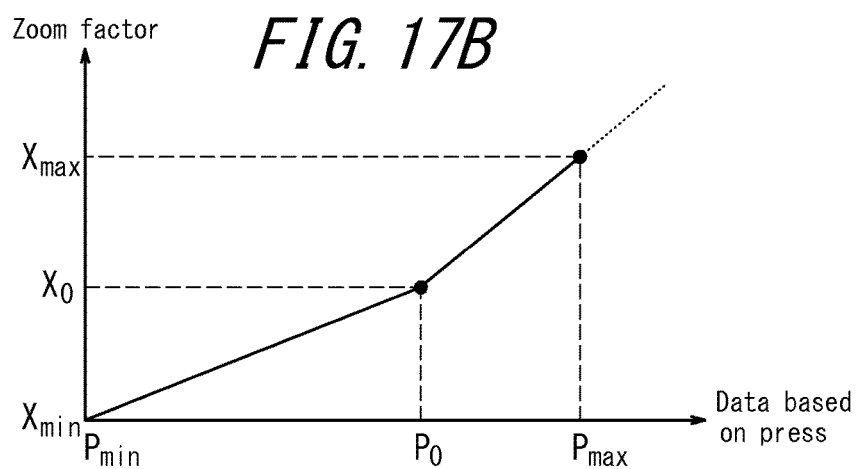

In this case, for example, when the standard $P_0$ for data based on press is set at the position that is closer to $P_{max}$ than $P_{min}$, the correlation between the data based on press and the zoom factor is, as illustrated in FIG. 17B, described in a graph in which the slope changes at the point of $P_0$. Also, for example, when the standard $P_0$ for data based on press is set at the position that is closer to $P_{min}$ than $P_{max}$, the correlation between the data based on press and the zoom factor is, as illustrated in FIG. 17C, also described in a graph in which the slope changes at the point of $P_0$.

Figure 17C:
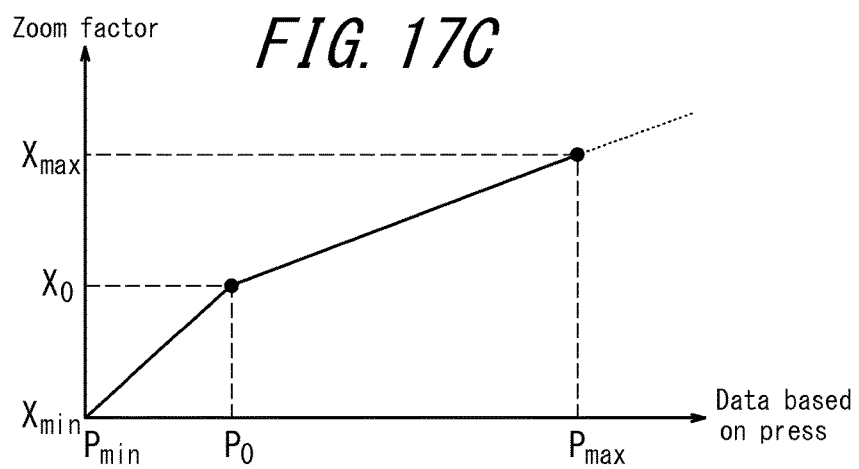

As illustrated in FIGS. 17B and 17C, when the slope of the graph representing a correlation between the data based on press and the zoom factor changes at the point of $P_0$, if the operator changes a press across the standard $P_0$ for data based on press, it may cause a feeling of strangeness to the following performance of zooming in or out.

For example, in FIG. 17B, when the data based on press exceeds $P_0$ during gradual increase in the press by the operator, the graph slope increases (steepens). Thus, when the data based on press is correlated with the zoom factor as illustrated in FIG. 17B, even if the operator gradually increases the data based on press at a constant rate, when the data based on press exceeds $P_0$, the increase rate of the zoom-in factor increases suddenly, and the image displayed on the display unit 30 is zoomed in suddenly. On the contrary, when the data based on press is correlated with the zoom factor as illustrated in FIG. 17B, even if the operator gradually decreases the press at a constant rate, when the data based on press falls below $P_0$, the increase rate of the zoom-in factor decrease suddenly, and the image displayed on the display unit 30 is not zoomed out enough.

Moreover, for example, in FIG. 17C, when the data based on press exceeds $P_0$ during gradual increase in the press by the operator, the graph slope becomes smaller or more gentle. Thus, when the data based on press is correlated with the zoom factor as illustrated in FIG. 17C, even if the operator gradually increases the data based on press at a constant rate, when the data based on press exceeds $P_0$, the increase rate of the zoom-in factor decreases suddenly, and the image displayed on the display unit 30 is not zoomed in enough. On the contrary, when the data based on press is correlated with the zoom factor as illustrated in FIG. 17C, even if the operator gradually decreases the press at a constant rate, when the data based on press falls below $P_0$, the decrease rate of the zoom-in factor increases suddenly, and the image displayed on the display unit 30 is zoomed out suddenly.

Therefore, in the present embodiment, in order to cope with such inconveniences, when the data based on press is correlated with the zoom factor as illustrated in step S21 in FIG. 5, correction is made so that the amount of change in the zoom factor to the data based on press does not change across the standard $P_0$ for data based on press. In greater detail, for example, when the correlation is performed as illustrated in FIG. 17B, the control unit 10 corrects this correlation and correlates the data based on press with the zoom factor as illustrated in FIG. 18A.

Figure 18A:
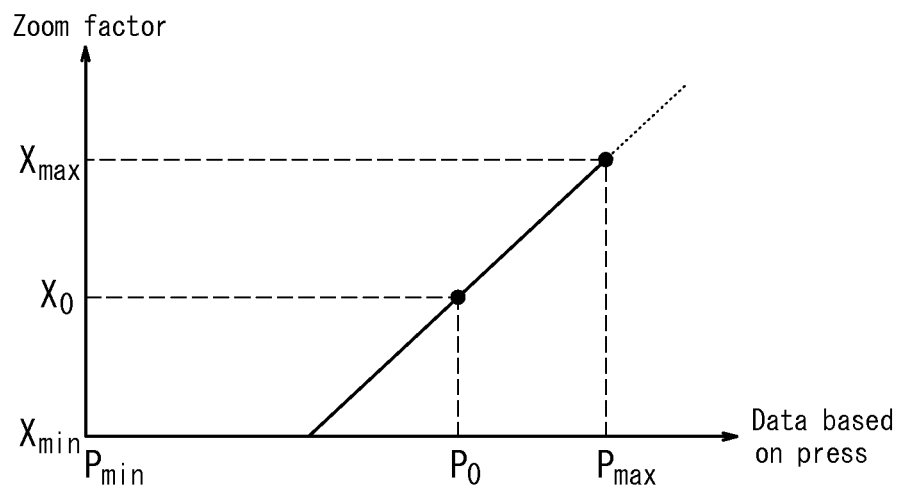
FIGS. 18A and 18B are graphs each illustrating an example of correlation between the data based on press and the zoom factor according to the third embodiment.

When the correlation between the data based on press and the zoom factor is performed as illustrated in FIG. 18A, the standard $P_0$ for data based on press is set at the intermediate point between $P_{min}$ (actually the data based on press P at which the zoom factor is minimum $X_{min}$) and $P_{max}$. Thus, the correlation between the data based on press and the zoom factor is represented by a graph with a slope that does not change across $P_0$, and even if the operator changes a press across the standard $P_0$ for data based on press, it may not cause a feeling of strangeness to the following performance of zooming in or out.

Figure 18B:
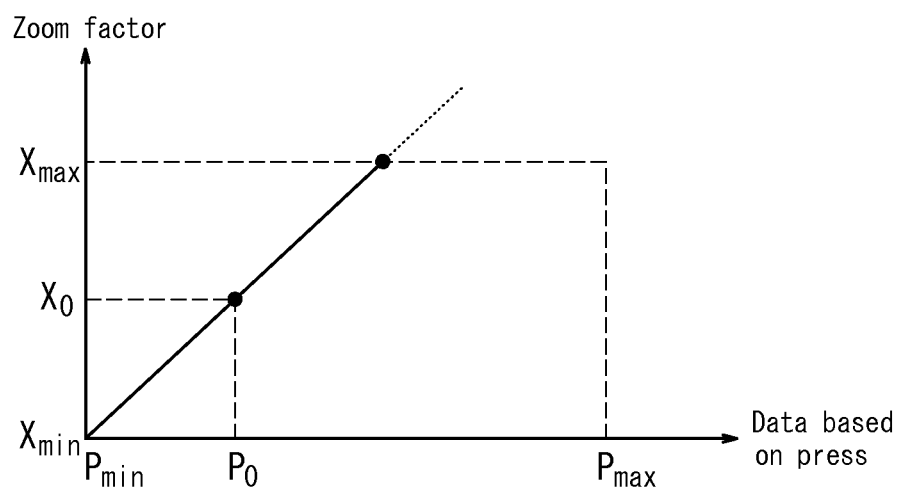

Moreover, for example, when the correlation as illustrated in FIG. 17C is performed, the control unit 10 corrects the correlation and correlates the data based on press with the zoom factor as illustrated in FIG. 18B.

If the correlation between the data based on press and the zoom factor is performed as illustrated in FIG. 18B, the standard $P_0$ for data based on press is set at the intermediate point between $P_{min}$ and $P_{max}$ (actually the data based on press P at which the zoom factor is a maximum $X_{min}$). Thus, the correlation between the data based on press and the zoom factor is represented by a graph with a slope that does not change across $P_0$, and even if the operator changes a press across the standard $P_0$ for data based on press, it may not cause a feeling of strangeness to the following performance of zooming in or out.

In this manner, also in the present embodiment, the control unit 10 controls, as in the case of the first embodiment, such that the parameter value associated with a predetermined process is increased/decreased according to the difference between the standard for data based on press and the data based on press detected by the press detection unit 40. However, in the present embodiment, the control unit 10 controls such that the amount of increasing/decreasing the parameter value will be constant in the case where the data based on press detected by the press detection unit 40 increase and the case where the data based on press detected by the press detection unit 40 decreases. In this case, the "amount of increasing/decreasing the parameter value" corresponds to, in the above-described example, the amount of change in the zoom factor to the data based on press, according to the difference between the standard for data based on press and the data based on press detected by the press detection unit 40.

Further, in the present embodiment, the aspect in which, when the data based on press is correlated with the zoom factor, correction is made so that the amount of change in the zoom factor to the data based on press will not change across the standard $P_0$ for data based on press, is not limited to that described in FIG. 18, and a variety of aspects may be assumed.

Figure 19A:
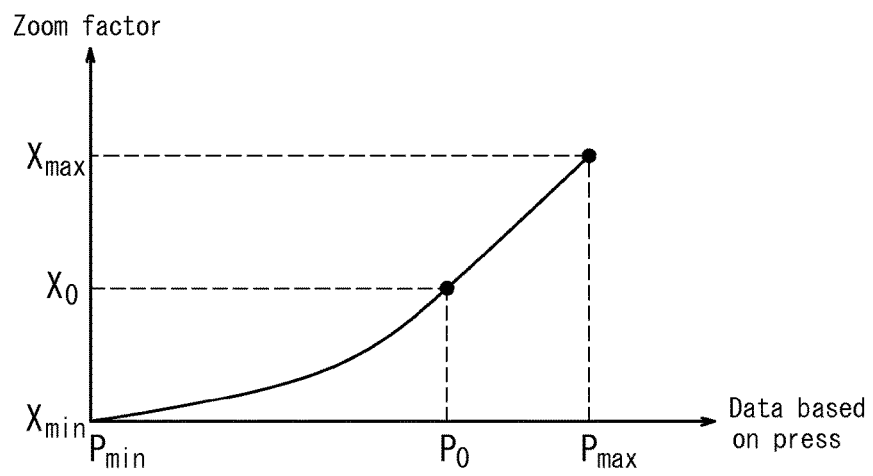
FIGS. 19A and 19B are graphs each illustrating another example of correlation between the data based on press and the zoom factor according to the third embodiment.

For example, instead of the correction as FIG. 18A, correction may be made as illustrated in FIG. 19A. According to the correlation between the data based on press and the zoom factor as illustrated in FIG. 19A, the amount of change in the zoom factor to the data based on press may be remained almost the same across the standard $P_0$ for data based on press, and the zoom factor may be changed until the data based on press reaches the original $P_{min}$ as well. Further, by changing the data based on press in the interval from the original $P_{min}$ to $P_0$ in a curved manner, even if the operator changes the data based on press in this interval, no feeling of strangeness is given to the following performance of zoom in or out.

Figure 19B:
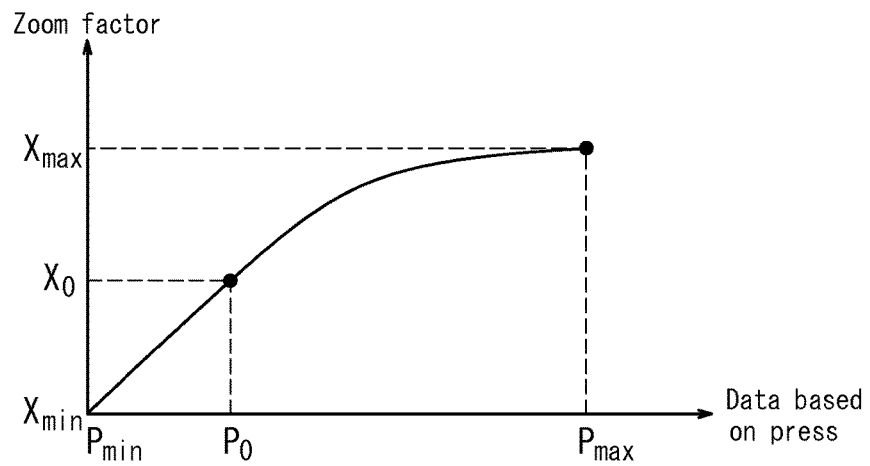

Instead of the correction as illustrated in FIG. 18B, correction may be made as illustrated in FIG. 19B. According to the correlation between the data based on press and the zoom factor as illustrated in FIG. 19B, the amount of change in the zoom factor to the data based on press may be remained almost the same across the standard $P_0$ for data based on press, and the zoom factor may be changed until the data based on press reaches the original $P_{max}$. Further, by changing the data based on press in a curved manner also in the interval from $P_0$ to the original $P_{max}$, even if the operator changes the data based on press in this interval, no feeling of strangeness is given to the following performance of zoom in or out.

In this manner, according to the present embodiment, even if the operator changes a press across the standard $P_0$ for data based on press, the amount of increasing/decreasing the parameter value associated with a predetermined process does not significantly change and remains almost the same. Therefore, according to the present embodiment, when the operator changes a press across the standard $P_0$ for data based on press, no feeling of strangeness is given to the following performance when the image displayed on the display unit 30 is zoomed in or out.

Fourth Embodiment

Next, an electronic device according to the fourth embodiment of the present invention will be described.

Also in the fourth embodiment, the process by the control unit 10 described in the first embodiment is changed. That is, in the fourth embodiment, in the electronic device 1 according to the first embodiment, the process following the step S25 described in FIG. 5 is modified. That is, in the electronic device 4 according to the fourth embodiment, a standard for data based on press is set, and when it is determined that a predetermined operation is executed during execution of zoom in or out process of the image according to the data based on press, the aspect of correlation between the data based on press and the zoom factor as described in FIG. 6 is changed.

Excepting the above-described points, the electronic device 4 according to the fourth embodiment can be realized by the device configuration and the control that are basically similar to those of the electronic device 1 described in the above-described first embodiment. Thus, the descriptions that overlap those described in the first embodiment are appropriately omitted.

In the fourth embodiment, during zoom-in or out process of the image displayed on the display unit 30 by the electronic device 1 according to the first embodiment, when the operator zooms in or out the image too much, a measure to easily modify to the desired zoom factor is provided.

Figure 20:
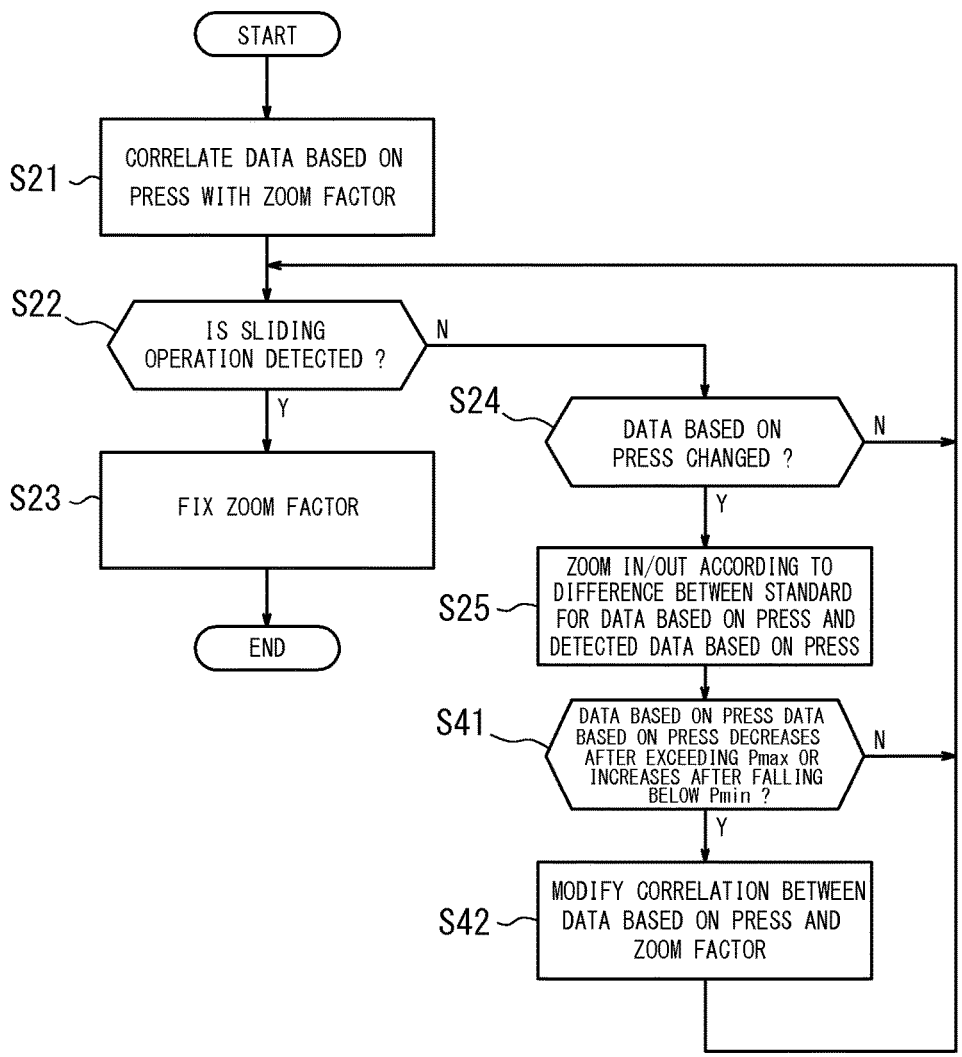
FIG. 20 is a flowchart illustrating a process in the zoom mode according to a fourth embodiment.

FIG. 20 is a flowchart describing the process by the electronic device 4 according to the fourth embodiment. As in the case of FIG. 5 described in the first embodiment, FIG. 20 is a flowchart describing a process performed in the zoom mode illustrated in step S15 in FIG. 3, after the standard for data based on press is set.

In the present embodiment, the control unit 10 performs the processes up to step S25 where, according to the difference between the standard $P_0$ for data based on press and the data based on press P detected by the press detection unit 40, the control unit controls the image displayed on the display unit 30 such that it is zoomed in or out, in a similar manner to that according to the first embodiment.

In the fourth embodiment, after step S25, the control unit 10 determines whether or not the data based on press P detected by the press detection unit 40 increases, then exceeds the data based on maximum press $P_{max}$ that can be detected by the press detection unit 40, and turns to decrease (step S41). When it is determined that, in step S41, the data based on press P exceeds the data based on maximum press $P_{max}$ and then turns to decrease, the control unit 10 modifies the correlation between the data based on press and the zoom factor (step S42).

In step S41, also when it is determined that the data based on press P detected by the press detection unit 40 decreases and falls below the data based on minimum press $P_{min}$ that can be detected by the press detection unit 40, then turns to increase, the control unit 10 also performs a process of step S42. That is, even if, in step S41, it is determined that the data based on press P falls below the data based on minimum press $P_{min}$ and turns to increase, the control unit 10 modifies the correlation between the data based on press and the zoom factor (step S42).

In step S42, when the correlation between the data based on press and the zoom factor is modified, the control unit 10 returns to step S22 and continues the process. If it is not determined that the above-described predetermined operation is performed in step S41, the control unit 10 does not perform the process of step S42 and returns to step S22 to continue the process.

Next, modification of the correlation between the data based on press and the zoom factor performed in step S42 of the present embodiment will be described.

Figure 21:
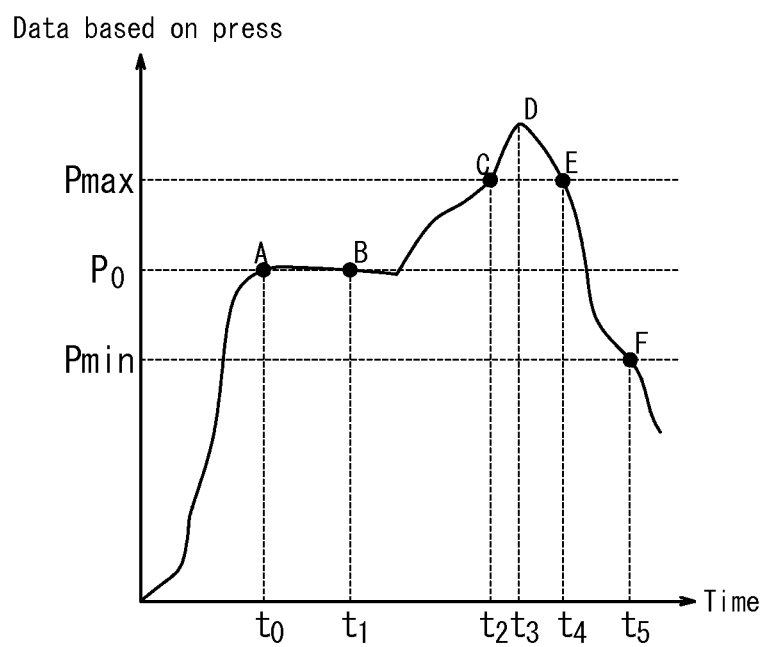
FIG. 21 is a graph illustrating an example of change over time in the data based on press by the operator's operation according to the fourth embodiment.
Figure 22A:
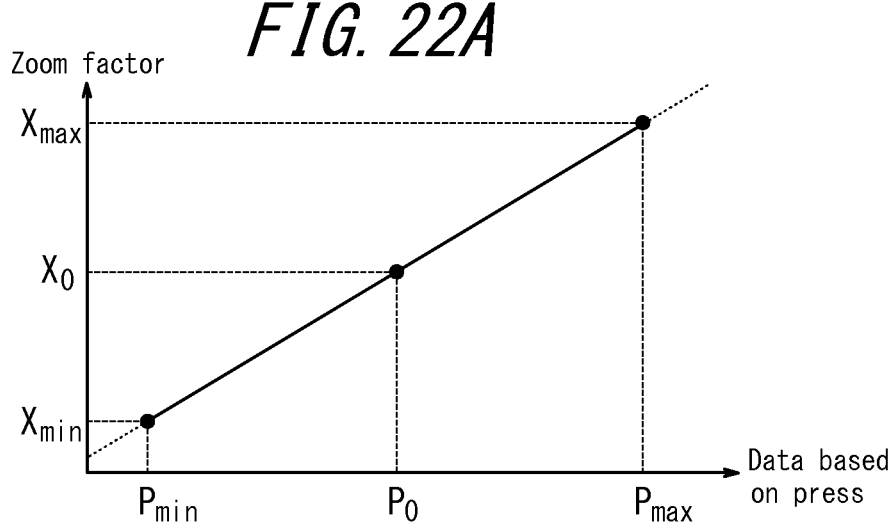
FIGS. 22A to 22C are graphs each illustrating an example of correlation between the data based on press and the zoom factor according to the fourth embodiment.

FIG. 21 is, as FIG. 7 and the like described in the first embodiment, a graph illustrating an example of change over time in the data based on press by the operator's operation. In FIG. 21, the data based on press by the operator's operation is kept substantially constant from points A to B, and thus, as illustrated in FIG. 22A, the data based on press P is correlated with the zoom factor X (step S21 in FIG. 20). The processing so far is the same as that described with reference to FIG. 6 and the like in the above-described first embodiment.

Figure 22B:
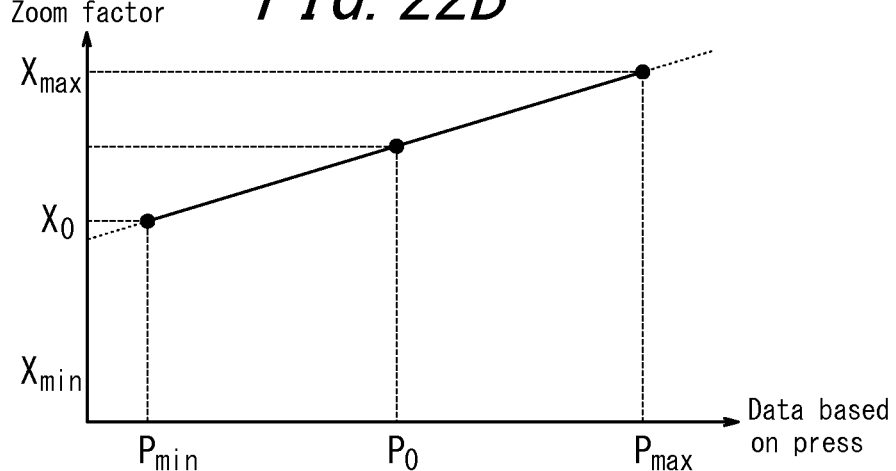

In the example of FIG. 21, after point B, that is, after the standard for data based on press is set, the data based on press by the operator's operation exceeds $P_{max}$ at point C and increases up to point D, then at point D, turns to decrease (Yes in step S41). Therefore, in this case, the correlation between the data based on press and the zoom factor is modified to, for example, the aspect as illustrated in FIG. 22B (step S42). The slope of the graph representing the correlation between the data based on press and the zoom factor illustrated in FIG. 22B is smaller (more gentle) than that of the aspect illustrated in FIG. 22A. Thus, when the data based on press decreases from point E to point F in FIG. 21 by the operator's operation (corresponding to the decrease from $P_{max}$ to $P_{min}$ in FIG. 22B), the change in the zoom-out factor relative to the decrease in the data based on press becomes smaller (more gentle). Therefore, when the operator increases the data based on press up to point C and the image is zoomed in too much, then decreases the data based on press to zoom out the image, he/she can zoom out the image carefully, and thus can easily reach the desired zoom factor.

Figure 23:
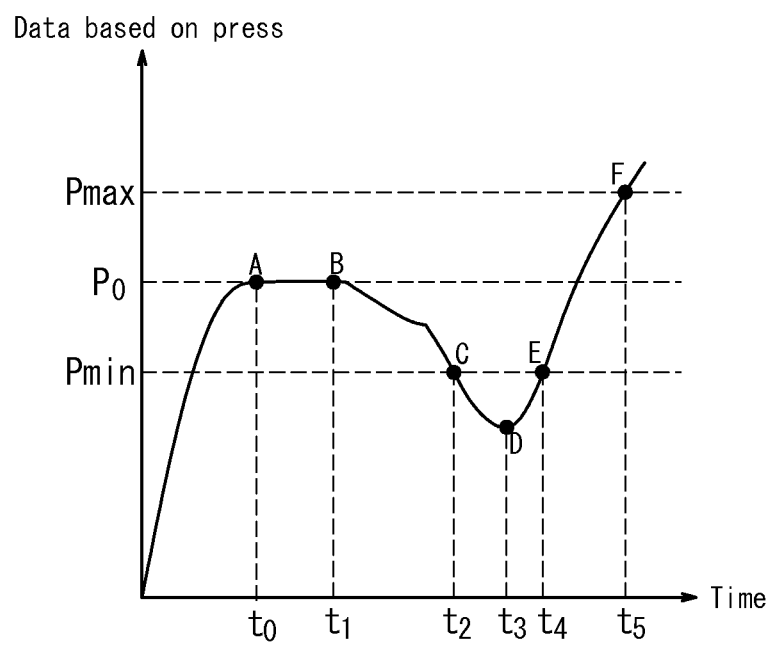
FIG. 23 is a graph illustrating another example of change over time in the data based on press by the operator's operation according to the fourth embodiment.

FIG. 23 is, as FIG. 7 and the like described in the first embodiment, a graph illustrating an example of change over time in the data based on press by the operator's operation. Also in FIG. 23, the data based on press by the operator's operation is kept substantially constant from point A to point B, and thus, as illustrated in FIG. 22A, the data based on press P is correlated with the zoom factor X (step S21 in FIG. 20).

Figure 22C:
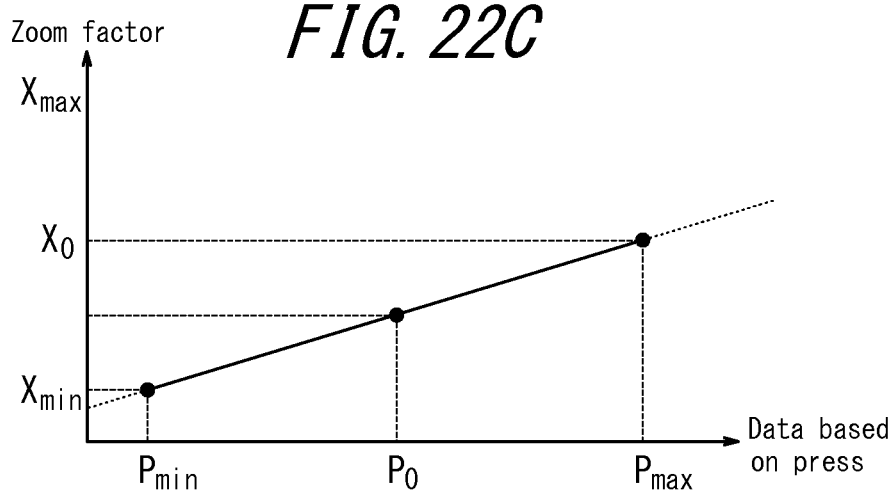

In the example of FIG. 23, after point B, that is, after the standard for data based on press is set, the data based on press by the operator's operation falls below $P_{min}$ at point C and decreases to point D, then at point D, turns to increase (Yes in step S41). Therefore, in this case, the correlation between the data based on press and the zoom factor is modified to, for example, the aspect as illustrated in FIG. 22C (step S42). The slope of the graph representing the correlation between the data based on press and the zoom factor illustrated in FIG. 22C is made smaller (more gentle) than that of the aspect illustrated in FIG. 22A. Thus, when the data based on press increases from points E to F in FIG. 23 by the operator's operation (corresponding to the increase from $P_{min}$ to $P_{max}$ in FIG. 22C), the change in the zoom out factor relative to the increase in the data based on press becomes smaller (more gentle). Therefore, when the operator decreases the data based on press up to point C and thus the image is zoomed out too much, then increases the data based on press to zoom in the image, the operator can zoom in the image carefully, and thus easily reach the desired zoom factor.

In this manner, in the present embodiment, the control unit 10 controls, as in the case of the first embodiment, such that the parameter value associated with a predetermined process is increased/decreased, according to the difference between the standard for data based on press and the data based on press detected by the press detection unit 40. However, in the present embodiment, the control unit 10 controls, before and after the data based on press detected by the press detection unit 40 turns from either increase or decrease to the other, such that, the amount of increasing/decreasing the parameter value is different. In this case, the "amount of increasing/decreasing the parameter value" corresponds to, in the above-described example, the amount of change in the zoom factor to the data based on press according to the difference between the standard for data based on press and the data based on press detected by the press detection unit 40. In addition, as described above, the control unit 10 preferably controls, after the data based on press detected by the press detection unit 40 turns from increase to decrease, such that the amount of decreasing the parameter value is smaller than that before. In a similar manner, the control unit 10 preferably controls, after the data based on press detected by the press detection unit 40 turns from decrease to increase, such that the amount of increasing the parameter value will be smaller than that before. Incidentally, in the present embodiment, in order to make smaller (more gentle) the change in the zoom factor to the increase/decrease in the data based on press, it is preferred that, for example, when the sliding operation is detected in step S22 in FIG. 20, the correlation between the data based on press and the zoom factor is restored to the previous correlation before modification.

Next, another example of the fourth embodiment will be described.

Figure 24:
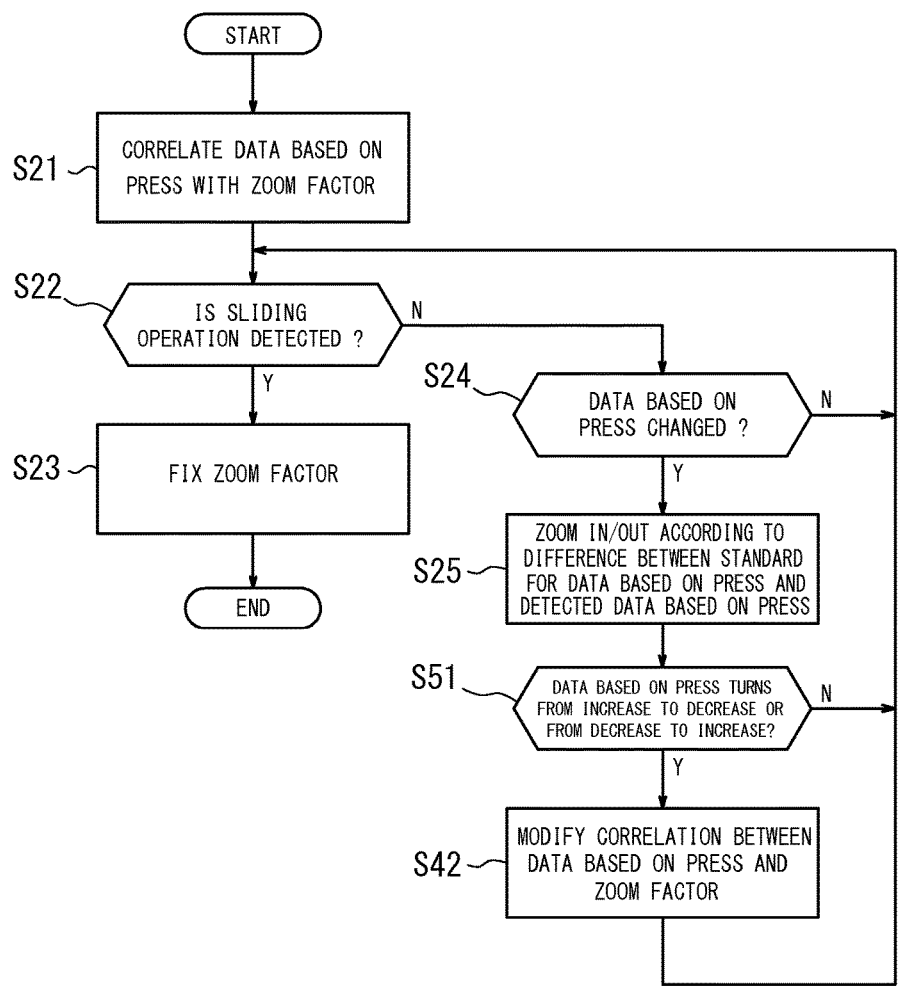
FIG. 24 is a flowchart illustrating a process in the zoom mode according to another example of the fourth embodiment.

FIG. 24 is a flowchart describing a process by the electronic device 4 according to another example of the fourth embodiment. FIG. 24 is, as FIG. 20, a flowchart that describes a process that is performed, after the standard for data based on press is set, in the zoom mode illustrated as step S15 in FIG. 3.

In the above-described example, as described in step S41 in FIG. 20, when it is determined that a predetermined operation is executed by the operator, the aspect of correlation between the data based on press and the zoom factor is changed. Further, in the above-described example, "when it is determined that a predetermined operation is executed" represents "when the data based on press P exceeds the data based on maximum press $P_{max}$ and turns to decrease" and "when the data based on press P falls below the data based on minimum press $P_{min}$ and turns to increase." In the example described below, when it is determined that a predetermined operation is executed, the aspect of the correlation between the data based on press and the zoom factor is modified, which represents the same as the example described above, however, in this case, the predetermined operation is modified. That is, in this example, as illustrated in step S51 in FIG. 24, when the data based on press P turns from increase to decrease, and when the data based on press P turns from decrease to increase, the correlation between the data based on press and the zoom factor is modified. In other words, in this example, even if the data based on press P does not exceed $P_{max}$ when it turns from increase to decrease, or even if the data based on press P does not fall below $P_{min}$ when it turns from decrease to increase, the correlation between the data based on press and the zoom factor is modified, as in the case of the above-described example.

Next, modification of the correlation between the data based on press and the zoom factor performed in this example is described.

Figure 25:
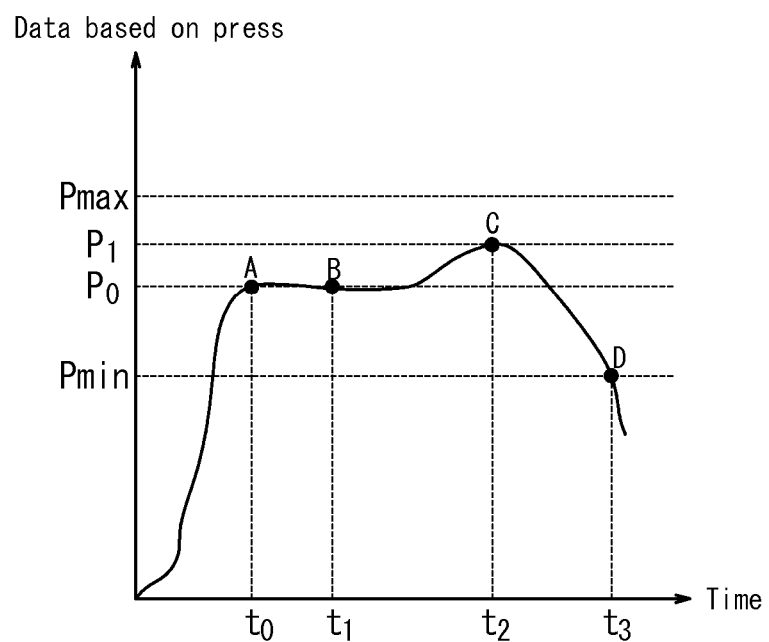
FIG. 25 is a graph illustrating still another example of change over time in the data based on press by the operator's operation according to the fourth embodiment.
Figure 26A:
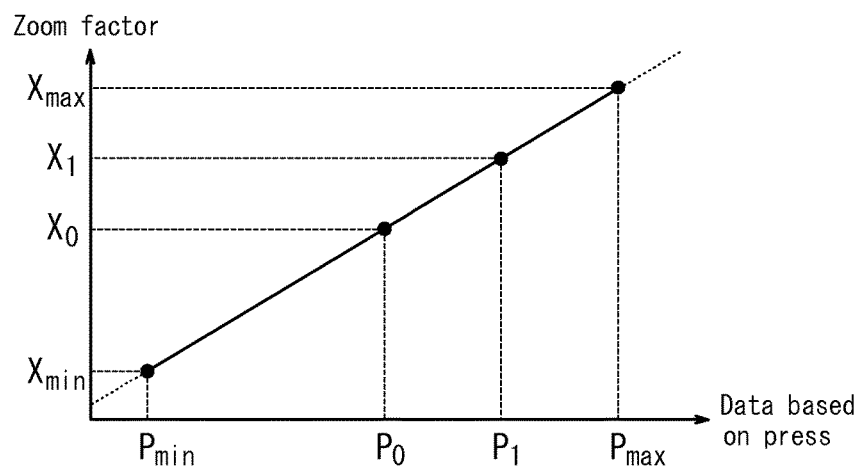
FIGS. 26A and 26B are graphs each illustrating another example of correlation between the data based on press and the zoom factor according to the fourth embodiment.

FIG. 25 is, as FIG. 21, a graph illustrating an example of change over time in the data based on press by the operator's operation. In FIG. 25, the data based on press by the operator's operation is kept substantially constant from points A to B, and thus as illustrated in FIG. 26A, correlation between the data based on press P and the zoom factor X is performed (step S21 in FIG. 24). The processing so far is the same as that described with reference to FIG. 6 and the like in the above-described first embodiment.

Figure 26B:
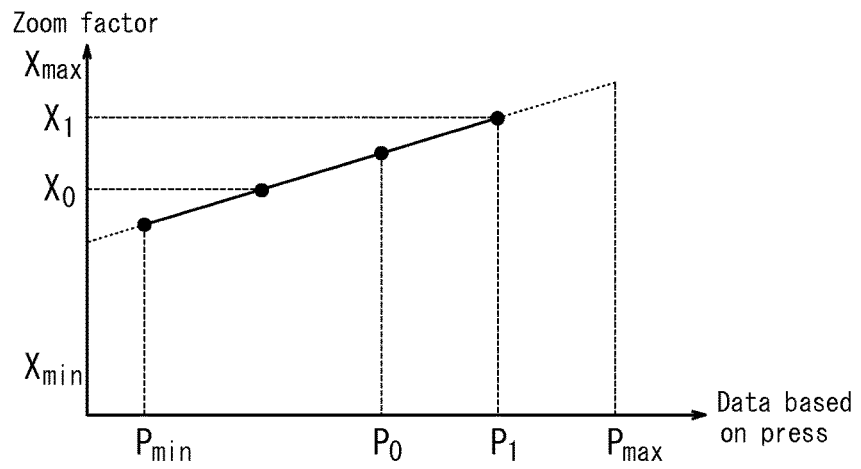

In the example of FIG. 25, after point B, that is, after the standard for data based on press is set, the data based on press by the operator's operation increases up to point C and at point C, turns to decrease (Yes in step S51). Therefore, in this case, even if the data based on press does not exceed $P_{max}$, at $t_2$, the correlation between the data based on press and the zoom factor is modified to the aspect in which the standard for data based on press is $P_1$ (step S42), for example, as illustrated in FIG. 26B. For the correlation between the data based on press and the zoom factor illustrated in FIG. 26B, the slope of the graph representing the correlation is smaller (more gentle) than that of the aspect illustrated in FIG. 26A. Thus, when the data based on press decreases from points C to D in FIG. 25 by the operator's operation (corresponding to the decrease from $P_1$ to $P_{max}$ in FIG. 26B), the change in the zoom-out factor to the decrease in the data based on press becomes smaller (more gentle). Therefore, also in this example, when the operator increases the data based on press up to point C and zooms in the image too much, thus zooms out the image by decreasing the data based on press, he/she can zoom out the image carefully, and thus easily reach the desired zoom factor.

Figure 27:
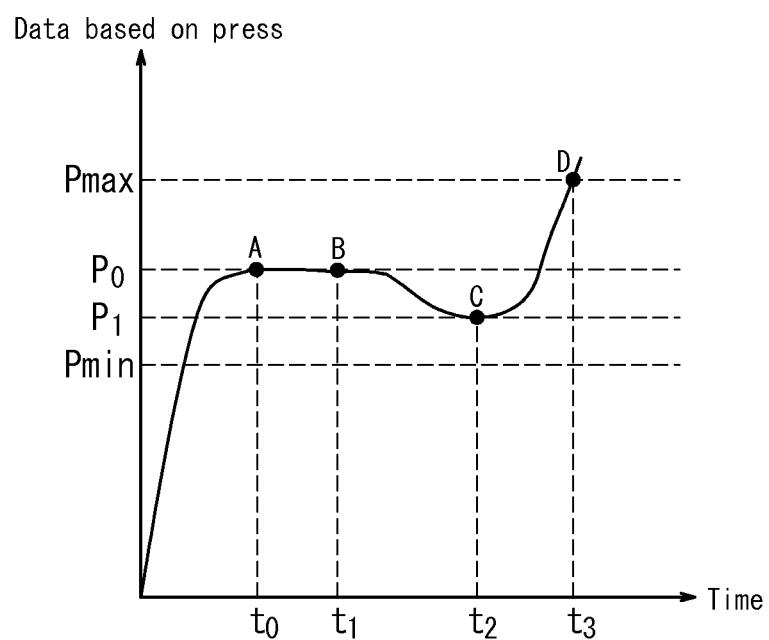
FIG. 27 is a graph illustrating yet another example of change over time in the data based on press by the operator's operation according to the fourth embodiment.
Figure 28A:
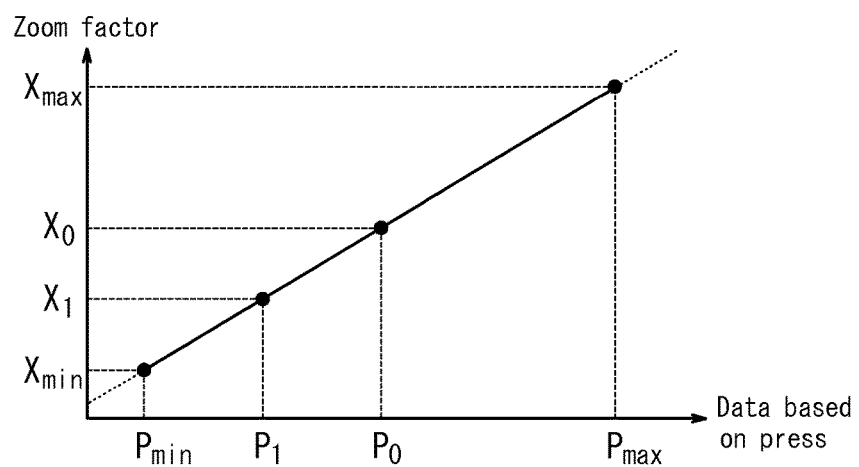
FIGS. 28A and 28B are graphs each illustrating still another example of correlation between the data based on press and the zoom factor according to the fourth embodiment.

FIG. 27 is, as FIG. 25, a graph illustrating an example of change over time in the data based on press by the operator's operation. In FIG. 27, the data based on press by the operator's operation is kept substantially constant from points A to B, and thus as illustrated in FIG. 28A, correlation between the data based on press P and the zoom factor X is performed (step S21 in FIG. 24). The processing so far is similar to that described with reference to FIG. 6 and the like in the above-described first embodiment.

Figure 28B:
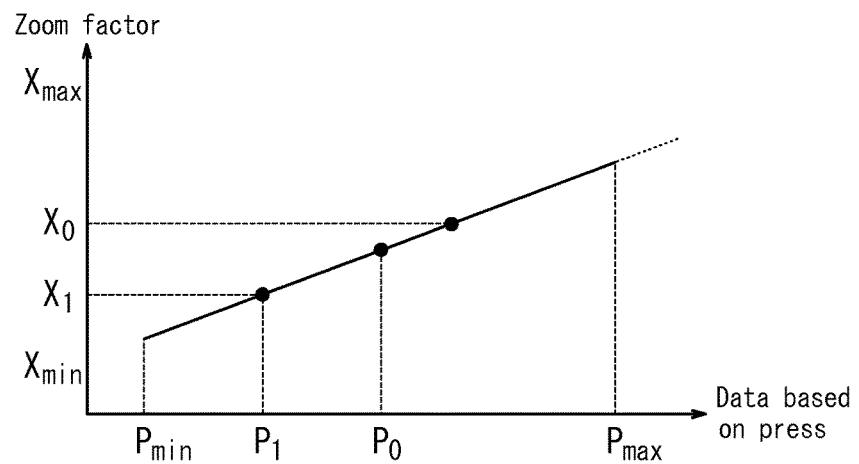

In the example of FIG. 27, after point B, that is, after the standard for data based on press is set, the data based on press by the operator's operation decreases up to point C, and at point C, turns to increase (Yes in step S51). Therefore, in this case, even if the data based on press does not fall below $P_{min}$, at $t_2$, the correlation between the data based on press and the zoom factor is modified to, for example, the aspect in which the standard for data based on press is $P_1$ as illustrated in FIG. 28B (step S42). For the correlation between the data based on press and the zoom factor illustrated in FIG. 28B, the slope of the graph representing the correlation is smaller (more gentle) than that of the aspect illustrated in FIG. 28A. Thus, when the data based on press increases from points C to D in FIG. 27 by the operator's operation (corresponding to the increase from $P_1$ to $P_{max}$ in FIG. 28B), the change in the zoom-in factor to the increase in the data based on press becomes smaller (more gentle). Therefore, also in this example, when the operator decreases the data based on press up to point C and zooms out the image too much, thus increases the data based on press to zoom in the image, he/she can zoom in the image carefully, and thus easily reach the desired zoom factor.

The processing according to the above-described example may be performed continuously each time the data based on press increases/decreases. Such an example will be described below.

Figure 29:
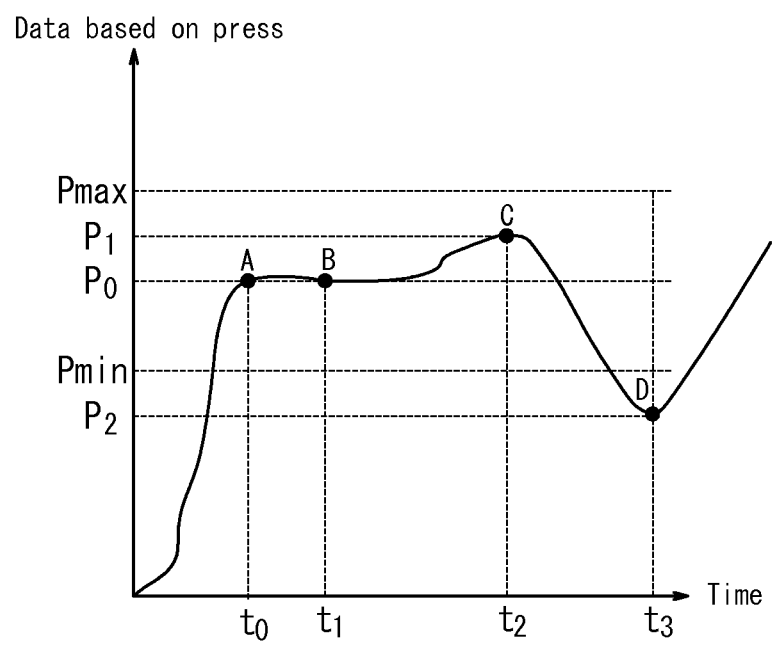
FIG. 29 is a graph illustrating further example of change over time in the data based on press by the operator's operation according to the fourth embodiment.
Figure 30A:
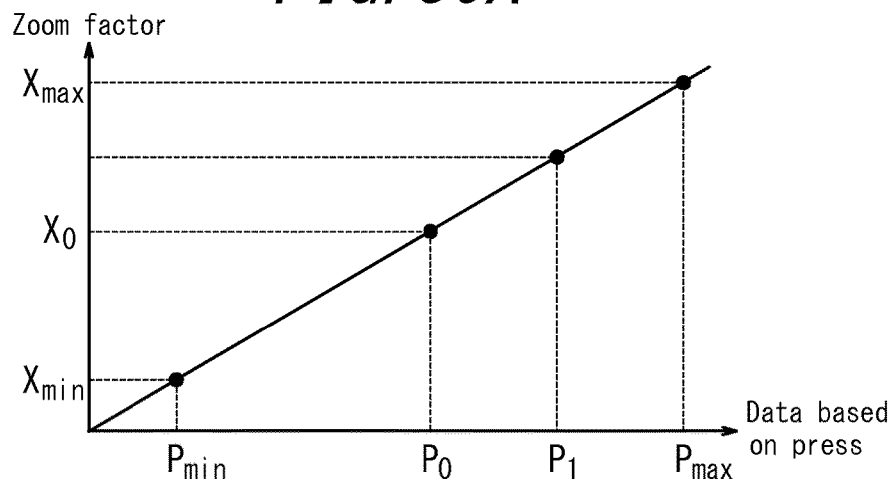
FIGS. 30A to 30C are graphs each illustrating yet another example of correlation between the data based on press and the zoom factor according to the fourth embodiment.

FIG. 29 is, as FIGS. 25 and 27, a graph illustrating an example of change over time in the data based on press by the operator's operation. Also in FIG. 29, the data based on press by the operator's operation is kept substantially constant from points A to B, and thus as illustrated in FIG. 30A, correlation between the data based on press P and the zoom factor X is performed (step S21 in FIG. 20).

Figure 30B:
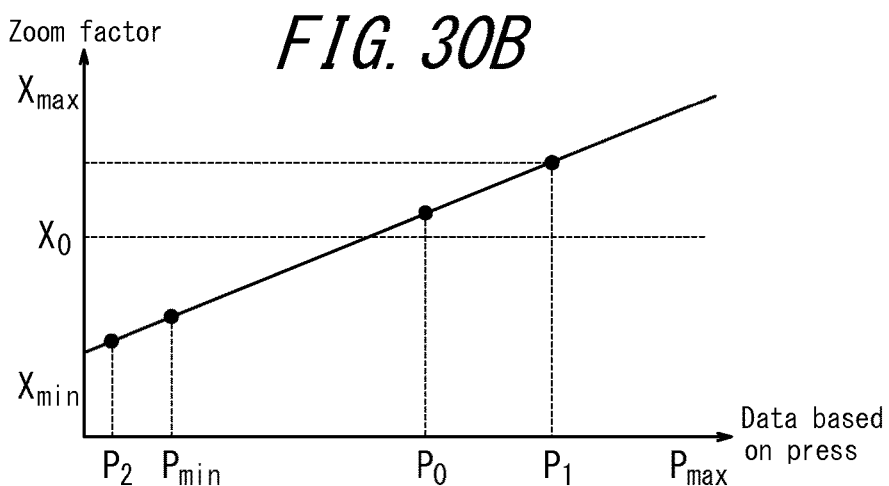

In the example of FIG. 29, after point B, that is, after the standard for data based on press is set, the data based on press by the operator's operation increases up to point C, and at point C, turns to decrease (Yes in step S51). Therefore, in this case, even if the data based on press does not exceed $P_{max}$, at $t_2$, the correlation between the data based on press and the zoom factor is modified to, for example, the aspect in which the standard for data based on press is $P_1$ as illustrated in FIG. 30B (step S42). For the correlation between the data based on press and the zoom factor illustrated in FIG. 30B, the slope of the graph representing the correlation is made smaller (more gentle) than that of the aspect illustrated in FIG. 30A. Thus, when the data based on press decreases from points C to D in FIG. 29 by the operator's operation (corresponding to the decrease from $P_1$ to $P_{min}$ in FIG. 30B), the change in the zoom-out factor to the decrease in the data based on press also becomes smaller (more gentle).

Figure 30C:
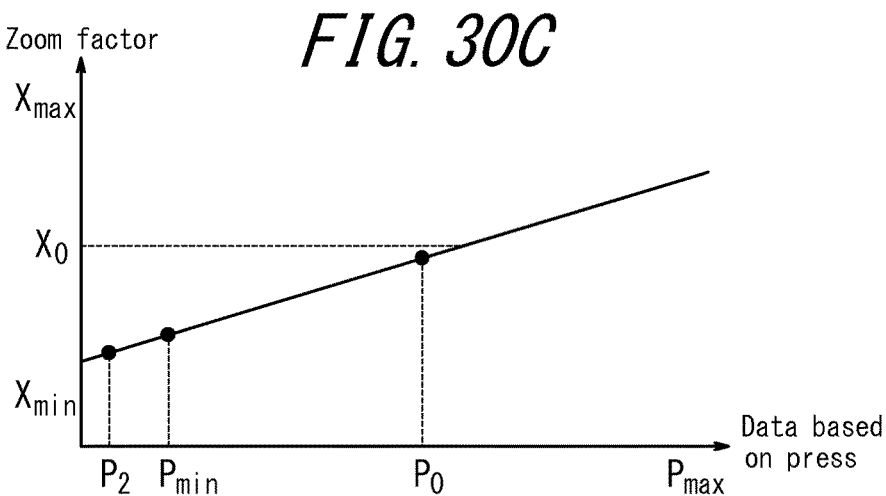

Moreover, in the example in FIG. 29, after the correlation between the data based on press and the zoom factor is modified at point C, the data based on press decreases to fall below $P_{min}$ immediately before point D, and at point D, the data based on press by the operator's operation turns to increase (Yes in step S51). Therefore, in this case, at $t_3$, the correlation between the data based on press and the zoom factor is modified to, for example, the aspect in which the standard for data based on press is $P_2$ as illustrated in FIG. 30C (step S42). When the press detection unit 40 cannot detect the data based on press that falls below $P_{min}$, at step S42, the control unit may change to the aspect in which the standard for data based on press is $P_{min}$. For the correlation between the data based on press and the zoom factor illustrated in FIG. 30C, the slope of the graph representing the correlation is made further smaller (more gentle) than that of the aspect illustrated in FIG. 30B. Thus, when the data based on press increases after point D in FIG. 29 by the operator's operation, the change in the zoom-in factor to the increase in the data based on press further becomes smaller (more gentle).

Therefore, also in this example, when the operator increases the data based on press from points B to C and zooms in the image too much, and thus decreases the data based on press to zoom out the image, he/she can zoom out the image carefully. Further, in this example, even if the operator decreases the data based on press from points C to D and zooms out the image too much, he/she can zoom in the image further carefully when he/she increases the data based on press to zoom in the image. Thus the operator can reach the preferable zoom factor more easily.

In addition, as illustrated in this example, when the correlation between the data based on press and the zoom factor is modified continuously each time the data based on press increases/decreases, the change in the zoom factor to the data based on press further becomes smaller (more gentle). Thus, even if the operator believes that he/she keeps the data based on press constant, when the data based on press detected by the press detection unit 40 repeats subtle increase/decrease, the change in the zoom factor to the increase/decrease of the data based on press may gradually become smaller (more gentle) against the intention of the operator.

Figure 31:
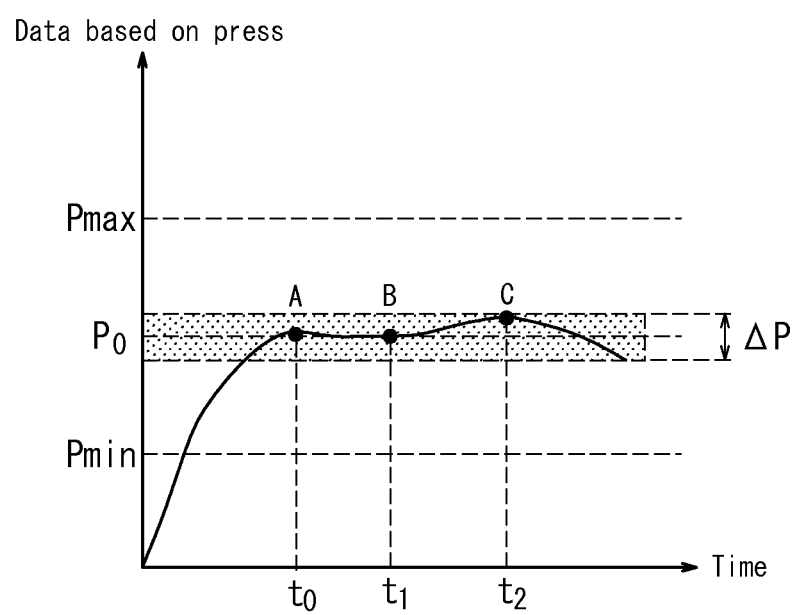
FIG. 31 is a graph illustrating still further example of change over time in the data based on press by the operator's operation according to the fourth embodiment.

Thus, in this example, in order to prevent such an inconvenience, when the data based on press repeats subtle increase/decrease, a measure to decrease (more gentle) the change in the zoom factor to the data based on press may not be taken. For example, as illustrated in FIG. 31, for the change over time in the data based on press detected by the press detection unit 40, a minute variation ΔP of the data based on press may be provided. Further, even if the data based on press changes within such a minute variation range ΔP, the correlation between the data based on press and the zoom factor may not be changed.

FIG. 31 is a graph illustrating an example of change over time in the data based on press by the operator's operation. Also in FIG. 31, the data based on press by the operator's operation is kept substantially constant from points A to B, and thus, at $t_1$, the data based on press P is correlated with the zoom factor X. In the example in FIG. 31, after point B, that is, after the standard for data based on press is set, the data based on press by the operator's operation slightly increases up to point C, and at point C, turns to decrease. However, the increase in the data based on press up to point C is within a predetermined variation ΔP of the data based on press, and thus the correlation between the data based on press and the zoom factor may not be modified.

In this manner, in this example, change in the zoom factor to the decrease/increase of the data based on press will not gradually become smaller (more gentle) against the intention of the operator.

Fifth Embodiment

Next, an electronic device according to the fifth embodiment of the present invention will be descried.

In the fifth embodiment, the process by the control unit 10 described in the first embodiment is modified. Excepting the above-described points, the electronic device 5 according to the fifth embodiment may be realized by the device configuration and the control that are basically similar to those of the electronic device 1 described in the above-described first embodiment. Thus, the descriptions that are the same as those described in the first embodiment are appropriately omitted.

In addition, also in the present embodiment, as in the case of the first embodiment, the control unit 10 determines whether or not the data based on press detected by the press detection unit 40 satisfies a predetermined condition. However, in the present embodiment, the control unit 10 determines whether or not the data based on press detected by the press detection unit 40 satisfies the predetermined condition, and it determines whether or not the data based on press detected by the press detection unit 40 turns from increase to decrease and then turns from decrease to increase as well.

Figure 32:
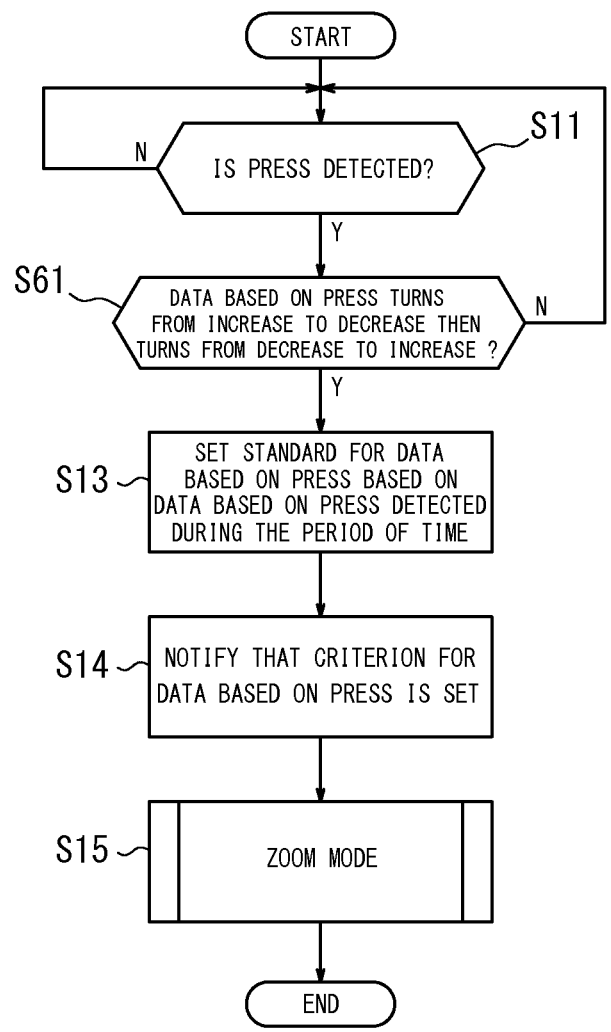
FIG. 32 is a flowchart illustrating a process for setting a standard for data based on press according to a fifth embodiment.

FIG. 32 is a flowchart describing a process centered on setting of a standard for data based on press according to the present embodiment. In the present embodiment, when the control unit 10 detects that the operator increases press by the operation and decreases once, then increases again without moving the position of his/her finger and the like on the touch sensor 20, a "standard for data based on press" is set. That is, in the present embodiment, when the data based on press by the operator's operation turns from increase to decrease and then turns from decrease to increase without movement of the position of operator's finger and the like on the touch sensor 20, a "standard for data based on press" is set. For setting of the "standard for data based on press," even if the position of the finger operating on the touch sensor 20 is moved, the "standard for data based on press" may be set.

When the process according to the present embodiment is started, the control unit 10 monitors a contact detected by the touch sensor 20 as well as a press detected by the press detection unit 40 (step S11). In the present embodiment, the control unit 10 preferably monitors while storing the history of change in the data based on press detected by the press detection unit 40 in the storage unit 60.

When the press detection unit 40 detects a data based on press in step S11, the control unit 10 determines whether or not the data based on press detected by the press detection unit 40 turns from increase to decrease, and then turns from decrease to increase (step S61). In this case, in order to notify the operator of setting of the "standard for data based on press" by this operation, for example, the display unit 30 may display the notification of "press the touch sensor strongly, once decrease the force and press again" and the like.

Figure 33:
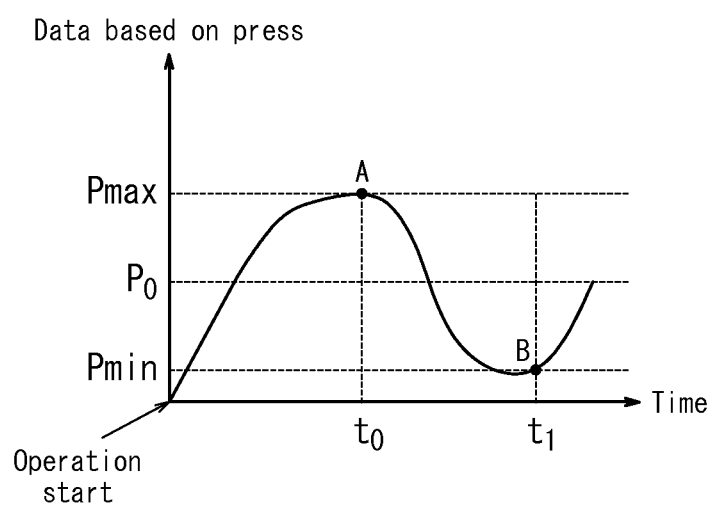
FIG. 33 is a graph illustrating an example of change over time in the data based on press by the operator's operation according to the fifth embodiment.

FIG. 33 is a graph describing an example of change over time in the data based on press by the operator's operation. In FIG. 33, the horizontal axis represents a passage of time, and the vertical axis represents the data based on press detected by the press detection unit 40. FIG. 33 illustrates an operation in which the operator starts pressing the touch sensor 20 (operation start), gradually increases the press, and at point A (i.e., $t_0$), turns the press from increase to decrease. Further, FIG. 33 illustrates a state where the operator gradually decreases the press from point A (i.e., $t_0$), and at point B (i.e., $t_1$) turns the press from decrease to increase.

When determining that the data based on press does not turn from decrease to increase after its turning from increase to decrease in step S61, the control unit 10 returns to step S11 to continue the process. On the other hand, when determining that the data based on press turns from increase to decrease, then turns from decrease to increase in step S61, the control unit 10 sets a standard for data based on press, based on the data based on press detected during the period of time (step S13). That is, in the present embodiment, the control unit 10 controls, when the data based on press detected by the press detection unit 40 turns from increase to decrease, then turns from decrease to increase, such that a standard for data based on press is set. In the example illustrated in FIG. 33, the data based on press turns from increase to decrease at $t_0$, and after that, at $t_1$, the data based on press turns from decrease to increase. Thus, in this case, the standard ($P_0$) for data based on press is set at $t_1$.

In this case, when the standard ($P_0$) for data based on press is set, the control unit 10 may calculate an average value of, for example, the data based on press ($P_{max}$) detected at point A (i.e., $t_0$) and the data based on press ($P_{min}$) detected at point B (i.e., $t_1$). When the standard for data based on press is calculated, calculation is not limited to the above-described average value, and a variety of calculations may be performed. For example, instead of the calculation of the above-described average value of $P_{max}$ and $P_{min}$, for example, a time factor such as, for example, the time from the start of operation to point A and/or the time from points A to B may be added. If a time factor is added, for example, when the time from the start of operation to point A is longer than that from points A to B, a value that is closer to $P_{max}$ than the average value of $P_{max}$ and $P_{min}$ may be set as a standard for data based on press. How much close to $P_{max}$ may be determined based on the ratio between the time from the start of the operation to point A and the time from points A to B. Also, for example, the standard ($P_0$) for data based on press may be set based only on the data based on press ($P_{max}$) detected at point A (i.e., $t_0$), or based only on the data based on press ($P_{min}$) detected at point B (i.e., $t_1$). Also, for example, when it is determined that the data based on press turns from increase to decrease, then turns from decrease to increase, the standard ($P_0$) for data based on press, which is a predetermined value previously stored in the storage unit 60, may be set.

When a standard for data based on press is set in step S13, the control unit 10 controls a corresponding function unit to notify the operator that the standard for data based on press has been set (step S14). In step S14, when the data based on press turns from increase to decrease, then turns from decrease to increase, the function unit notifies the operator that a standard for data based on press has been set. Thus, the control unit 10 may control the tactile sensation providing unit 50 to provide a tactile sensation to the operator by, for example, vibrating the touch sensor 20. Further, instead of providing a tactile sensation, or with providing a tactile sensation, for example, display on the display unit 30 may be changed, or a predetermined sound may be outputted from a sound output unit not illustrated, thereby notifying the operator that a standard for data based on press has been set. In FIG. 33, at $t_1$ (point B), a standard for data based on press is set, and the operator is informed that a standard for data based on press has been set as well.

The subsequent process can be performed in the same manner as the above-described first embodiment. Also, the process performed in the zoom mode as step S15 in FIG. 32 may be performed in the same manner as the above-described first embodiment.

In the present embodiment, the correlation between the data based on press and the zoom factor illustrated in step S21 in FIG. 5 may also be performed, as described in FIG. 6, in the same manner as the above-described first embodiment. As illustrated in FIG. 6, in step S21, the control unit 10 controls such that the data based on press (P) is correlated with the zoom factor (X) based on the standard ($P_0$) for data based on press set in step S13 in FIG. 32. $P_{max}$ on the horizontal axis represents the data based on press detected at point A (i.e., $t_0$) and $P_{min}$ represents the data based on press detected at point B (i.e., $t_1$).

In general, the data based on maximum or minimum press that can be detected by the press detection unit 40 is determined by the various conditions such as physical characteristics, arrangement, and the like, and the data based on press exceeding the maximum press or the data based on press falling below the minimum press cannot be detected. Therefore, $P_{max}$ is a value of data based on press that is equal to or smaller than the data based on a maximum press that can actually be detected by the press detection unit 40, and, similarly, $P_{min}$ is a value of data based on press that is equal to or greater than the data based on a minimum press that can be actually detected by the press detection unit 40. In other words, $P_{max}$ and $P_{min}$ are values set in a range of the data based on press that can be detected by the press detection unit 40 accurately and reliably.

In the present embodiment, the control unit 10 controls, when the data based on press detected by the press detection unit 40 turns from increase to decrease, then turns from decrease to increase, such that a standard for data based on press is set. In this case, in the present embodiment, the control unit 10 may control, based on the data based on press when the data based on press turns from increase to decrease and the data based on press when the data based on press turns from decrease to increase, such that a standard for data based on press is set. After the process of step S25, the control unit 10 returns to step S22 to continue the process.

Figure 34:
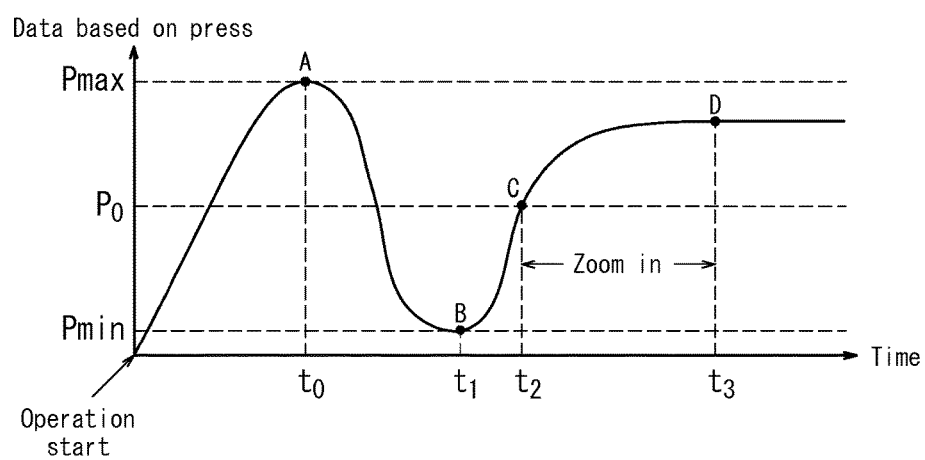
FIG. 34 is a graph illustrating another example of change over time in the data based on press by the operator's operation according to the fifth embodiment.

FIG. 34 is, as FIG. 33, a graph illustrating an example of change over time in the data based on press by the operator's operation. In FIG. 34, as illustrated in FIG. 33, after point B, that is, after a standard for data based on press is set, an increase in the data based on press by the operator's operation is detected up to point D via point C. In such a case, neither zoom in nor zoom out is performed until reaching the standard $P_0$ for data based on press, that is, during the time from $t_1$ to $t_2$. However, as illustrated in FIG. 34, during the time from $t_2$ to $t_3$, as the data based on press detected by the press detection unit 40 increases based on $P_0$ as a standard, the image displayed on the display unit 30 is zoomed in. Further, after $t_3$, that is, after point D, the data based on press detected by the press detection unit 40 is kept substantially constant, and when a sliding operation is detected at the point in time, the data based on press is fixed to the zoom factor at the point in time. That is, in this case, the image displayed on the display unit 30 is neither zoomed in nor out. After that, when the data based on press by the operator's operation to the touch sensor 20 turns again from increase to decrease, then turns from decrease to increase, a new standard for data based on press is set, and based on the image displayed on the display unit 30 at that moment, the image can be zoomed in or out again.

Figure 35:
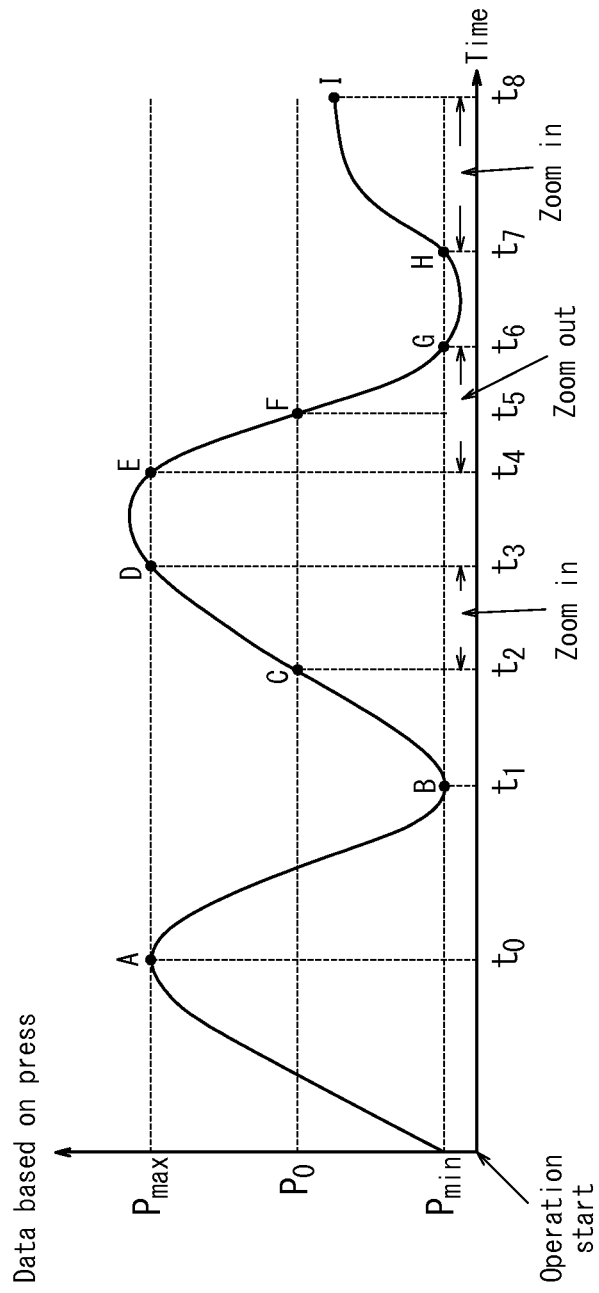
FIG. 35 is a graph illustrating still another example of change over time in the data based on press by the operator's operation according to the fifth embodiment.

FIG. 35 is, as FIG. 33, also a graph illustrating another example of change over time in the data based on press by the operator's operation. In FIG. 35, after point B, that is, after a standard for data based on press is set, increase in data based on press by the operator's operation is detected up to after point D. After point D, the data based on press turns to decrease, decreases from point E to after point G, and after point G turns to increase, then increases from points H to I.

In such a case, as illustrated in FIG. 35, the image displayed on the display unit 30 is zoomed in from $t_2$ to $t_3$, and is zoomed out from $t_4$ to $t_6$, then is zoomed in again from $t_7$ to $t_8$. At $t_5$, the zoom factor returns to the zoom factor at the time when the standard for data based on press is set. That is, at point F, the image is displayed at a zoom factor that is the same as that at the time when the standard for data based on press is set. Further, from $t_3$ to $t_4$ and from $t_6$ to $t_7$, the data based on press exceeds $P_{max}$ or falls below $P_{min}$, thus neither zoom in nor zoom out is performed.

Figure 36:
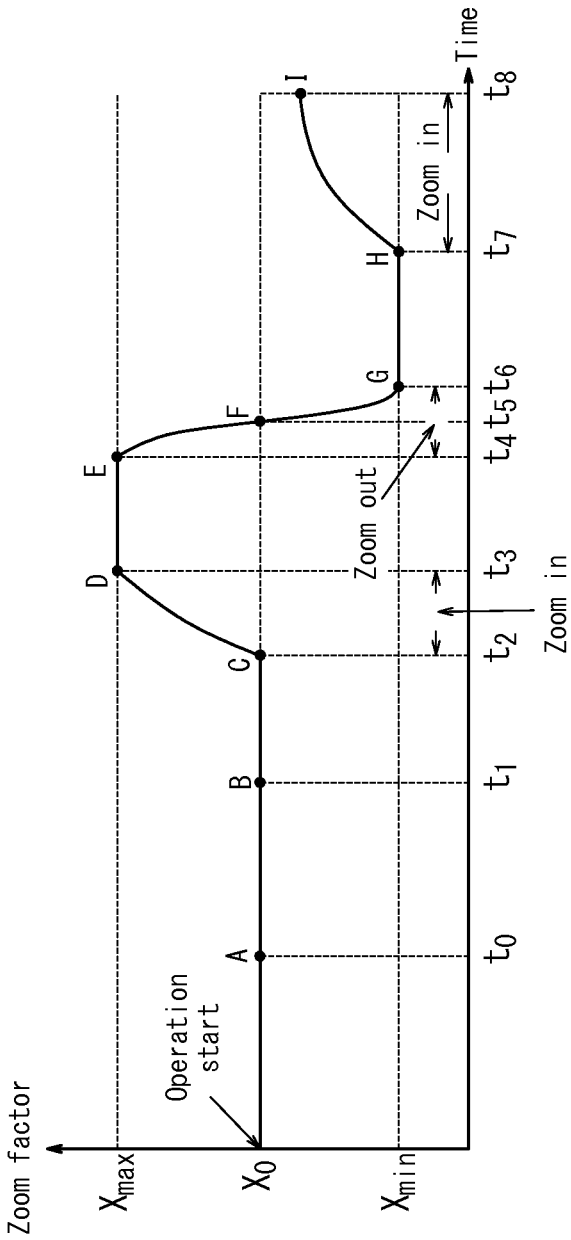
FIG. 36 is a graph illustrating an example of changes over time in the zoom factor in response to the operator's operation according to the fifth embodiment.

FIG. 36 is, as illustrated in FIG. 35, a graph illustrating change over time of the zoom factor for the image displayed on the display unit 30 when the data based on press changes over time. Note that, in FIG. 36, the horizontal axis represents a passage of time, but the vertical axis represents a zoom factor for the image displayed on the display unit 30.

Comparing FIG. 35 with FIG. 36, from the operation starting point to $t_1$, that is, before the point in time at which a standard for data based on press is set, the mode is not moved to the zoom mode yet, which indicates that, although the data based on press changes, the zoom factor does not change from the standard. Further, the mode is moved to the zoom mode from $t_1$ to $t_2$, however, as described above, the data based on press does not reach the standard $P_0$ yet, and thus neither zoom in nor zoom out is performed. Moreover, as described above, the zoom factor does not change from $t_3$ to $t_4$ and from $t_6$ to $t_7$.

The concrete example of display on the display unit 30 when the operator executes operations to the electronic device 5 according to the present embodiment may be performed in the same manner as that described in the first embodiment with reference to FIG. 11.

As illustrated in FIG. 11A, before the standard for data based on press is set, that is, in the stage before moving to the zoom mode, the operator executes a sliding operation to the touch sensor 20, thereby arbitrarily sliding the map of Japan displayed on the display unit 30. Further, in the present embodiment, while the position touched by the operator is kept on an arbitral position of the touch sensor 20, the data based on press turns from increase to decrease, then turns from decrease to increase, and thus a standard for data based on press is set and the electronic device 5 moves to the zoom mode.

Subsequently, when the operator increases the data based on press by which the touch sensor 20 is operated and the data based on press exceeds the standard $P_0$ for data based on press, from the state illustrated in FIG. 11A, the image of map of Japan displayed on the display unit 30 is zoomed in centering on the position operated by the operator, as illustrated in FIG. 11B. In the same manner, when the operator further increases the data based on press by which the touch sensor 20 is operated, from the state illustrated in FIG. 11B, the image of map of Japan displayed on the display unit 30 is further zoomed in centering on the position operated by the operator, as illustrated in FIG. 11C.

In this manner, according to the present embodiment, if the housing of the electronic device is compact, the operator may, while holding the electronic device with one hand, execute zoom operations and the like that is similar to a pinching operation, using the tip of the same hand. Further, according to the present embodiment, regardless of the size of the electronic device, operations to the touch sensor 20 may be executed with only one finger, that is, with only a press on one portion. Further, according to the present embodiment, operation can be started at an arbitrary position on the touch sensor 20, and thus the operation can be executed smoothly with less operation steps. Moreover, according to the present embodiment, it is not necessary to display a dedicated object for performing a specific process such as zoom in or zoom out on the display unit, and thus the display region on the display unit can effectively be utilized.

Figure 37:
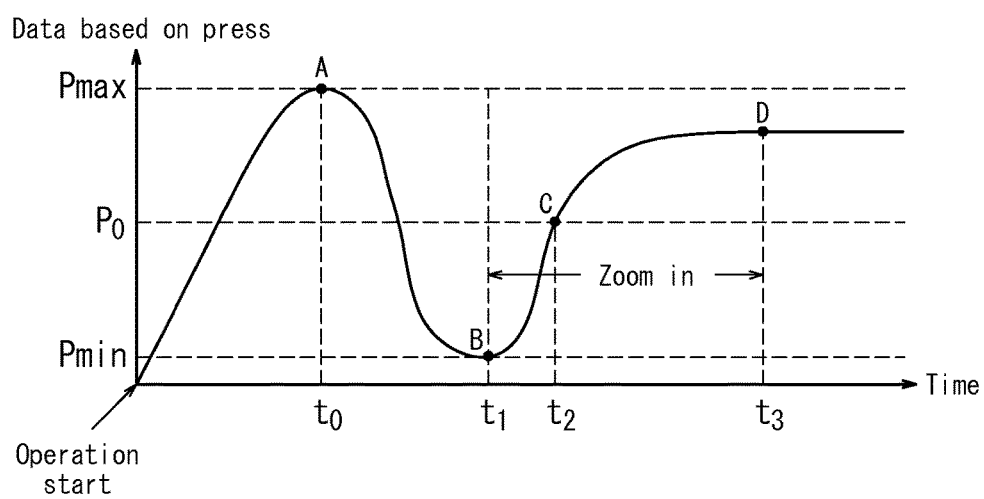
FIG. 37 is a graph illustrating yet another example of change over time in the data based on press by the operator's operation according to variation of the fifth embodiment.

In addition, in the present embodiment, as illustrated in FIG. 34, an explanation is given assuming that, after point B, that is, after the standard for data based on press is set, even if an increase in the data based on press by the operator's operation is detected, neither zoom in nor out is performed until reaching the standard $P_0$ for data based on press. However, as illustrated in FIG. 37, for example, at point B, that is, when the standard for data based on press is set, the image displayed on the display unit 30 may be zoomed out to the lowest zoom factor ($X_{min}$). In this case, after point B, that is, after the standard for data based on press is set, when an increase in the data based on press is detected until reaching point C, even if not reaching the standard $P_0$ for data based on press, the image is zoomed in even during the time from $t_1$ to $t_2$.

Sixth Embodiment

Next, an electronic device according to the sixth embodiment of the present invention will be descried.

In the sixth embodiment, the process by the control unit 10 described in the above-described fifth embodiment is changed. That is, in the sixth embodiment, in the electronic device 5 according to the fifth embodiment, the process of step S25 described in FIG. 5 is changed. In greater detail, in the electronic device 6 according to the sixth embodiment, in the zoom mode, the speed at which the image displayed on the display unit 30 is zoomed in or out is altered according to the difference between the standard $P_0$ for data based on press and the data based on press P detected by the press detection unit 40.

Excepting the above-described points, the electronic device 6 according to the sixth embodiment can be realized by the device configuration and the control that are basically the same as those of the electronic devices 5 and 2 described respectively in the above-described fifth embodiment and the second embodiment. Thus, the descriptions that are the same as those described in the fifth and the second embodiments are appropriately omitted.

The process by the electronic device 6 according to the sixth embodiment can be performed according to the flowchart described with reference to FIG. 12 in the second embodiment.

Figure 38:
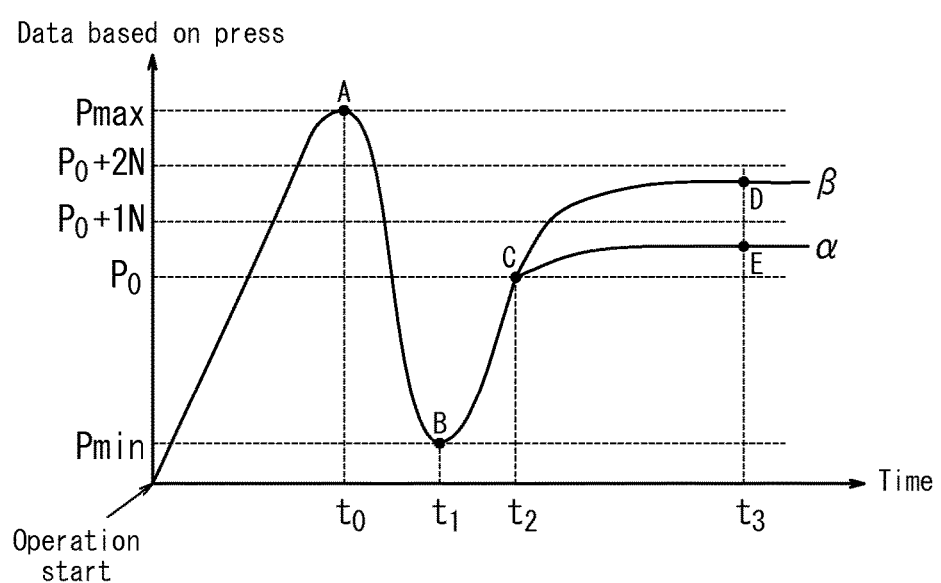
FIG. 38 is a graph illustrating an example of change over time in the data based on press by the operator's operation according to a sixth embodiment.

FIG. 38 is, as FIG. 34 and the like, a graph illustrating an example of change over time in the data based on press by the operator's operation. FIG. 38 illustrates both the case where, after point B, that is, after the standard for data based on press is set, the data based on press by the operator's operation increases and thus reaches point E via point C, and the case where the data based on press by the operator's operation further increases and thus reaches point D. In the present embodiment, when the standard $P_0$ for data based on press is set, based on the standard $P_0$ for data based on press, some stages of data based on press are set above and below the standard.

FIG. 38 illustrates only the stages of data based on press that are set higher than the standard $P_0$ for data based on press. Further, in FIG. 38, as an example, with respect to the data based on press that is greater than the standard $P_0$ for data based on press, only two stages of data based on press set at intervals of 1N are illustrated. However, when stages of data based on press are set, each stage of data based on press may be set at intervals of 1N, and the stages may be set more closely or more sparsely. Moreover, the number of such stages may be other than two, or a great number of stages may correspond to the change in data based on press in an analog manner. Further, such stages of data based on press may be set at an arbitrary timing, and the above-described stages may be calculated each time a press is detected.

As illustrated in FIG. 38, in this example, as a speed at which the image displayed on the display unit 30 is zoomed in, a speed α corresponds to the stages of data based on press from the standard $P_0$ for data based on press to $P_0+1N$. In addition, as illustrated in FIG. 38, in this example, as a speed at which the image displayed on the display unit 30 is zoomed in, a speed β corresponds to the stages of data based on press from $P_0+1N$ to $P_0+2N$. In this case, a speed β can be a speed at which the image displayed on the display unit 30 is zoomed in faster than at a speed α. That is, in this case, when the operator operates the touch sensor 20, if he/she keeps a greater press, the image displayed on the display unit 30 is zoomed in faster.

Figure 39:
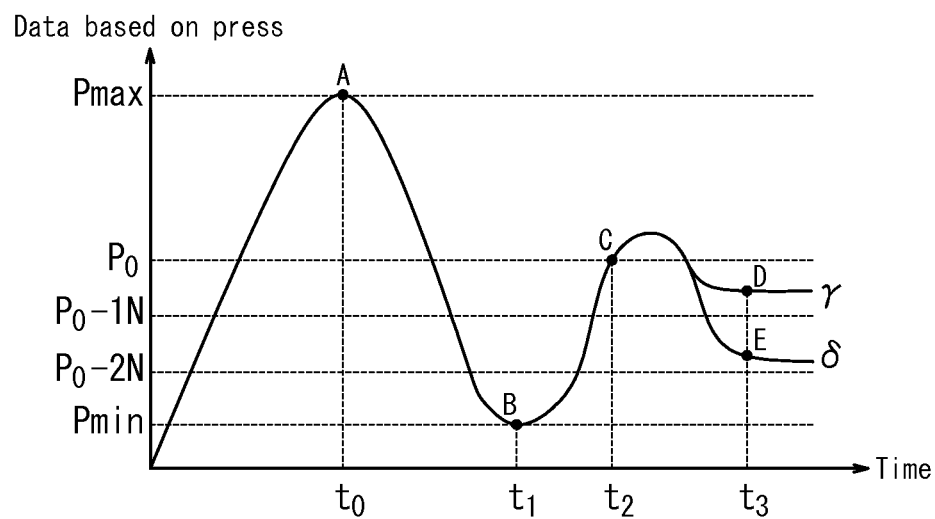
FIG. 39 is a graph illustrating another example of change over time in the data based on press by the operator's operation according to the sixth embodiment.

FIG. 39 is, as FIG. 34 and the like, a graph illustrating another example of change over time in the data based on press by the operator's operation. FIG. 39 illustrates both the case where, after point B, that is, after the standard for data based on press is set, the data based on press increases and reaches the standard $P_0$ for data based on press at point C, and after that, the data based on press decreases and thus reaches point D, and the case where, the data based on press by the operator's operation further decreases and thus reaches point E.

FIG. 39 illustrates only the stages of data based on press that are set lower than the standard $P_0$ for data based on press. Further, in FIG. 39, as an example, with respect to the data based on press that is smaller than the standard $P_0$ for data based on press, only two stages of data based on press set at intervals of 1N are illustrated. However, when the stages of the data based on press are set, each stage of data based on press may be set at intervals of 1N, and the number of such stages may be other than two. Further, such stages of data based on press may be set at an arbitrary timing.

As illustrated in FIG. 39, in this example, as a speed at which the image displayed on the display unit 30 is zoomed out, a speed γ corresponds to the stages of data based on press from the standard $P_0$ for data based on press to $P_0-1N$. In addition, as illustrated in FIG. 39, in this example, as a speed at which the image displayed on the display unit 30 is zoomed in, a speed δ corresponds to the stages of data based on press from $P_0-1N$ to $P_0-2N$. In this case, a speed δ may be a speed at which the image displayed on the display unit 30 is zoomed out faster than at a speed γ. That is, in this case, when the operator operates the touch sensor 20, if he/she keeps smaller press, the image displayed on the display unit 30 is zoomed out faster.

Figure 40:
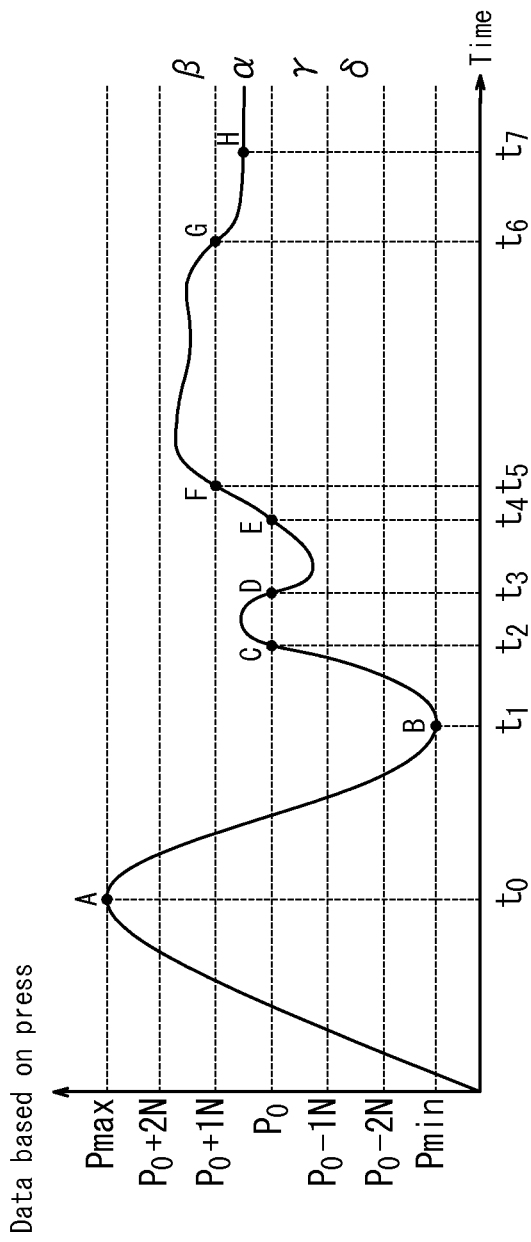
FIG. 40 is a graph illustrating still another example of change over time in the data based on press by the operator's operation according to the sixth embodiment.

FIG. 40 is a graph illustrating a still another example of change over time in the data based on press by the operator's operation. In FIG. 40, after point B, that is, after a standard for data based on press is set, the data based on press increases and reaches the standard $P_0$ for data based on press at point C, then decreases once and turns to increase, then after that, turns from increase to decrease.

FIG. 40 illustrates both the stages of data based on press that are set lower than the standard $P_0$ for data based on press and the stages of data based on press that are set higher than the standard $P_0$ for data based on press. Further, in the example illustrated in FIG. 40, two stages each are illustrated both for the data based on press that is greater than the standard $P_0$ for data based on press and that is smaller than the standard $P_0$ for data based on press, each stage is set at intervals of 1N. Moreover, in FIG. 40, as in the case of FIG. 38, a speed α corresponds to the stages of the data based on press from $P_0$ to $P_0+1N$, and a speed β corresponds to the stages of the data based on press from $P_0+1N$ to $P_0+2N$. In addition, in FIG. 40, as in the case of FIG. 39, a speed γ corresponds to the stages of data based on press from $P_0$ to $P_0-1N$, and a speed δ corresponds to the stages of data based on press from $P_0-1N$ to $P_0-2N$.

Figure 41:
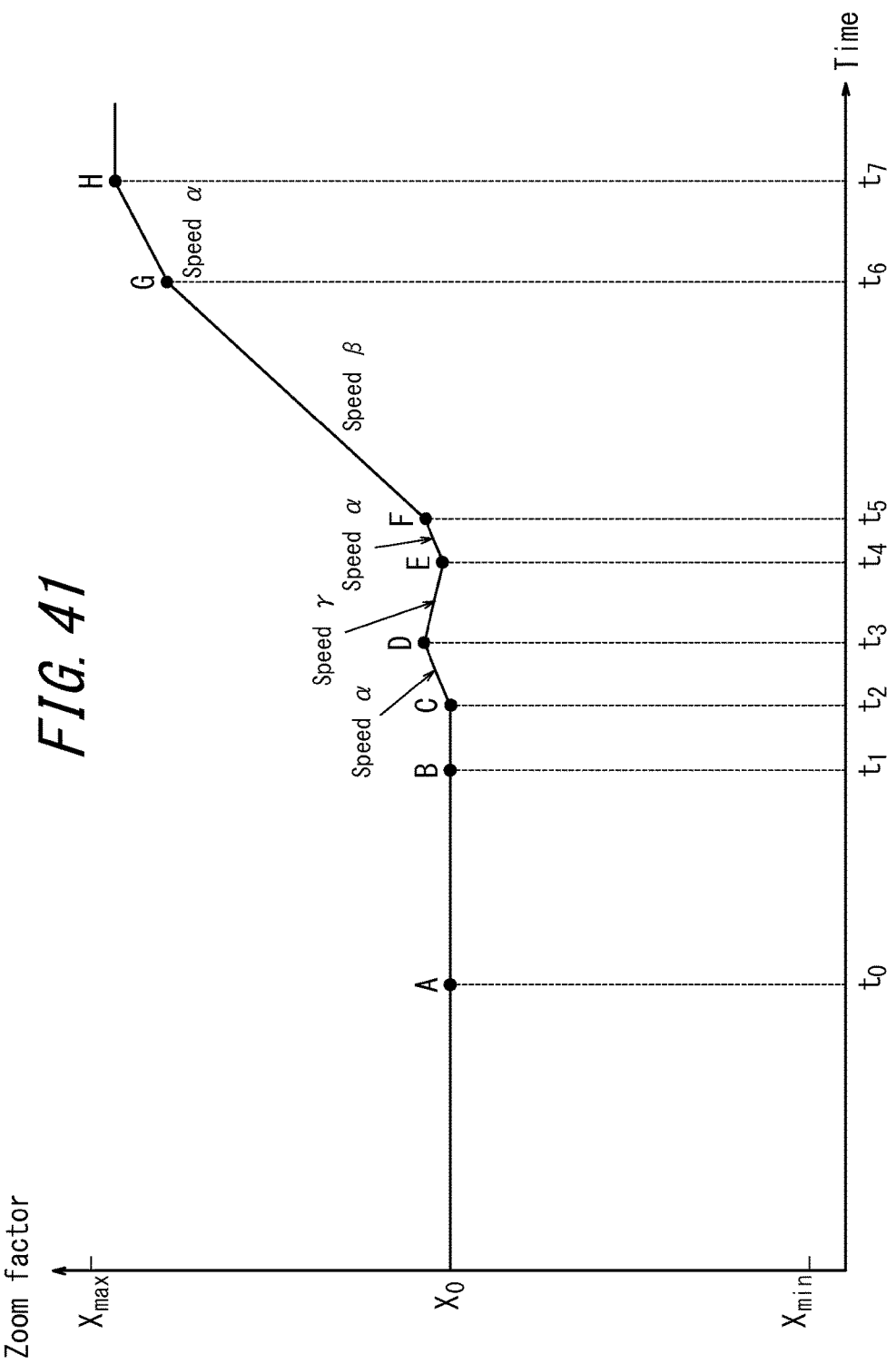
FIG. 41 is a graph illustrating an example of changes over time in the zoom factor in response to the operator's operation according to the sixth embodiment.

FIG. 41 is a graph illustrating change over time in a zoom factor of the image displayed on the display unit 30, when the data based on press changes over time as illustrated in FIG. 40. Note that, in FIG. 41, the horizontal axis represents a passage of time, however, the vertical axis represents a zoom factor of the image displayed on the display unit 30.

Comparing FIG. 40 with FIG. 41, from the operation starting point to $t_1$, that is, until the time when the standard for data based on press is set, the mode is not yet moved to the zoom mode, which indicates that, although the data based on press changes, the zoom factor does not change from the standard. Further, as described above, although the mode is moved to the zoom mode from $t_1$ to $t_2$, as described above, the data based on press does not reach the standard $P_0$ for data based on press yet, as illustrated in FIG. 41, thus neither zoom in nor out is performed.

As illustrated in FIG. 40, the data based on press is kept from $P_0$ to $P_0+1N$ during the time from $t_2$ to $t_3$, and thus as illustrated in FIG. 41, in this interval, the image displayed on the display unit 30 is zoomed in at a speed α. Further, as illustrated in FIG. 40, the data based on press is kept from $P_0$ to $P_0-1N$ during the time from $t_3$ to $t_4$, and thus as illustrated in FIG. 41, in this interval, the image displayed on the display unit 30 is zoomed out at a speed γ. Moreover, as illustrated in FIG. 40, the data based on press is kept from $P_0+1N$ to $P_0+2N$ during the time from $t_5$ to $t_6$, and thus as illustrated in FIG. 41, in this interval, the image displayed on the display unit 30 is zoomed in at a speed β. Further, as illustrated in FIG. 40, the data based on press is kept from $P_0$ to $P_0+1N$ during the time from $t_6$ to $t_7$, and thus as illustrated in FIG. 41, in this interval, the image displayed on the display unit 30 is zoomed in at a speed α.

In this manner, according to the present embodiment, as in the case of the electronic device 5 described in the fifth embodiment, the portions on which the operator executes operations can be reduced and the operation steps by the operator can be reduced as well. Further, according to the present embodiment, when the operator operates with large press, the image displayed on the display unit 30 is zoomed in at a higher speed for that, and thus the operator requires only a short period of time to operate with large press. Thus the burden on the operator for applying a pressing force can be reduced.

Seventh Embodiment

Next, an electronic device according to the seventh embodiment of the present invention will be descried.

In the seventh embodiment, the process by the control unit 10 described in the fifth embodiment is changed. That is, in the seventh embodiment, in the electronic device 5 according to the fifth embodiment, the aspect of the process of step S21 described in FIG. 5 is changed. In greater detail, in the electronic device 7 according to the seventh embodiment, after a standard for data based on press is set, the aspect of correlation between the data based on press and the zoom factor described in FIG. 6 is changed.

Excepting the above-described points, the electronic device 7 according to the seventh embodiment can be realized by the device configuration and the control that are basically the same as those of the electronic devices 5 and 3 described respectively in the above-described fifth and third embodiments. Thus, the descriptions that are the same as those described in the fifth and third embodiments are appropriately omitted.

In the fifth embodiment, as illustrated using FIG. 6, as a correlation between the data based on press and the zoom factor, the change in the data based on press from $P_{min}$ to $P_0$ is correlated with the linear change in the zoom factor from $X_{min}$ to $X_0$. In the same manner, in the fifth embodiment, the change in the data based on press from $P_0$ to $P_{max}$ is correlated with the linear change in the zoom factor from $X_0$ to $X_{max}$. In this case, in FIG. 6, for simplification of description, an example of the case where the standard $P_0$ for data based on press is set at around the intermediate point between $P_{max}$ and $P_{min}$ is given. However, when the standard $P_0$ for data based on press is actually set, it is highly likely that the $P_0$ is not set at the intermediate point between $P_{max}$ and $P_{min}$. In this case, that is, when the standard $P_0$ for data based on press is not set at the intermediate point between $P_{max}$ and $P_{min}$, the graph of correlation in FIG. 6 is not linear, and the graph slope changes at around $P_0$.

As described in the fifth embodiment, when the standard $P_0$ for data based on press is set at the intermediate point between $P_{max}$ and $P_{min}$, the correlation between the data based on press and the zoom factor is represented by, as illustrated in FIG. 17A, a straight line from $P_{min}$ to $P_{max}$. In FIG. 17, for convenience of description, the vertical axis and the horizontal axis are set in a manner different from that in FIG. 6.

In this case, for example, when the standard $P_0$ for data based on press is set at the position that is closer to $P_{max}$, the correlation between the data based on press and the zoom factor is, as illustrated in FIG. 17B, represented by a graph whose slope changes at $P_0$. Further, for example, when the standard $P_0$ for data based on press is set at the position that is closer to $P_{min}$, the correlation between the data based on press and the zoom factor is, as illustrated in FIG. 17C, represented also by a graph whose slope changes at $P_0$.

As illustrated in FIGS. 17B and 17C, when the slope of the graph representing an correlation between the data based on press and the zoom factor changes at the point of $P_0$, if the operator changes the data based on press across the standard $P_0$ for data based on press, it may cause a feeling of strangeness to the following performance of zooming in or out, as in the case of the third embodiment.

Therefore, in the present embodiment, in order to cope with such inconveniences, when the data based on press is correlated with the zoom factor as described in step S21 in FIG. 5, correction is made so that the amount of change in the zoom factor to the data based on press will not significantly change across the standard $P_0$ for data based on press. For detailed example, when the correlation as illustrated in FIG. 17B is performed, the control unit 10 corrects these correlations and correlates the data based on press with the zoom factor as illustrated in FIG. 18A.

When the data based on press is correlated with the zoom factor as illustrated in FIG. 18A, the standard $P_0$ for data based on press is set at the intermediate point between $P_{min}$ (actually the data based on press P at which the zoom factor becomes the minimum $X_{min}$) and $P_{max}$. Thus, the correlation between the data based on press and the zoom factor is represented by a graph whose slope does not change across $P_0$, and even if the operator changes the data based on press across the standard $P_0$ for data based on press, it may not cause a feeling of strangeness to the following performance of zooming in or out.

Moreover, for example, when the correlation is performed as illustrated in FIG. 17C, the control unit 10 corrects this correlation and correlates the data based on press with the zoom factor as illustrated in FIG. 18B.

When the correlation between the data based on press and the zoom factor is performed as illustrated in FIG. 18B, the standard $P_0$ for data based on press is set at the intermediate point between $P_{min}$ and $P_{max}$ (the data based on press P at which the zoom factor is the maximum $X_{max}$). Thus, the correlation between the data based on press and the zoom factor is represented by a graph with a slope that does not change across $P_0$, and even if the operator changes press across the standard $P_0$ for data based on press, it may not cause a feeling of strangeness to the following performance of zooming in or out.

In this manner, also in the present embodiment, the control unit 10 controls, as in the case of the fifth embodiment, such that the parameter value associated with a predetermined process is increased/decreased according to the difference between the standard for data based on press and the data based on press detected by the press detection unit 40. However, in the present embodiment, the control unit 10 controls such that, in the case where the data based on press detected by the press detection unit 40 increase and in the case where the data based on press detected by the press detection unit 40 decreases, the amount of increasing/decreasing the parameter value will be substantially constant. In this case, the "amount of increasing/decreasing the parameter value" corresponds to, in the above-described example, the amount of change in the zoom factor to the data based on press, according to the difference between the standard for data based on press and the data based on press detected by the press detection unit 40.

Further, in the present embodiment, the aspect in which, when the data based on press is correlated with the zoom factor, correction is made so that the amount of change in the zoom factor to the data based on press will not change across the standard $P_0$ for data based on press, is not limited to that described in FIG. 18, and a variety of aspects may be assumed.

In this manner, according to the present embodiment, even if the operator changes press across the standard $P_0$ for data based on press, the amount of increasing/decreasing the parameter value associated with a predetermined process does not significantly change and remains almost the same. Therefore, according to the present embodiment, when the operator changes press across the standard $P_0$ for data based on press, no feeling of strangeness is given to the following performance when the image displayed on the display unit 30 is zoomed in or out.

Eighth Embodiment

Next, an electronic device according to the eighth embodiment of the present invention will be described.

Also in the eighth embodiment, the process by the control unit 10 in the above-described fifth embodiment is modified. That is, in the eighth embodiment, the process following the step S25 described in FIG. 5 is changed in the electronic device 1 according to the fifth embodiment. That is, in the electronic device 8 according to the eighth embodiment, when a standard for data based on press is set and it is determined that a predetermined operation is executed during execution of zoom in or zoom out process of the image according to the data based on press, the aspect of correlating the data based on press with the zoom factor described in FIG. 6 is changed.

Excepting the above-described points, the electronic device 8 according to the eighth embodiment can be realized by the device configuration and the control that are basically the same as those of the electronic devices 5 and 4 respectively described in the above-described fifth and fourth embodiments. Thus, the descriptions that are the same as those described in the fifth and fourth embodiments are appropriately omitted.

The eighth embodiment provides a measure to easily modify to the desired zoom factor when the operator zooms in or out the image too much during zoom-in/zoom-out process of the image displayed on the display unit 30 by the electronic device 5 according to the fifth embodiment.

The process by the electronic device 8 according to the eighth embodiment can be performed by the fourth embodiment based on the flowchart described in FIG. 20.

In the eighth embodiment, after step S25 in FIG. 20, the control unit 10 determines whether or not the data based on press P detected by the press detection unit 40 increases once, and exceeds $P_{max}$, then turns to decrease (step S41). When it is determined that the data based on press P exceeds $P_{max}$ and turns to decrease in step S41, the control unit 10 modifies the correlation between the data based on press and the zoom factor (step S42).

Moreover, in step S41, even if it is determined that the data based on press P detected by the press detection unit 40 P decreases, falls below $P_{min}$ and turns to increase, the control unit 10 performs a process of step S42. Further, even if it is determined that, in step S41, the data based on press P falls below $P_{min}$ and turns to increase, the control unit 10 modifies the correlation between the data based on press and the zoom factor (step S42).

In step S42, when the correlation between the data based on press and the zoom factor is modified, the control unit 10 returns to step S22 to continue the process. In addition, when it is not determined that the above-described predetermined operation is performed in step S41, the control unit 10 does not perform the process of step S42, and returns to step S22 to continue the process.

Subsequently, modification of the correlation between the data based on press and the zoom factor performed in step S42 according to the present embodiment is described.

Figure 42:
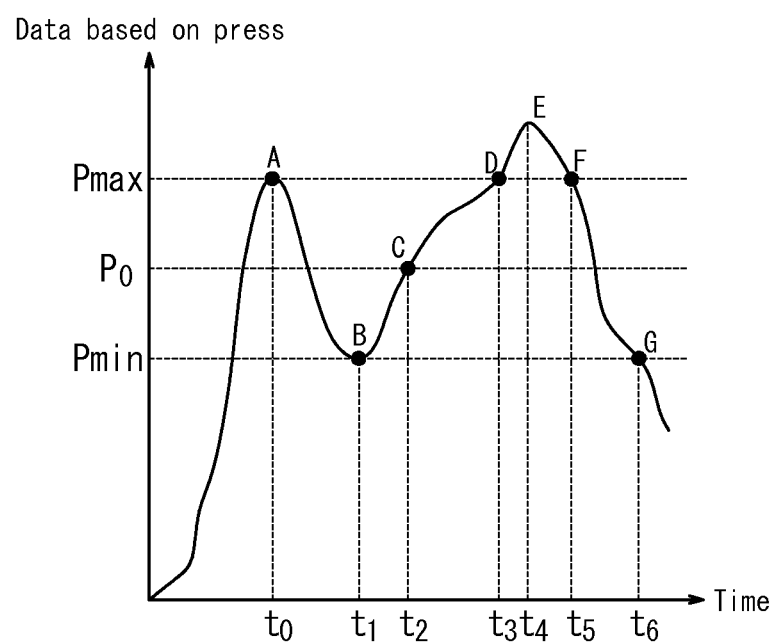
FIG. 42 is a graph illustrating an example of change over time in the data based on press by the operator's operation according to an eighth embodiment.

FIG. 42 is, as FIG. 34 and the like described in the fifth embodiment, a graph illustrating an example of change over time in the data based on press by the operator's operation. In FIG. 42, from points A to B, the data based on press by the operator's operation turns from increase to decrease, then turns from decrease to increase and thus, as illustrated in FIG. 22A, the data based on press P is correlated with the zoom factor X (step S21 in FIG. 20). The processing so far is the same as that described with reference to FIG. 6 and the like in the above-described fifth embodiment.

In the example of FIG. 42, after point B, that is, after a standard for data based on press is set, the data based on press by the operator's operation exceeds $P_{max}$ via points C and D and increases up to point E, and at point E, turns to decrease (Yes in step S41). Therefore, in this case, the correlation between the data based on press and the zoom factor is modified to, for example, the aspect as illustrated in FIG. 22B (step S42). The slope of the graph representing the correlation between the data based on press and the zoom factor illustrated in FIG. 22B is smaller (more gentle) than that of the aspect illustrated in FIG. 22A. Thus, when the data based on press decreases from points F to G in FIG. 42 by the operator's operation (corresponding to the decrease from $P_{min}$ to $P_{max}$ in FIG. 22B), the change in the zoom-out factor to the decrease in the data based on press also becomes smaller (more gentle). Therefore, the operator increases the data based on press up to point D and the image is zoomed in too much, and thus decreases the data based on press to zoom out the image, he/she can zoom out the image carefully, and thus can easily reach the desired zoom factor.

Figure 43:
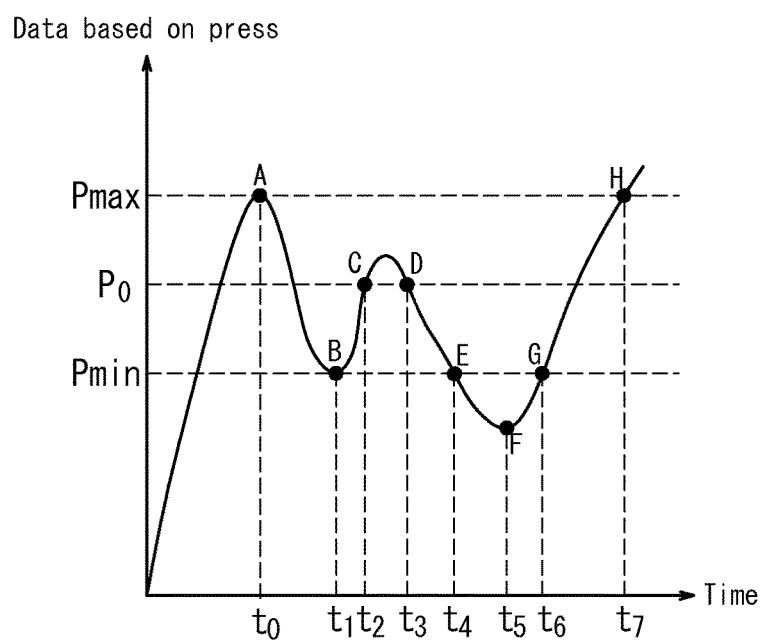
FIG. 43 is a graph illustrating another example of change over time in the data based on press by the operator's operation according to the eighth embodiment.

FIG. 43 is, as FIG. 34 and the like described in the first embodiment, a graph illustrating an example of change over time in the data based on press by the operator's operation. Also in FIG. 43, from points A to B, the data based on press by the operator's operation turns from increase to decrease, then turns from decrease to increase, and thus, as illustrated in FIG. 22A, the data based on press P is correlated with the zoom factor X (step S21 in FIG. 20).

In the example of FIG. 43, after point B, that is, after a standard for data based on press is set, the data based on press by the operator's operation reaches the standard $P_0$ for data based on a press at point C, and turns to decrease. Then, the data based on press by the operator's operation that turns to decrease after point C falls below $P_{min}$ via points D and E and decreases to point F, then at point F, turns to increase (Yes in step S41). Therefore, in this case, the correlation between the data based on press and the zoom factor is modified to, for example, the aspect as illustrated in FIG. 22C (step S42). The slope of the graph representing the correlation between the data based on press and the zoom factor illustrated in FIG. 22C is also smaller (more gentle) than that of the aspect illustrated in FIG. 22A. Thus, when the data based on press increases from points G to H in FIG. 43 by the operator's operation (corresponding to the increase from $P_{min}$ to $P_{max}$ in FIG. 22C), change in the zoom-out factor to the increase in the data based on press also becomes smaller (more gentle). Therefore, when the operator decreases the data based on press to point E and thus zooms out the image too much, then increases the data based on press to zoom in the image, he/she can zoom in the image carefully, and thus easily reach the desired zoom factor.

In this manner, in the present embodiment, the control unit 10 controls, as in the case of the fifth embodiment, such that the parameter value associated with a predetermined process is increased/decreased according to the difference between the standard for data based on press and the data based on press detected by the press detection unit 40. However, in the present embodiment, the control unit 10 controls, before and after the data based on press detected by the press detection unit 40 turns from either increase or decrease to the other, such that, the amount of increasing/decreasing the parameter value will be different. In this case, "the amount of increasing/decreasing the parameter value" corresponds to, in the above-described example, the amount of change in the zoom factor to the data based on press, according to the difference between the standard for data based on press and the data based on press detected by the press detection unit 40. In addition, as described above, the control unit 10 preferably controls, after the data based on press detected by the press detection unit 40 turns from increase to decrease, such that the amount of decreasing the parameter value is smaller than that of before that. In the same manner, the control unit 10 preferably controls, after the data based on press detected by the press detection unit 40 turns from decrease to increase, such that the amount of increasing the parameter value is smaller than that of before that. Also, in the present embodiment, in order to decrease (more gentle) the change in the zoom factor to the increase/decrease of the data based on press, it is preferred that, for example, when the sliding operation is detected and the like in step S22 in FIG. 20, the correlation between the data based on press and the zoom factor is restored to the correlation before modification.

Next, another example of the eighth embodiment will be described.

The process by the electronic device 8 according to another example of the eighth embodiment can be performed based on the flowchart described in FIG. 24 in the fourth embodiment. FIG. 24 is, as FIG. 20, a flowchart describing a process performed in the zoom mode illustrated in FIG. 3 as step S15.

In the above-described example, as described in step S41 in FIG. 20, when it is determined that a predetermined operation is executed by the operator, the aspect of correlating the data based on press with the zoom factor is modified. Also, in the above-described example, "when it is determined that a predetermined operation is executed" is "when the data based on press P exceeds the data based on maximum press $P_{max}$ and turns to decrease", and "when the data based on press P falls below the data based on minimum press $P_{min}$ and turns to increase." In the example described below, when it is determined that a predetermined operation is executed, the aspect of the correlation between the data based on press and the zoom factor is changed, which is the same as the example described above, however, in this case, the content of the predetermined operation is modified. That is, in this example, as illustrated in step S51 in FIG. 24, when the data based on press P turns from increase to decrease, and when the data based on press P turns from decrease to increase, the correlation between the data based on press and the zoom factor is modified. In short, in this example, even if the data based on press P does not exceed $P_{max}$ when it turns from increase to decrease, or even if the data based on press P does not fall below $P_{min}$ when it turns from decrease to increase, the correlation between the data based on press and the zoom factor is modified, as in the case of the above-described example.

Next, modification of the correlation between the data based on press and the zoom factor performed in this example will be described.

Figure 44:
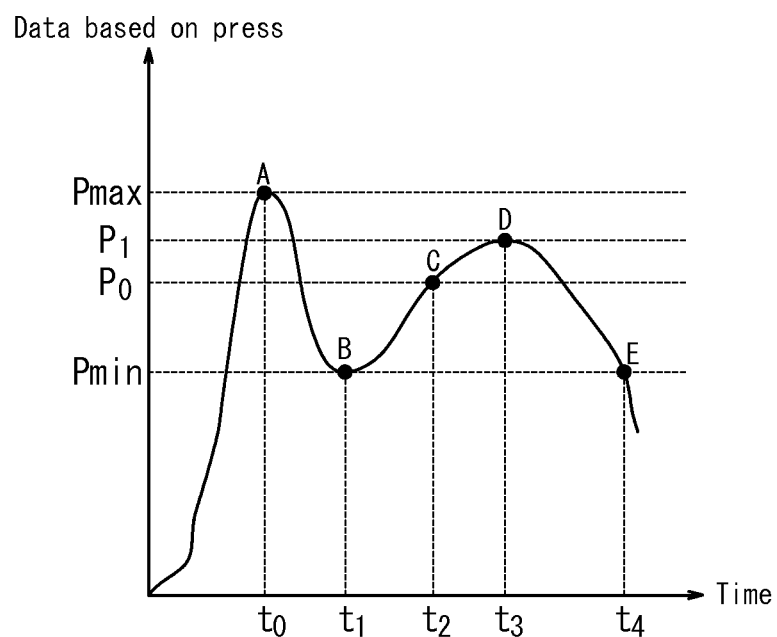
FIG. 44 is a graph illustrating still another example of change over time in the data based on press by the operator's operation according to the eighth embodiment.

FIG. 44 is, as FIG. 42, a graph illustrating an example of change over time in the data based on press by the operator's operation. In FIG. 44, from points A to B, the data based on press by the operator's operation turns from increase to decrease, then turns from decrease to increase, thus as illustrated in FIG. 26A, correlation between the data based on press P and the zoom factor X is performed (step S21 in FIG. 24). The processing so far is the same as that described using FIG. 6 and the like in the above-described fifth embodiment.

In the example of FIG. 44, after point B, that is, after a standard for data based on press is set, the data based on press by the operator's operation increases up to point D via point C, and turns to decrease at point D (Yes in step S51). Therefore, in this case, even if the data based on press does not exceed $P_{max}$, at $t_3$, the correlation between the data based on press and the zoom factor is modified to, for example, the aspect in which the standard for data based on press is $P_1$, as illustrated in FIG. 26B (step S42). For the correlation between the data based on press and the zoom factor illustrated in FIG. 26B, the slope of the graph representing the correlation is made smaller (more gentle) than that of the aspect illustrated in FIG. 26A. Thus, when the data based on press decreases from points D to E in FIG. 44 by the operator's operation (corresponding to the decrease from $P_1$ to $P_{min}$, in FIG. 26B), the change in the zoom-out factor to the decrease in the data based on press also becomes smaller (more gentle). Therefore, also in this example, when the operator increases the data based on press to point D and zooms in the image too much, and thus decreases the data based on press to zoom out the image, he/she can zoom out the image carefully, and thus easily reach the desired zoom factor.

Figure 45:
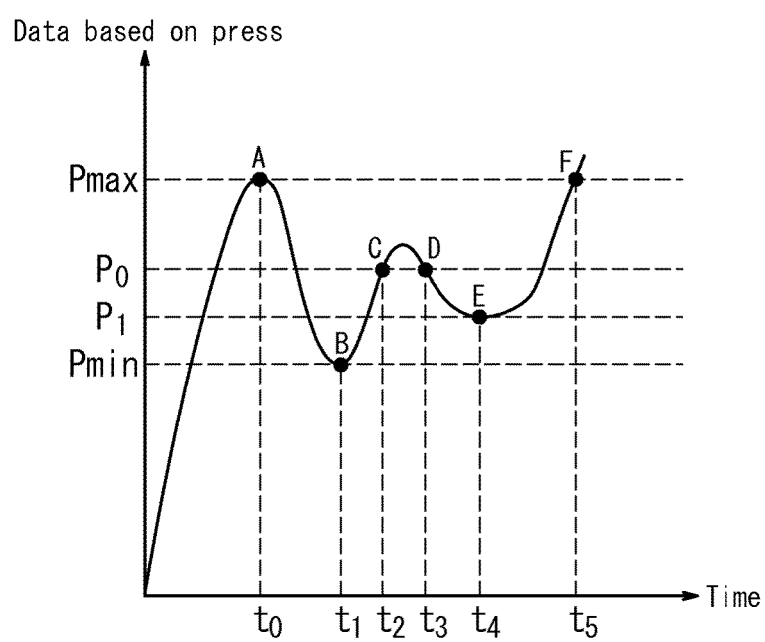
FIG. 45 is a graph illustrating yet another example of change over time in the data based on press by the operator's operation according to the eighth embodiment.

FIG. 45 is, as FIG. 44, a graph illustrating an example of change over time in the data based on press by the operator's operation. In FIG. 45, from points A to B, the data based on press by the operator's operation turns from increase to decrease, then turns from decrease to increase, thus as illustrated in FIG. 28A, the data based on press P is correlated with the zoom factor X (step S21 in FIG. 24). The processing so far is similar to that described with reference to FIG. 6 and the like in the above-described first embodiment.

In the example of FIG. 45, after point B, that is, after a standard for data based on press is set, the data based on press by the operator's operation reaches the standard $P_0$ for data based on press at point C, and turns to decrease. Then, the data based on press that turns to decrease after point C decreases up to point E via point D, and turns to increase at point E (Yes in step S51). Therefore, in this case, even if the data based on press does not fall below $P_{min}$, at $t_4$, the correlation between the data based on press and the zoom factor is modified to, for example, the aspect in which the standard for data based on press is $P_1$ as illustrated in FIG. 28B (step S42). For the correlation between the data based on press and the zoom factor illustrated in FIG. 28B, the slope of the graph representing the correlation is made smaller (more gentle) than that of the aspect illustrated in FIG. 28A. Thus, when the data based on press increases from points E to F in FIG. 45 by the operator's operation (corresponding to the increase from $P_1$ to $P_{max}$ in FIG. 28B), the zoom-out factor to the increase in the data based on press also becomes smaller (more gentle). Therefore, also in this example, when the operator decreases the data based on press up to point E and zooms out the image too much, and thus increases the data based on press to zoom in the image, he/she can zoom in the image carefully, and thus easily reach the desired zoom factor.

The process according to the above-described example may be performed continuously each time the data based on press increases/decreases. Such example will be described below.

Figure 46:
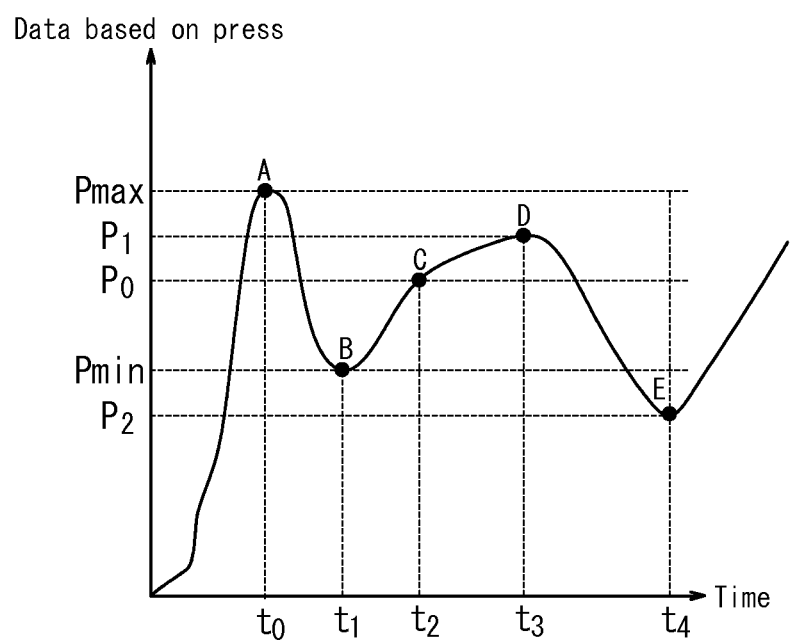
FIG. 46 is a graph illustrating further example of change over time in the data based on press by the operator's operation according to the eighth embodiment.

FIG. 46 is, as FIGS. 44 and 45, a graph illustrating an example of change over time in the data based on press by the operator's operation. Also in FIG. 46, from points A to B, the data based on press by the operator's operation turns from increase to decrease, then turns from decrease to increase, thus as illustrated in FIG. 30A, the data based on press P is correlated with the zoom factor X (step S21 in FIG. 20).

In the example in FIG. 46, after point B, that is, after a standard for data based on press is set, the data based on press by the operator's operation increases up to point D via point C, and at point D, it turns to decrease (Yes in step S51). Therefore, in this case, even if the data based on press does not exceed $P_{max}$, at $t_3$, the correlation between the data based on press and the zoom factor is modified to, for example, the aspect in which the standard for data based on press is $P_1$ as illustrated in FIG. 30B (step S42). For the correlation between the data based on press and the zoom factor illustrated in FIG. 30B, the slope of the graph representing the correlation is made smaller (more gentle) than that of the aspect illustrated in FIG. 30A. Thus, when the data based on press decreases from points D to E in FIG. 46 by the operator's operation (corresponding to the decrease from $P_1$ to $P_{min}$ in FIG. 30B), the change in the zoom-out factor to the decrease in the data based on press also becomes smaller (more gentle).

Moreover, in the example in FIG. 46, after the correlation between the data based on press and the zoom factor is modified at point D, the data based on press decreases and falls below $P_{min}$ immediately before point E, and at point E, the data based on press by the operator's operation turns to increase (Yes in step S51). Therefore, in this case, at $t_4$, the correlation between the data based on press and the zoom factor is modified to, for example, the aspect in which the standard for data based on press is $P_2$ as illustrated in FIG. 30C (step S42). When the press detection unit 40 cannot detect the data based on press that falls below $P_{min}$, at step S42, the control unit may change to the aspect in which the standard for data based on press is $P_{min}$. For the correlation between the data based on press and the zoom factor illustrated in FIG. 30C, the slope of the graph representing the correlation is made further smaller (more gentle) than that of the aspect illustrated in FIG. 30B. Thus, when the data based on press is increased after point E in FIG. 46 by the operator's operation, the change in the zoom-in factor to the increase in the data based on press becomes further smaller (more gentle).

Therefore, also in this example, when the operator increases the data based on press from points C to D and zooms in the image too much, and thus decreases the data based on press to zoom out the image, he/she can zoom out the image carefully. Further, in this example, even if the operator decreases the data based on press from points D to E and zooms out the image too much, when he/she increases the data based on press to zoom in the image, he/she can zoom in the image further carefully. Thus the operator can reach the desired zoom factor further easily.

In addition, as described in this example, when the correlation between the data based on press and the zoom factor is modified continuously each time the data based on press increases/decreases, the change in the zoom factor to the increase/decrease of the data based on press further becomes smaller (more gentle). Thus, even if the operator believes that he/she keeps the data based on press constant, if the data based on press detected by the press detection unit 40 repeats subtle increase/decrease, the change in the zoom factor to the increase/decrease in the data based on press may, contrary to the operator's intention, gradually become smaller (more gentle).

Figure 47:
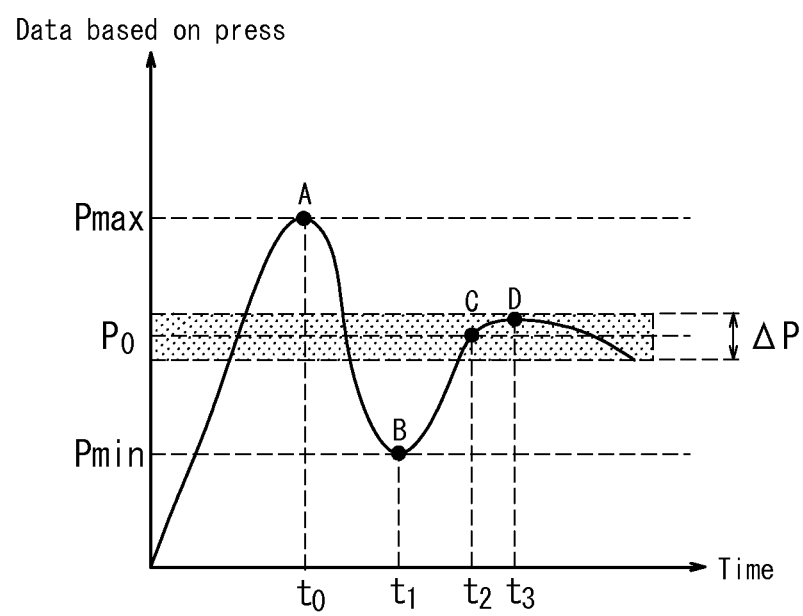
FIG. 47 is a graph illustrating still further example of change over time in the data based on press by the operator's operation according to the eighth embodiment.

Thus, in this example, in order to prevent such an inconvenience, when the data based on press repeats subtle increase/decrease, a measure to decrease (more gentle) the change in the zoom factor to the data based on press may not be taken. For example, as illustrated in FIG. 47, for the changes over time in the data based on press detected by the press detection unit 40, a minute variation ΔP of the data based on press may be set. Further, in the zoom mode, even if the data based on press changes within such a minute variation ΔP, the correlation between the data based on press and the zoom factor may not be modified.

FIG. 47 is a graph illustrating an example of change over time in the data based on press by the operator's operation. Also in FIG. 47, from point A to point B, the data based on press by the operator's operation turns from increase to decrease, then turns from decrease to increase, thus at $t_1$, the data based on press P is correlated with the zoom factor X. In the example of FIG. 47, after point B, that is, after a standard for data based on press is set, the data based on press by the operator's operation slightly increases up to point D via point C, and at point D, turns to decrease. However, the increase in the data based on press from $P_0$ to point D is within the predetermined variation ΔP of the data based on press, and thus the correlation between the data based on press and the zoom factor may not be modified.

Thus, in this example, the change in the zoom factor to the decrease/increase of the data based on press may not gradually become small (more gentle) any more, contrary to the operator's intention.

The present invention is not limited to the above-described embodiments, and a variety of modifications and changes may be made. For example, in the above-described each embodiment, an image such as a map is displayed on the display unit 30 and the image is zoomed in or out. However, the present invention is not limited to an aspect in which such a process is performed, and the present invention may be applied to a variety of occasions where a parameter value associated with a predetermined process is changed, according to the data based on press to the press detection unit 40. Further, the predetermined process may be any process associated with, for example, an application. For example, in the above-described each embodiment, the present invention may be applied to a variety of processes, such as adjustment of volume when sound is played and adjustment of a playback speed of video displayed on the display unit 30, according to the difference between the set standard for data based on press and the data based on press detected by the press detection unit 40.

Moreover, the present invention may preferably be applied to an electronic device with a touch sensor, however, in the present invention, a parameter value associated with a predetermined process is changed according to the data based on press to the press detection unit 40, thus the present invention is not limited to the device with a touch sensor. For example, the present invention may be applied to an electronic device that includes a press detection unit, and applied also to an electronic device that includes no touch sensor. In this case, for example, the electronic device may preferably include a press detection unit configured to detect data based on press to keys, buttons, and the like, such that the data based on press can be detected when the operator executes operations to the keys and the buttons that constitute a normal operation unit. Or, when it is not essential for keys, buttons and the like to detect data based on press, for example, an aspect in which a press detection unit configured to detect data based on press when the operator directly presses the housing of the electronic device may be considered.

Further, in the above-described embodiment, the touch sensor 20 is used to detect a contact on the touch face of contact detection unit, however, when a standard for data based on press is satisfied, a load sensor (press detection unit) may be used to determine that a contact has been made. Such a press detection unit may be configured as a touch sensor 20 provided with an arbitrary number of strain gauge sensors and the like.

Moreover, such a press detection unit may be configured according to the contact detection method of the touch sensor 20. For example, in the case of a resistive film type, if press can be detected from the change in the output signal based on the change in the resistance corresponding to the contact area, a press detection unit may be configured without using a strain gauge sensor, or in the case of a capacitive type, even if press can be detected from the change in the output signal based on the change in the capacitance, a press detection unit may be configured without using a strain gauge sensor.

In addition, the tactile sensation providing unit 50 may be configured using an arbitrary number of piezoelectric transducers, by providing clear piezoelectric elements over the entire surface of the touch sensor 20, or by rotating an eccentric motor once per period of a drive signal. Further, when the press detection unit and the tactile sensation providing unit 50 are configured using a piezoelectric element, a piezoelectric element may be shared to configure a press detection unit and vibration unit. This is because, the piezoelectric element generates power when it is applied with a pressure, and deforms when it is applied with power. In this case, the tactile sensation providing unit 50 may be configured to detect the data based on press based on output from the piezoelectric element serving also as a press detection unit, and for example, when a standard for data based on press is set, the tactile sensation providing unit 50 may be configured to drive the piezoelectric element to produce a vibration.

In the above-described embodiment, an explanation is given assuming that the touch sensor 20 is overlaid on the front face of the display unit 30. However, it is not essential for the electronic device according to the present invention to be configured in this manner, and the touch sensor 20 may be separated from the display unit 30. However, with the configuration in which the touch sensor 20 is overlaid on the display unit 30, the operator may recognize the correlation between the image to be displayed and the vibration to be produced more easily.

Moreover, the display unit 30 and the touch sensor 20 according to the present embodiment may be configured integrally by providing a common substrate that has both display unit function and contact detection unit function. An example of such a device in which both a display unit function and a contact detection unit function are integrated includes a liquid crystal panel having a group of pixel electrodes arranged in a matrix pattern, therein a plurality of photoelectric conversion elements, such as photodiodes are regularly mixed. Such a device displays an image by a liquid crystal panel structure, and on the other hand, reflects a backlight for the liquid crystal display with the tip of the pen that contacts the desired position on the surface of the panel, then the reflected backlight is received by the surrounding photoelectric conversion elements. Thus the device can detect the contact position.

Further, in the present invention, a standard for data based on press is set, and the standard for data based on press may be set at the start of an application, based on a standard value stored in the storage unit, or may be set at the start of an application, by the operator's operation to the object that is used for setting a standard for data based on press. In this manner, in the present invention, setting of the standard for data based on press is not limited to the aspects described in the present embodiment.

Moreover, in the description of the present embodiment, the control unit determines whether or not the data based on press detected by the press detection unit satisfies a predetermined condition, and determines whether or not the data based on press detected by the press detection unit turns from increase to decrease, then turns from decrease to increase. However, the present invention is not limited thereto, and for example, the control unit may determine whether or not the data based on press detected by the press detection unit satisfies a predetermined condition, and may determine whether or not the data based on press detected by the press detection unit satisfies a predetermined load standard (the data based on press is equal to or greater than the predetermined press threshold), or determine whether or not the data based on press detected by the press detection unit changes in the same manner as the predetermined curve of change for the data based on press.

REFERENCE SIGNS LIST

1 Electronic device
10 Control unit

20 Touch sensor
30 Display unit
40 Press detection unit
50 Tactile sensation providing unit
60 Storage unit

The invention claimed is:

1. An electronic device comprising:

a press detection unit configured to detect a press of a single touch object on an input device of the electronic device; and a control unit configured to control, such that a zoom mode starts according to the press to a position of the press detection unit and a zooming factor of an image changes according to the press to the position of the press detection unit, wherein when an operator executes a sliding operation before the zoom mode is started, the image is slid, when the operator executes the sliding operation during continuation of the zoom mode, the image is not slid and a zoom factor of the image is fixed, the sliding operation is not a zoom operation, and the control unit is configured so that the fixing of the zoom factor of the image is executed by the single touch object in contact with an arbitral position of the input device of the electronic device without lifting the single touch object from the arbitral position of the input device and without sliding the single touch object along a surface of the input device.

2. An electronic device comprising:

a press detection unit configured to detect a press; and a control unit configured to control, such that a zoom mode starts according to the press to a position of the press detection unit and a zooming factor of an image changes according to the press to the position of the press detection unit, wherein when an operator executes a sliding operation before the zoom mode is started, the image is slid, when the operator executes the sliding operation during continuation of the zoom mode, the image is not slid and a zoom factor of the image is fixed, and the sliding operation is not a zoom operation.

* * * * *